United States Patent
Beer et al.

(10) Patent No.: US 12,502,542 B2
(45) Date of Patent: Dec. 23, 2025

(54) DEVICES, SYSTEMS, AND METHODS FOR TREATING URINARY AND FECAL INCONTINENCE

(71) Applicant: Renovia Inc., Boston, MA (US)

(72) Inventors: Marc D. Beer, Sudbury, MA (US); Jose Bohorquez, Boston, MA (US); Samantha J. Pulliam, Boston, MA (US); Jessica L. McKinney, Boston, MA (US)

(73) Assignee: Axena Health, Inc., Auburndale, MA (US)

( * ) Notice: Subject to any disclaimer, the term of this patent is extended or adjusted under 35 U.S.C. 154(b) by 588 days.

(21) Appl. No.: 17/049,881

(22) PCT Filed: Apr. 26, 2019

(86) PCT No.: PCT/US2019/029400
§ 371 (c)(1),
(2) Date: Oct. 22, 2020

(87) PCT Pub. No.: WO2019/210204
PCT Pub. Date: Oct. 31, 2019

(65) Prior Publication Data
US 2021/0069513 A1   Mar. 11, 2021

Related U.S. Application Data

(60) Provisional application No. 62/663,844, filed on Apr. 27, 2018.

(51) Int. Cl.
*A61N 1/36*   (2006.01)
*A61N 1/372*   (2006.01)
(Continued)

(52) U.S. Cl.
CPC ..... *A61N 1/36135* (2013.01); *A61N 1/36007* (2013.01); *A61N 1/3606* (2013.01);
(Continued)

(58) Field of Classification Search
CPC ............ A61N 1/36135; A61N 1/36007; A61N 1/3606; A61N 1/37247; A61N 1/3605;
(Continued)

(56) References Cited

U.S. PATENT DOCUMENTS 2,830,582 A   4/1958   Ljung
3,854,476 A   12/1974   Dickinson, III et al.
(Continued)

FOREIGN PATENT DOCUMENTS

CA   2625428 A1   7/2007
CA   2862928 A1   8/2013
(Continued)

OTHER PUBLICATIONS

Communication pursuant to Article 94(3) EPC for European Patent Application No. 12852598.7, dated Jun. 6, 2018 (4 pages).
(Continued)

*Primary Examiner* — George R Evanisko
(74) *Attorney, Agent, or Firm* — Clark & Elbing LLP

(57) ABSTRACT

Featured are intravaginal devices and electrical stimulation devices, systems, thereof, and methods of using the devices and systems thereof to observe pelvic floor movements in order to diagnose, treat, or prevent urinary and fecal incontinence disorders (e.g., urge incontinence) and their accompanying symptoms or to diagnose and/or improve the efficacy of neuromodulation therapy.

17 Claims, 16 Drawing Sheets
(16 of 16 Drawing Sheet(s) Filed in Color)

(51) Int. Cl.
*A61B 5/00* (2006.01)
*A61B 5/11* (2006.01)
*A61B 5/20* (2006.01)

(52) U.S. Cl.
CPC ........ *A61N 1/37247* (2013.01); *A61B 5/1104* (2013.01); *A61B 5/202* (2013.01); *A61B 5/6847* (2013.01); *A61B 2562/0219* (2013.01); *A61B 2562/028* (2013.01)

(58) Field of Classification Search
CPC ... A61N 1/36107; A61B 5/1104; A61B 5/202; A61B 2562/0219; A61B 2562/028; A61B 5/227
USPC .......................................................... 607/41
See application file for complete search history.

(56) References Cited

U.S. PATENT DOCUMENTS

| | | |
|---|---|---|
| 4,669,478 A | 6/1987 | Robertson |
| 4,873,990 A | 10/1989 | Holmes et al. |
| D309,866 S | 8/1990 | Fukuda et al. |
| D310,275 S | 8/1990 | Su |
| 5,049,132 A | 9/1991 | Shaffer et al. |
| 5,328,077 A | 7/1994 | Lou |
| 5,386,836 A | 2/1995 | Biswas |
| 5,406,961 A | 4/1995 | Artal |
| 5,562,717 A | 10/1996 | Tippey et al. |
| 5,603,685 A | 2/1997 | Tutrone, Jr. |
| 5,674,238 A | 10/1997 | Sample et al. |
| 5,924,984 A | 7/1999 | Rao |
| 6,001,060 A | 12/1999 | Churchill et al. |
| 6,021,781 A | 2/2000 | Thompson et al. |
| 6,039,701 A | 3/2000 | Sliwa et al. |
| 6,056,699 A | 5/2000 | Sohn et al. |
| 6,080,118 A | 6/2000 | Blythe |
| 6,086,549 A | 7/2000 | Neese et al. |
| 6,264,582 B1 | 7/2001 | Remes |
| 6,272,371 B1 | 8/2001 | Shlomo |
| D458,681 S | 6/2002 | Sherlock et al. |
| 6,413,206 B2 | 7/2002 | Biswas |
| 6,432,037 B1 | 8/2002 | Eini et al. |
| 6,511,427 B1 | 1/2003 | Sliwa, Jr. et al. |
| 6,652,565 B1 | 11/2003 | Shimada et al. |
| 6,672,996 B2 | 1/2004 | Ross et al. |
| 6,679,854 B2 | 1/2004 | Honda et al. |
| 6,741,895 B1 | 5/2004 | Gafni et al. |
| D491,079 S | 6/2004 | Lim |
| D491,274 S | 6/2004 | Dubniczki et al. |
| 6,816,744 B2 | 11/2004 | Garfield et al. |
| 7,079,882 B1 | 7/2006 | Schmidt |
| 7,104,950 B2 | 9/2006 | Levy |
| D535,203 S | 1/2007 | Chen |
| D548,359 S | 8/2007 | Illein et al. |
| 7,577,476 B2 | 8/2009 | Hochman et al. |
| 7,608,037 B2 | 10/2009 | Levy |
| 7,628,744 B2 | 12/2009 | Hoffman et al. |
| 7,645,220 B2 | 1/2010 | Hoffman et al. |
| 7,736,298 B2 | 6/2010 | Guerquin et al. |
| 7,837,682 B2 | 11/2010 | Ostrovsky et al. |
| 7,892,179 B2 | 2/2011 | Rieth |
| 7,955,241 B2 | 6/2011 | Hoffman et al. |
| 7,957,794 B2 | 6/2011 | Hochman et al. |
| D651,531 S | 1/2012 | Rothman |
| 8,147,429 B2 | 4/2012 | Mittal et al. |
| 8,360,954 B2 | 1/2013 | Kim |
| 8,623,004 B2 | 1/2014 | Johnson et al. |
| 8,715,204 B2 | 5/2014 | Webster et al. |
| 8,728,140 B2 | 5/2014 | Feemster et al. |
| 8,740,767 B2 | 6/2014 | Rosen et al. |
| 8,751,003 B2 * | 6/2014 | DiUbaldi ............. A61N 1/0551 607/71 |
| 8,805,472 B2 | 8/2014 | Iglesias |
| 8,821,407 B2 | 9/2014 | Kirsner |
| 8,914,111 B2 | 12/2014 | Haessler |
| 8,983,627 B2 | 3/2015 | Pelger et al. |
| 9,155,885 B2 | 10/2015 | Wei et al. |
| 9,248,285 B2 | 2/2016 | Haessler |
| D759,813 S | 6/2016 | Newman et al. |
| D759,814 S | 6/2016 | Newman et al. |
| 9,381,351 B2 | 7/2016 | Haessler |
| 9,408,685 B2 | 8/2016 | Hou et al. |
| 9,656,067 B2 | 5/2017 | Pelger et al. |
| D800,898 S | 10/2017 | Sanders et al. |
| 9,861,316 B2 | 1/2018 | Egorov |
| 9,970,923 B2 | 5/2018 | Sturman et al. |
| 9,974,635 B2 | 5/2018 | Rosen et al. |
| D832,437 S | 10/2018 | Zeltwanger et al. |
| D841,155 S | 2/2019 | McMenamin et al. |
| D845,478 S | 4/2019 | Luke |
| D846,120 S | 4/2019 | Wallis et al. |
| D852,069 S | 6/2019 | Fu |
| D853,035 S | 7/2019 | Moretti |
| D855,825 S | 8/2019 | Parsons et al. |
| 10,470,862 B2 | 11/2019 | Iglesias |
| 10,517,538 B2 | 12/2019 | Burnett et al. |
| D877,895 S | 3/2020 | Sanders et al. |
| D888,949 S | 6/2020 | Beer et al. |
| D889,649 S | 7/2020 | Beer et al. |
| D893,026 S | 8/2020 | Leather |
| D896,958 S | 9/2020 | Beer et al. |
| D896,959 S | 9/2020 | Beer et al. |
| D897,530 S | 9/2020 | Beer et al. |
| D898,911 S | 10/2020 | Beer et al. |
| D899,593 S | 10/2020 | Beer et al. |
| D903,853 S | 12/2020 | Wiegerinck |
| D903,896 S | 12/2020 | Tianhao et al. |
| D908,160 S | 1/2021 | Sun |
| D909,679 S | 2/2021 | Chen |
| D910,851 S | 2/2021 | Lagrange et al. |
| D918,390 S | 5/2021 | Ollivier |
| D919,083 S | 5/2021 | Lee |
| D923,806 S | 6/2021 | Bunger von Wurmb et al. |
| D923,876 S | 6/2021 | Hasegawa |
| 11,135,085 B2 | 10/2021 | Mikkonen et al. |
| D938,581 S | 12/2021 | Floyd et al. |
| 11,266,343 B2 | 3/2022 | Iglesias |
| D956,229 S | 6/2022 | Beer et al. |
| D958,987 S | 7/2022 | Beer et al. |
| 11,426,625 B2 | 8/2022 | Iglesias et al. |
| 11,426,626 B2 | 8/2022 | Beer et al. |
| 12,138,019 B2 | 11/2024 | Beer et al. |
| 12,220,345 B2 | 2/2025 | Beer et al. |
| 12,263,006 B2 | 4/2025 | Iglesias |
| 12,295,732 B2 | 5/2025 | Beer et al. |
| 12,311,228 B2 | 5/2025 | Iglesias et al. |
| 2001/0001125 A1 | 5/2001 | Schulman et al. |
| 2001/0047132 A1 | 11/2001 | Johnson et al. |
| 2002/0022836 A1 | 2/2002 | Goble et al. |
| 2002/0111586 A1 | 8/2002 | Mosel et al. |
| 2002/0143275 A1 | 10/2002 | Sarvazyan et al. |
| 2003/0028180 A1 | 2/2003 | Franco |
| 2003/0087734 A1 | 5/2003 | Kring et al. |
| 2004/0236223 A1 | 11/2004 | Barnes et al. |
| 2004/0260207 A1 | 12/2004 | Eini et al. |
| 2005/0148447 A1 | 7/2005 | Nady |
| 2005/0177067 A1 | 8/2005 | Tracey et al. |
| 2005/0256423 A1 | 11/2005 | Kirsner |
| 2006/0036188 A1 | 2/2006 | Hoffman et al. |
| 2006/0074289 A1 | 4/2006 | Adler et al. |
| 2006/0084848 A1 | 4/2006 | Mitchnick |
| 2006/0211911 A1 | 9/2006 | Jao et al. |
| 2007/0066880 A1 | 3/2007 | Lee et al. |
| 2007/0185417 A1 * | 8/2007 | Mittal ................. A61B 5/6887 600/587 |
| 2007/0232882 A1 | 10/2007 | Glossop et al. |
| 2007/0255090 A1 | 11/2007 | Addington et al. |
| 2007/0265675 A1 | 11/2007 | Lund et al. |
| 2007/0270686 A1 | 11/2007 | Ritter et al. |
| 2008/0077053 A1 | 3/2008 | Epstein et al. |
| 2008/0139876 A1 | 6/2008 | Kim |
| 2008/0146941 A1 | 6/2008 | Dala-Krishna |
| 2008/0149109 A1 | 6/2008 | Ziv |

(56) References Cited

U.S. PATENT DOCUMENTS

| | | |
|---|---|---|
| 2008/0154131 A1 | 6/2008 | Lee et al. |
| 2008/0171950 A1 | 7/2008 | Franco |
| 2008/0300658 A1 | 12/2008 | Meskens |
| 2009/0024001 A1 | 1/2009 | Parks et al. |
| 2009/0149740 A1 | 6/2009 | Hoheisel |
| 2009/0216071 A1 | 8/2009 | Zipper |
| 2009/0231125 A1 | 9/2009 | Baldus et al. |
| 2009/0270963 A1 | 10/2009 | Pelger et al. |
| 2009/0306509 A1 | 12/2009 | Pedersen et al. |
| 2010/0069784 A1 | 3/2010 | Blaivas |
| 2010/0174218 A1 | 7/2010 | Shim |
| 2010/0222708 A1 | 9/2010 | Hitchcock et al. |
| 2010/0249576 A1 | 9/2010 | Askarinya et al. |
| 2010/0262049 A1 | 10/2010 | Novak et al. |
| 2010/0277280 A1 | 11/2010 | Burkart et al. |
| 2010/0298895 A1 | 11/2010 | Ghaffari et al. |
| 2010/0315225 A1 | 12/2010 | Teague |
| 2011/0054357 A1 | 3/2011 | Egorov et al. |
| 2011/0077500 A1 | 3/2011 | Shakiba |
| 2011/0144458 A1 | 6/2011 | Gauta |
| 2011/0190580 A1 | 8/2011 | Bennett et al. |
| 2011/0190595 A1 | 8/2011 | Bennett et al. |
| 2011/0196263 A1 | 8/2011 | Egorov et al. |
| 2011/0264163 A1* | 10/2011 | Tracey ............... A61N 1/36021 607/41 |
| 2012/0016258 A1 | 1/2012 | Webster et al. |
| 2012/0245490 A1 | 9/2012 | Fausett et al. |
| 2012/0265044 A1 | 10/2012 | Broens |
| 2012/0265049 A1 | 10/2012 | Iglesias |
| 2013/0035611 A1 | 2/2013 | White |
| 2013/0053627 A1 | 2/2013 | Bercovich et al. |
| 2013/0130871 A1 | 5/2013 | McCoy et al. |
| 2013/0144191 A1 | 6/2013 | Egorov et al. |
| 2013/0184567 A1 | 7/2013 | Xie et al. |
| 2013/0192606 A1 | 8/2013 | Ziv et al. |
| 2013/0204313 A1* | 8/2013 | Addington ........... A61B 5/4884 607/41 |
| 2013/0237771 A1 | 9/2013 | Runkewitz et al. |
| 2013/0324380 A1 | 12/2013 | Horsley |
| 2014/0066813 A1 | 3/2014 | Daly et al. |
| 2014/0073879 A1 | 3/2014 | Cantor et al. |
| 2014/0088471 A1 | 3/2014 | Leivseth et al. |
| 2014/0155225 A1 | 6/2014 | Sedic |
| 2014/0213927 A1 | 7/2014 | Webster et al. |
| 2014/0275743 A1 | 9/2014 | Rosen et al. |
| 2014/0288612 A1* | 9/2014 | Addington ............. A61B 5/113 607/48 |
| 2014/0296705 A1 | 10/2014 | Iglesias |
| 2014/0309550 A1 | 10/2014 | Iglesias |
| 2015/0032030 A1 | 1/2015 | Iglesias |
| 2015/0112230 A1 | 4/2015 | Iglesias |
| 2015/0112231 A1 | 4/2015 | Iglesias |
| 2015/0133832 A1 | 5/2015 | Courtion et al. |
| 2015/0196802 A1 | 7/2015 | Siegel |
| 2015/0257695 A1 | 9/2015 | Addington et al. |
| 2015/0282763 A1 | 10/2015 | Rosenshein |
| 2016/0008664 A1 | 1/2016 | Siegel |
| 2016/0022198 A1 | 1/2016 | De Laat |
| 2016/0051354 A1 | 2/2016 | Patankar et al. |
| 2016/0074276 A1 | 3/2016 | Scheuring et al. |
| 2016/0121105 A1 | 5/2016 | Lee et al. |
| 2016/0279469 A1 | 9/2016 | Rose |
| 2016/0287887 A1 | 10/2016 | Wu et al. |
| 2016/0346610 A1 | 12/2016 | Iglesias et al. |
| 2017/0231709 A1 | 8/2017 | Gupta et al. |
| 2017/0281072 A1 | 10/2017 | Iglesias |
| 2017/0281299 A1 | 10/2017 | Iglesias |
| 2017/0291012 A1 | 10/2017 | Iglesias |
| 2017/0303843 A1 | 10/2017 | Iglesias |
| 2017/0312530 A1 | 11/2017 | Schilling et al. |
| 2017/0332959 A1 | 11/2017 | Bartlett |
| 2018/0021121 A1 | 1/2018 | Zeltwanger et al. |
| 2018/0146892 A1 | 5/2018 | Billard |
| 2018/0177458 A1 | 6/2018 | Burnett et al. |
| 2018/0199816 A1 | 7/2018 | Kalt et al. |
| 2019/0133738 A1 | 5/2019 | Rosen et al. |
| 2019/0160332 A1 | 5/2019 | Beer et al. |
| 2019/0288860 A1 | 9/2019 | Poltorak |
| 2020/0029812 A1 | 1/2020 | Govari et al. |
| 2020/0069161 A1 | 3/2020 | Schentag et al. |
| 2020/0146800 A1 | 5/2020 | Iglesias |
| 2020/0337888 A1 | 10/2020 | Beer et al. |
| 2020/0405142 A1 | 12/2020 | Whitaker |
| 2021/0069513 A1 | 3/2021 | Beer et al. |
| 2021/0106787 A1 | 4/2021 | Iglesias |
| 2021/0145353 A1 | 5/2021 | Iglesias |
| 2021/0161403 A1 | 6/2021 | Beer et al. |
| 2021/0321983 A1 | 10/2021 | Miyamoto |
| 2021/0353195 A1 | 11/2021 | Beer et al. |
| 2023/0026958 A1 | 1/2023 | Imran et al. |
| 2023/0201659 A1 | 6/2023 | Iglesias et al. |
| 2023/0201660 A1 | 6/2023 | Bohorquez et al. |
| 2023/0225847 A1 | 7/2023 | Iglesias |

FOREIGN PATENT DOCUMENTS

| | | |
|---|---|---|
| CN | 1408451 A | 4/2003 |
| CN | 103622710 A | 3/2014 |
| CN | 105120746 A | 12/2015 |
| CN | 204839545 U | 12/2015 |
| CN | 107205675 A | 9/2017 |
| CN | 107847196 A | 3/2018 |
| DE | 10345282 B3 | 4/2005 |
| DE | 2020/18103016 U1 | 6/2018 |
| EP | 0268972 A2 | 6/1988 |
| EP | 2689724 A1 | 1/2014 |
| EP | 2809231 A4 | 9/2015 |
| EP | 3366212 A1 | 8/2018 |
| GB | 2492754 A | 1/2013 |
| JP | 2002-143133 A | 5/2002 |
| JP | 2008-532578 A | 8/2008 |
| JP | 2011-183167 A | 9/2011 |
| RU | 2307636 C1 | 10/2007 |
| WO | WO-96/05768 A1 | 2/1996 |
| WO | WO-99/05963 A1 | 2/1999 |
| WO | WO-00/09013 A1 | 2/2000 |
| WO | WO-00/23030 A1 | 4/2000 |
| WO | WO-01/37732 A1 | 5/2001 |
| WO | WO-02/17987 A2 | 3/2002 |
| WO | WO-2003028572 A1 | 4/2003 |
| WO | WO-2006/107930 A2 | 10/2006 |
| WO | WO-2007/104152 A2 | 9/2007 |
| WO | WO-2007/136266 A1 | 11/2007 |
| WO | WO-2010/131252 A2 | 11/2010 |
| WO | WO-2011/050252 A1 | 4/2011 |
| WO | WO-2011/121591 A2 | 10/2011 |
| WO | WO-2011/159906 A2 | 12/2011 |
| WO | WO-2012/079127 A1 | 6/2012 |
| WO | WO-2012/138232 A1 | 10/2012 |
| WO | WO-2013/082006 A1 | 6/2013 |
| WO | WO-2013/115310 A1 | 8/2013 |
| WO | WO-2013/116310 A1 | 8/2013 |
| WO | WO-2015/103629 A1 | 7/2015 |
| WO | WO-2016/026914 A2 | 2/2016 |
| WO | WO-2016/042310 A1 | 3/2016 |
| WO | WO-2016/067023 A1 | 5/2016 |
| WO | WO-2016/119002 A1 | 8/2016 |
| WO | WO-2016/203485 A1 | 12/2016 |
| WO | WO-2017/149688 A1 | 9/2017 |
| WO | WO-2018/023037 A1 | 2/2018 |
| WO | WO-2019/084468 A1 | 5/2019 |
| WO | WO-2019/084469 A1 | 5/2019 |
| WO | WO-2019/200222 A1 | 10/2019 |
| WO | WO-2019/210204 A1 | 10/2019 |
| WO | WO-2020/092343 A1 | 5/2020 |

OTHER PUBLICATIONS

Examination Report for Canadian Patent Application No. 2,856,724, dated Oct. 18, 2018 (3 pages).

Extended European Search Report for European Patent Application No. 17203166.8, dated Jul. 31, 2018 (10 pages).

(56) References Cited

OTHER PUBLICATIONS

First Examination Report for Australian Patent Application No. 2017245476, dated Sep. 12, 2018 (3 pages).
First Examination Report for Australian Patent Application No. 2018200715, dated Jun. 26, 2018 (4 pages).
First Office Action for Mexican Patent Application No. MX/a/2014/006219, dated Jul. 31, 2017 (7 pages).
Glazer et al., "Pelvic floor muscle biofeedback in the treatment of urinary incontinence: A literature review," Appl Psychophysiol Biofeedback. 31(3):187-201 (2006) (Abstract only).
*Gray's Anatomy, 39th Edition*, Churchill Livingstone, p. 1290, definition of "Bladder neck" (2005) (3 pages).
International Preliminary Report on Patentability for International Application No. PCT/US2017/044444, mailed Feb. 7, 2019 (14 pages).
International Search Report and Written Opinion for International Application No. PCT/US17/44444, mailed Oct. 19, 2017 (21 pages).
International Search Report and Written Opinion for International Application No. PCT/US18/57811, mailed Jan. 29, 2019 (18 pages).
International Search Report and Written Opinion for International Application No. PCT/US2012/066613, mailed Feb. 6, 2013 (5 pages).
International Search Report and Written Opinion for International Application No. PCT/US2019/027168, mailed Aug. 12, 2019 (39 pages).
International Search Report and Written Opinion for International Application No. PCT/US2019/029400, mailed Jul. 10, 2019 (17 pages).
Kandadai et al., "Correct Performance of Pelvic Muscle Exercises in Women Reporting Prior Knowledge," Female Pelvic Med Reconstr Surg. 21(3):135-40 (2015).
Malcovati et al., Interface Circuitry and Microsystems. *MEMS—A Practical Guide to Design, Analysis, and Applications*. Jan G. Korvink and Oliver Paul, 901-942 (2006).
Moen et al., "Pelvic floor muscle function in women presenting with pelvic floor disorders, " Int Urogynecol J Pelvic Floor Dysfunct. 20(7):843-6 (2009).
Nygaard et al., "Efficacy of pelvic floor muscle exercises in women with stress, urge, and mixed urinary incontinence," Am J Obstet Gynecol. 174(1 Pt 1):120-125 (1996) (Abstract only).
Parekh et al., "The role of pelvic floor exercises on post-prostatectomy incontinence," J Urol. 170(1):130-33 (2003) (Abstract Only) (2 pages).
Rosenbaum et al., "The Role of Pelvic Floor Physical Therapy in the Treatment of Pelvic and Genital Pain-Related Sexual Dysfunction," J Sex Med. 5(3): 513-23 (2008).
Rosenbaum, "Pelvic floor involvement in male and female sexual dysfunction and the role of pelvic floor rehabilitation in treatment: a literature review," J Sex Med. 4(1):4-13 (2007) (Abstract only) (2 pages).
Rosenblatt et al., "Evaluation of an accelerometer-based digital health system for the treatment of female urinary incontinence: A pilot study," Neurourol Urodyn. 38(7): 1944-1952 (2019).
Rosenblatt et al., "Interactive Pelvic Floor Muscle Training for Female Urinary Incontinence," Renovia, Inc., retrieved Apr. 30, 2019 from <renoviainc.com/wp-content/uploads/2018/04/REN005.01-White-Paper-12Apr18-FINAL.pdf> (2018) (6 pages).
Second Examination Report for Canadian Patent Application No. 2,862,928, dated Nov. 20, 2018 (5 pages).
*Stedman's Medical Dictionary, 28th Edition*, Lippincott Williams & Wilkins (LWW), p. 2072 (2006) (3 pages).
Summons to attend oral proceedings pursuant to Rule 115(1) EPC, issued on Aug. 3, 2017 by the European Patent Office related to the European Patent Application No. 13743383.5 (10 pages).
Office Action for Chinese Patent Application No. 201880083895.6, dated Feb. 8, 2022 (24 pages).
International Search Report and Written Opinion for International Application No. PCT/US2019/058527, mailed Feb. 21, 2020 (18 pages).
Office Action for Japanese Patent Application No. 2019-504938, dated May 18, 2021 (10 pages).
International Search Report and Written Opinion for International Application No. PCT/US2021/033155, mailed Aug. 25, 2021 (19 pages).
Communication pursuant to Article 94(3) EPC for European Patent Application No. 15733078.8, dated Aug. 24, 2021 (8 pages).
Office Action for Japanese Patent Application No. 2020-143711, dated Sep. 8, 2021 (4 pages).
First Examination Report for Australian Patent Application No. 2020281099, dated Nov. 2, 2021 (6 pages).
Office Action for Brazilian Patent Application No. BR112019001746-1, dated Dec. 10, 2021 (5 pages).
Extended European Search Report for European Application No. 19793343.5, dated Jan. 27, 2022 (7 pages).
Notice of Preliminary Rejection for Korean Patent Application No. 10-2019-7005863, dated Jan. 26, 2022 (17 pages).
Office Action for Chinese Patent Application No. 201780060078.4, issued Jan. 17, 2022 (20 pages).
Office Action for Japanese Patent Application No. 2019-504938 dated Feb. 8, 2022 (13 pages).
U.S. Appl. No. 18/157,453, Iglesias.
U.S. Appl. No. 17/822,954, Iglesias et al.
U.S. Appl. No. 17/926,192, Bohorquez et al.
Extended European Search Report for European Patent Application No. 19786241.0, dated Apr. 29, 2022 (10 pages).
Notice of Reasons for Refusal for Japanese Patent Application No. 2020-143711, mailed May 9, 2022 (7 pages).
Office Action for Chinese Patent Application No. 201780060078.4, issued Apr. 13, 2022 (19 pages).
Extended European Search Report for European Patent Application No. 19878836.6, dated Jun. 1, 2022 (7 pages).
Office Action for Canadian Patent Application No. 2,936,061, dated Jun. 23, 2022 (4 pages).
Notice of Last Preliminary Rejection for Korean Patent Application No. 10-2019-7005863, dated Jul. 28, 2022 (4 pages).
Office Action for Brazilian Patent Application No. BR112020008231-7, dated Sep. 7, 2022 (5 pages) (Informal translation of Office Action included).
Extended European Search Report dated Aug. 16, 2017 issued in related EP Application No. 15733078.8 filed Aug. 2, 2016 (6 pages).
International Search Report and Written Opinion, dated Mar. 26, 2015, issued in International Application No. PCT/US2015/010356, filed on Jan. 6, 2015 (5 pages).
Office Action for Chinese Patent Application No. 201880083895.6 dated Oct. 25, 2022 (8 pages).
Office Action for European Patent Application No. 17203166.8, dated Aug. 29, 2023 (6 pages).
Extended European Search Report for European Patent Application No. 21808988.6, dated Apr. 25, 2024 (9 pages).
Ezra et al., "Patterns of tined lead migration in sacral nerve modulation," International Journal of Colorectal Disease. 35:1163-1166 (Mar. 2020).
Dudding et al., "Reprogramming Sacral Neuromodulation for Sub-Optimal Outcomes: Evidence and Recommendations for Clinical Practice," Technology at the Neural Interface Neuromodulation. 24: 1247-1257 (Jun. 2021).
Husk et al., "Variation in bony landmarks and predictors of success with sacral neuromodulation," International Urogynecology Journal. 30:1973-1979 (Feb. 2019).
Powell, "Troubleshooting Interstim Sacral Neuromodulation Generators to Recover Function," Current Urology Reports. 19:86 (Aug. 2018) (9 pages).

* cited by examiner

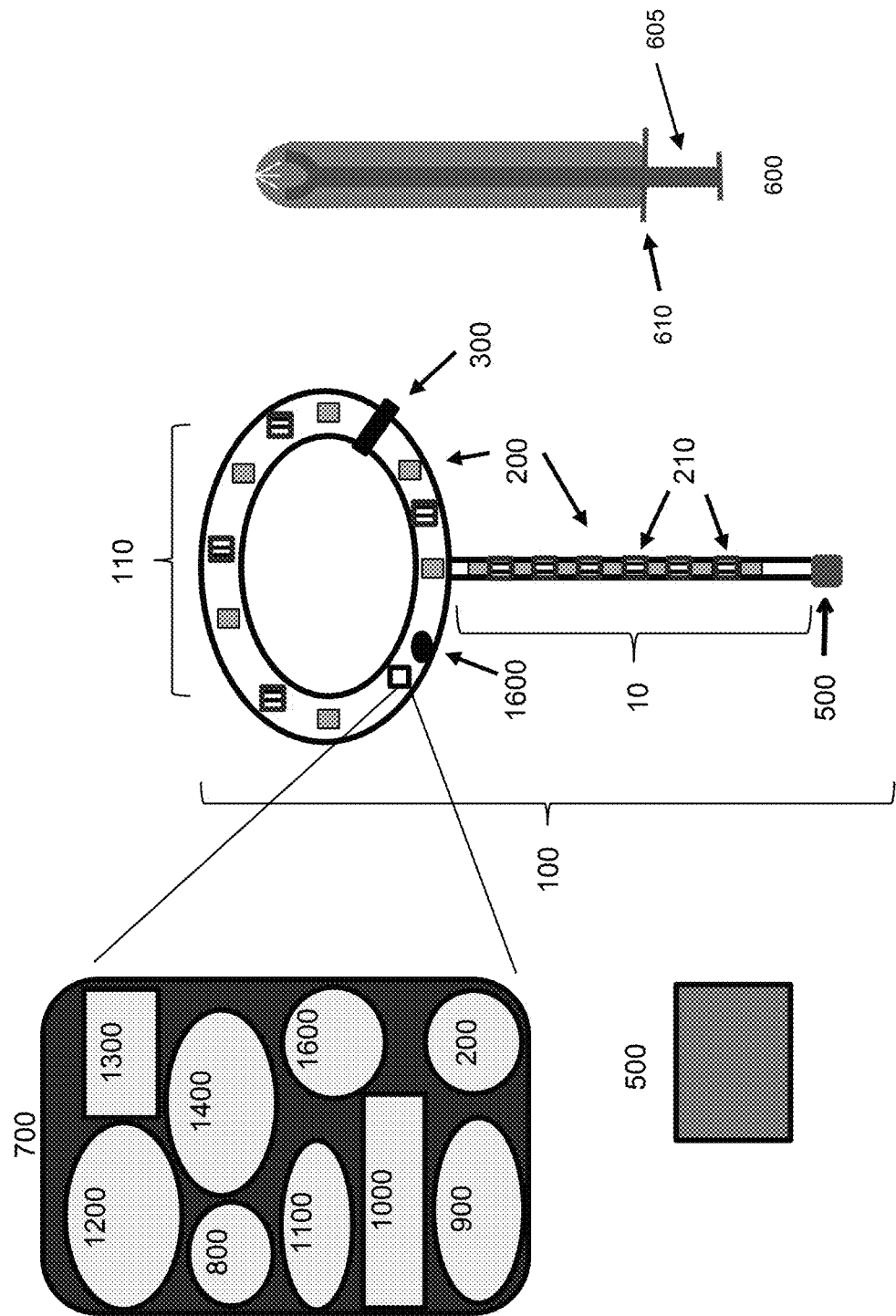

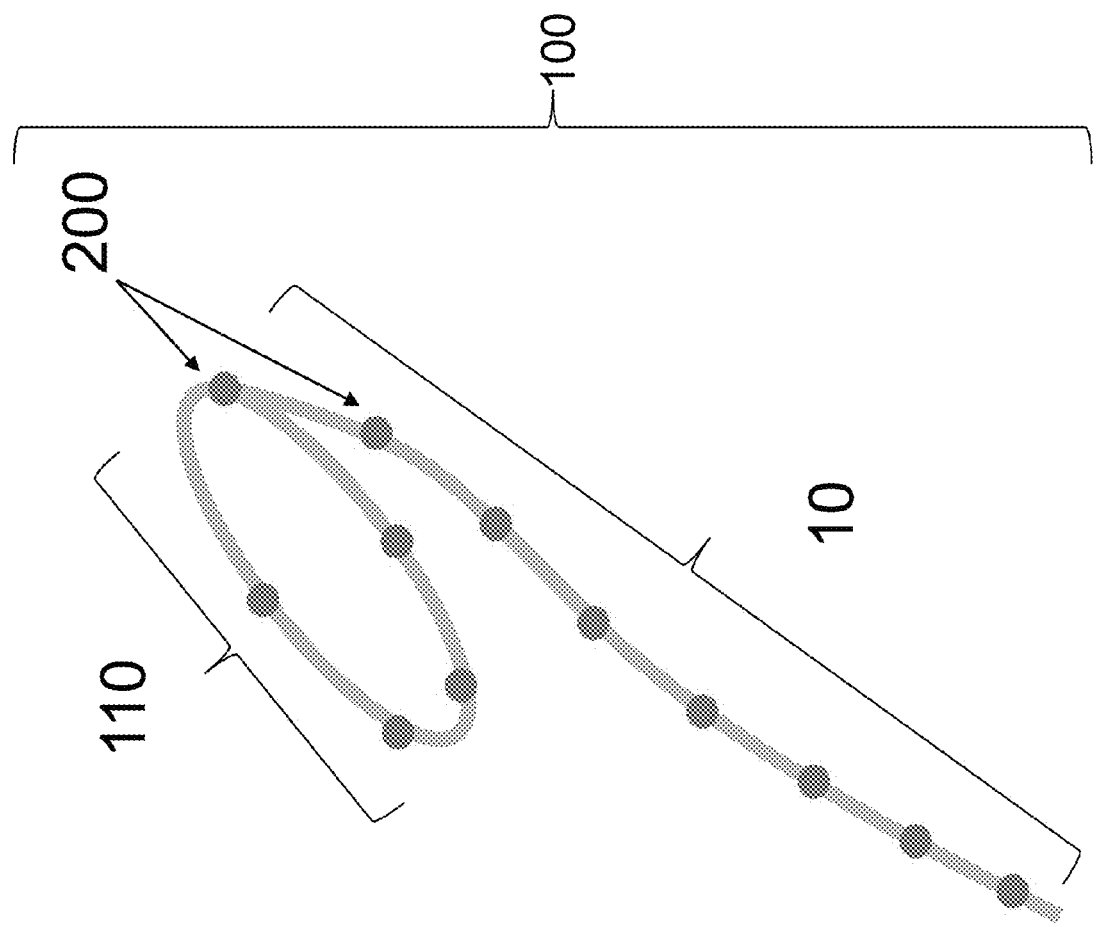

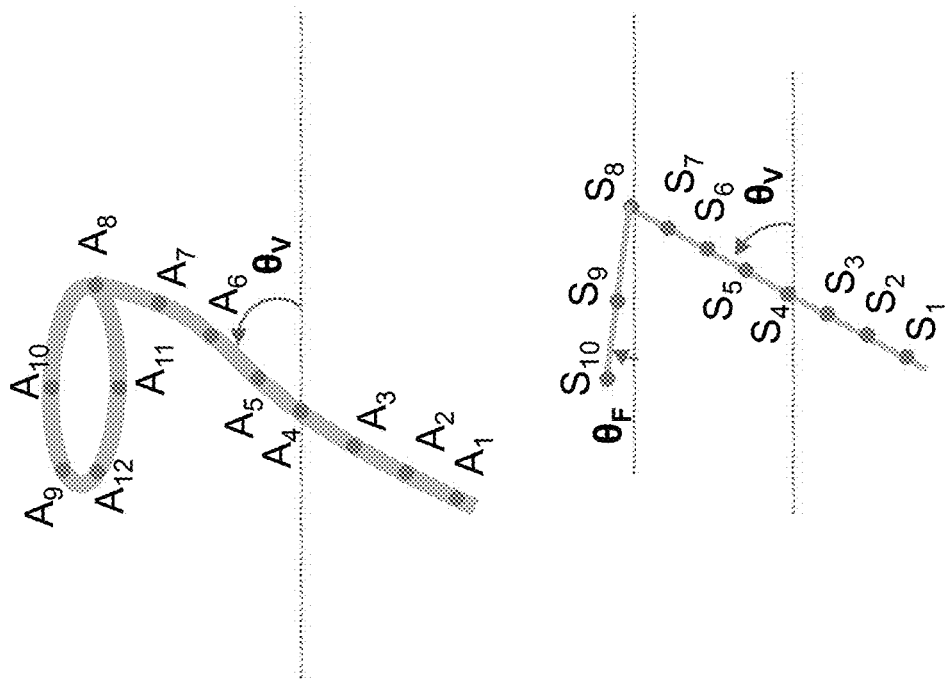
FIG. 3B
FIG. 3D
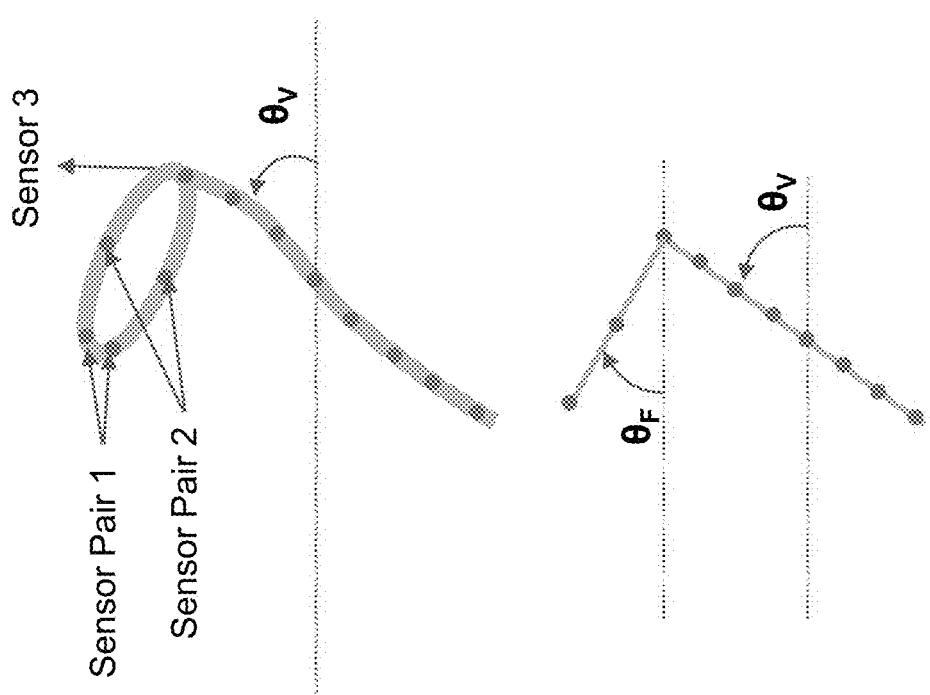
FIG. 3A
FIG. 3C

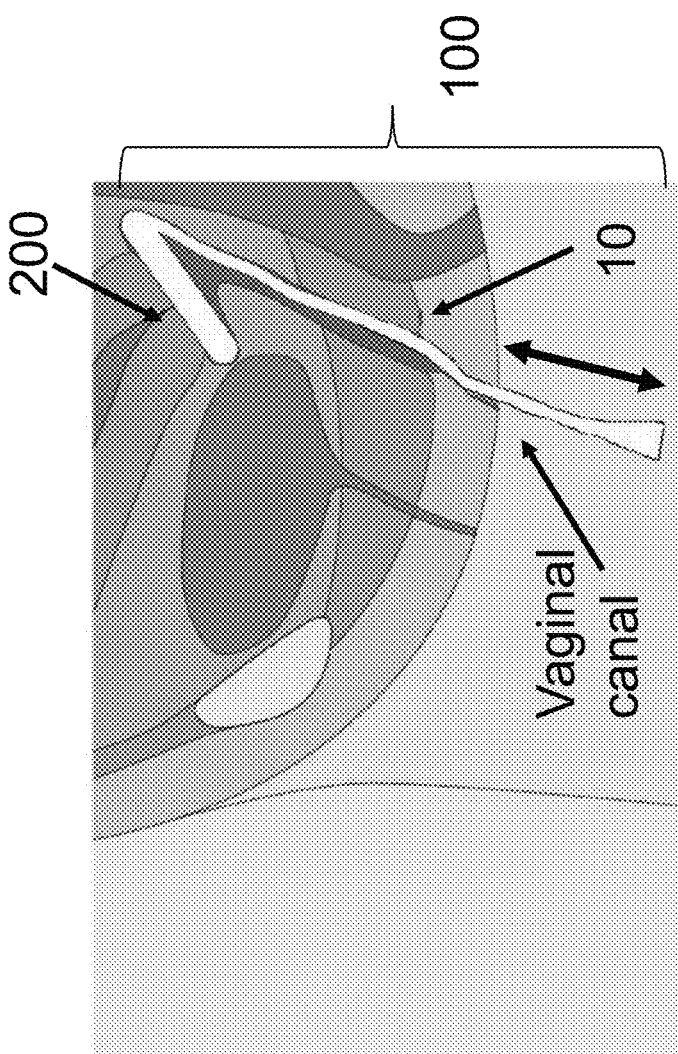

DEVICES, SYSTEMS, AND METHODS FOR TREATING URINARY AND FECAL INCONTINENCE

BACKGROUND

Urinary and fecal incontinence are a group of conditions that occur predominantly in women and that are associated with weakened (e.g., hypotonic) or tense (e.g., hypertonic) pelvic floor (PF) muscles. Many common factors contribute to the weakening or tightening of the pelvic floor muscles in women, such as, for example, pregnancy, vaginal childbirth, pelvic surgery, aging, genetic predisposition, neurological disease, and weight gain. In the United States, pelvic floor disorders (PFDs) occur in 24% of women, with 16% of women experiencing urinary incontinence (UI), 3% experiencing pelvic organ prolapse (POP), and 9% experiencing anal or fecal incontinence (FI). Current methods of treatment include electrical stimulation therapy and neuromodulation to nerves that innervate the bladder and muscles that manipulate the pelvic floor. These therapies can be challenging to implement due to difficulties associated with positioning of the neuromodulation devices, as well as challenges with identifying women likely to be responsive to such treatment.

Accordingly, new devices, systems, and methods are needed for treating PFDs, such as UI and FI, and for enhancing the treatment effect of, and diagnosing the need for, electrical stimulation therapies to treat UI and FI.

SUMMARY OF THE INVENTION

In one aspect, the invention features a system comprising an intravaginal device comprising one or more sensors and a medical device comprising an implantable lead configured to deliver electrical stimulation to a sacral nerve. The intravaginal device may include a plurality of sensors (e.g., MEMS accelerometers) located along a length of the device. The intravaginal device may include a main body having an outer edge configured to contact a vaginal wall or vaginal fornix and an internal diameter sized to encircle a cervix or vaginal cuff and a tether connected to the main body. The intravaginal device may include 2 to 50 (e.g., 2, 3, 4, 5, 10, 15, 20, 25, 30, 35, 40, 45, or 50) sensors. The tether may include 2 to 10 (e.g., 1, 3, 4, 5, 6, 7, 8, 9, or 10) sensors and the main body may include at least 1, (e.g., 2 to 6, e.g., 2, 3, 4, 5, or 6) sensors. One of the sensors may be shared by the main body and the tether.

The main body may have a horseshoe form of cup-shaped form. The length of the tether may be about 3 cm to about 50 cm (e.g., about 25.5 cm). The circumference of the main body may be about 10 cm to about 50 cm (e.g., about 27 cm, e.g., 27.6 cm). The intravaginal device may include two or more sensors on the tether that are separated on the tether by a distance of about 0.5 cm to about 5 cm (e.g., 1.6 cm).

The intravaginal device or the medical device may include a transmitter and/or receiver for communicating data to an electronic device or to the medical device. The transmitter or receiver may be a radio frequency transmitter or receiver, and it may be used to wirelessly communicate the data to the electronic device, intravaginal device, and/or the medical device. The transmitter and/or receiver may be configured for use with a Bluetooth and/or Wi-Fi enabled electronic device. The intravaginal device and the electrical device may be configured to communicate with each other during a treatment or diagnostic regimen.

The electronic device (e.g., computer, tablet, smartphone, or smart watch) may include a display (e.g., graphical user interface, e.g., touch user interface.

The implantable lead of the medical device may include one or more collapsible projections (e.g., tines) configured to anchor the lead to surrounding tissue. The intravaginal device and/or the medical device may include a battery to power the device. The medical device may further include a processor configured to receive input from a user. The medical device may include a transmitter and/or receiver for communicating data to the electronic device or to the intravaginal device. The medical device may comprise one or more electrodes and/or a pulse generator. Additionally, the medical device may include a plurality of implantable leads (e.g., 2, 3, 4, 5, 6, 7, 8, 9, or 10). The medical device may generate or modulate (e.g., increase or decrease the strength of) an electrical signal in response to an input signal from the intravaginal device or the electronic device.

In another aspect, featured is a method of treating urinary or fecal incontinence in a subject using the system of any of the above embodiments by a) electrically stimulating a sacral nerve of the subject with the medical device and b) detecting movement of one or more pelvic floor muscles of the subject during electrical stimulation using the intravaginal device. The method may further include inserting the intravaginal device and/or installing the medical device near the sacral nerve of the subject prior to treatment. Steps a) and b) may be repeated one or more times during treatment. These steps may be used to optimize the method of treatment by moving the implantable lead of the medical device (e.g., to a new target location) to increase the effect of the electrical stimulation.

The method may further include obtaining positional data from the one or more sensors. The positional data may be processed to determine an occurrence of the pelvic floor movement. This processed data can be used to provide feedback to the medical device regarding the pelvic floor movement. The medical device may be activated to stimulate the sacral nerve based on feedback from the intravaginal device or the electronic device. The feedback may be determined from positional data of the one or more sensors of the intravaginal device.

In another aspect, featured is a method of detecting proper placement of an implantable lead of a medical device configured to deliver electrical stimulation to a sacral nerve of a subject by: a) detecting movement of one or more pelvic floor muscles of the subject by an intravaginal device comprising one or more sensors during the electrical stimulation of the sacral nerve of the subject by the medical device, and b) determining whether the medical device is properly placed in the subject based on the movement of the intravaginal device in step a).

In another aspect, featured is a method of determining treatment efficacy of a subject with urinary or fecal incontinence using a medical device configured to deliver electrical stimulation to a sacral nerve of the subject by: a) detecting movement of one or more pelvic floor muscles of the subject by an intravaginal device comprising one or more sensors during the electrical stimulation of the sacral nerve of the subject by the medical device, and b) determining the efficacy of treatment of the urinary or fecal incontinence of the subject by the medical device based on the movement of the intravaginal device in step a).

In another aspect, featured is a method of identifying a subject as responsive to treatment for urinary or fecal incontinence with a medical device configured to deliver electrical stimulation to a sacral nerve of the subject by: a)

detecting movement of one or more pelvic floor muscles of the subject using an intravaginal device comprising one or more sensors during the electrical stimulation of the sacral nerve of the subject by the medical device, and determining the subject to be responsive to the medical device based on the movement of the intravaginal device in step a).

Any of the methods described herein may further include treating the subject for urinary or fecal incontinence by administering (e.g., repeatedly) electrical stimulation to the sacral nerve of the subject with the medical device. The subject may have an overactive bladder or urgency incontinence.

Definitions

As used herein, the singular form "a," "an," and "the" includes plural references unless indicated otherwise.

As used herein, the terms "about" and "approximately" mean+/−10% of the recited value.

As used herein, the phrase "approximately circumferentially surround a cervix or a vaginal cuff" refers to the form of an intravaginal device, such that the form is capable of encircling and/or cupping the cervix or vaginal cuff.

As used herein, the term "in proximity to" and "proximal" refers to a location near (e.g., about 0.01-5 mm from, or adjacent to, the tissue surface surrounding the cervix or vaginal cuff) the tissues of the vagina surrounding the cervix or vaginal cuff of a subject at which an intravaginal device of the invention is positioned during treatment (e.g., performance of pelvic floor lifts (PFLs) and/or pelvic floor relaxations (PLRs)).

As used herein, the term "feedback" or "biofeedback" refers to information that can be used to train an individual to change physiological activity (e.g., pelvic floor muscle function) for the purpose of improving health and performance (e.g., treating, reducing, and/or preventing the occurrence of or the symptoms of a pelvic floor disorder (PFD)). (Bio)Feedback may also include information collected by an intravaginal device of the invention during daily monitoring, e.g., in substantially real-time, while a user performs her daily activities. The information can be reviewed substantially in real-time or can be accessed for review at a later time. Instruments, such as an intravaginal device of the invention can be used to measure physiological activity, such as muscle activity (e.g., movement and pressure), vaginal pressure, muscle quality, and vaginal canal pH, temperature, and humidity, and to provide this information as biofeedback to the individual. Instruments, such as an intravaginal device of the invention can also be used to measure the level of a molecule, e.g., the level of a hormone and/or the level of a toxin, and to provide this information as biofeedback to the individual. The presentation of this information to the individual can be by a visual, audible, or tactile signal, and can support a desired physiological change (e.g., improved pelvic floor muscle strength, control, and quality). Information obtained by an intravaginal device can produce (bio)feedback that can be used to determine whether electrical stimulation of a sacral nerve of a subject is treating, or is sufficient to treat, UI or FI of the subject, or to activate or modulate (e.g., increase or decrease the strength and/or duration) of the electrical stimulation of the sacral nerve of the subject (e.g., during treatment for UI or FI).

As used herein, the term "biocompatible material" refers to materials that are not harmful or toxic to living tissues.

As used herein, the term "calibration period" refers to the process of determining a baseline set of measurements from the sensors positioned within the intravaginal device during a period of use of the intravaginal device by an individual, such that the baseline set of measurements characterize the health (e.g., strength, muscle quality, condition) of the individual's pelvic floor muscles prior to or at the start of a treatment program. The baseline set of measurements collected during the calibration period can be used to calculate and/or determine the progress of an individual through a treatment program.

As used herein, the term "continence" is defined as the ability to refrain from or to retain a bodily discharge (e.g., urination, defecation, or passage of flatus).

As used herein, the term "incontinence" is defined as the inability or reduced ability (e.g., reduced by 10%, 20%, 30%, 40%, 50%, 60%, 70%, 80%, 90%, or 100%) to refrain from or to retain a bodily discharge (e.g., urination, defecation, or passage of flatus).

As used herein, the term "detection" means the action or process of identifying information, e.g., the activation and/or the relaxation of a pelvic floor muscle. Detection can occur from a direct or indirect source (e.g., a sensor).

As used herein, "delaying progression" of a disorder or disease means to defer, hinder, slow, retard, stabilize, and/or postpone development of the disease or disorder (e.g., a pelvic floor disorder (PFD)). This delay can be of varying lengths of time, depending on the history of the disease and/or individual being treated. As is evident to one skilled in the art, a sufficient or significant delay can, in effect, encompass prevention, in that the individual does not develop the disease or disorder. For example, a PFD after vaginal childbirth may be delayed and/or prevented.

As used herein, the term "diagnosis" refers to the identification or classification of a disease or condition (e.g., a pelvic floor disorder). For example, "diagnosis" may refer to identification of a particular type of PFD.

A "disorder" is any condition that would benefit from treatment including, but not limited to, chronic and acute disorders or diseases including those pathological conditions which predispose the subject to the disorder in question.

As used herein, the term "monitoring" refers to a use of an intravaginal device of the invention to collect, track, and/or store data, e.g., data obtained from sensor(s) of the intravaginal device, as described herein. The monitoring occurs, e.g., when the intravaginal device is positioned within the vaginal cavity of a user and/or when the intravaginal device is used during a treatment period (e.g., during the performance of a series of pelvic floor exercise (e.g., a pelvic floor lift and/or relaxation)). The monitoring may also occur, e.g., substantially in real-time while a user performs her daily activities. This feature allows the user, effectively in real-time, to alter activities or behaviors that cause pelvic floor damage or to continue activities or behaviors that improve pelvic floor health. Alternatively, data stored by the device during monitoring can be accessed by the user at a later time (e.g., 30 minutes, 1 hour, 2 hours, 3 hours, 4 hours, 5 hours, 6 hours, 12 hours, 24 hours, or more after activities monitored by the device) for analysis of whether the activity or behavior had a positive or negative effect on pelvic floor health. The process of monitoring can include obtaining sensor data (e.g., measurements) that can be used to describe an individual's pelvic floor muscle movement, pressure, strength, and/or quality. Additionally, vaginal conditions including, but not limited to, shape, size, temperature, pH, and/or moisture level may also be monitored by an intravaginal device of the invention. An intravaginal device of the invention may also be configured to detect the level of a molecule, e.g., the level of a hormone and/or the level of a toxin. Monitoring also includes detecting urinary or fecal urgency based on the detection of an angle of movement, or a change in an angle of movement, of an intravaginal device (e.g., relative to a baseline angle or a predetermined threshold).

As used herein, the terms "pelvic floor lift" and "PFL" refers to a movement of the pelvic floor (e.g., the muscle fibers of the levator ani (e.g., the pubococcygeus, ileococcygeus, coccygeus, and puborectalis muscles) and the associated connective tissues which span the area in a spherical form from the pubic bone anteriorly to the sacrum posteriorly and to the adjoining bony structure joining these two bones, which is characterized by an upward movement (e.g., a lifting movement, such as a movement in the cranial direction) of the pelvic floor. The movement of the pelvic floor during a PFL is a distinctly-described component of the collective action of the entire pelvic floor (e.g., the levator ani, urethral and anal sphincters, bulbocavernosus, ischiocavernosus, superficial tranverse perineal muscles) whereby the combined lifting and circumferentially-directed squeezing action is produced when all muscles are activated simultaneously. A PFL may involve the selective engagement of the levator ani component of the pelvic floor.

As used herein, the terms "pelvic floor relaxation" and "PFR" refers to a movement of the pelvic floor (e.g., the muscle fibers of the levator ani (e.g., the pubococcygeus, ileococcygeus, coccygeus, and puborectalis muscles) and the associated connective tissues which span the area in a spherical form from the pubic bone anteriorly to the sacrum posteriorly and to the adjoining bony structure joining these two bones), which is characterized by a relaxation (e.g., a downward movement, such as a movement in the caudal direction) of the pelvic floor. The movement of the pelvic floor during a PFR is distinct from the concentric contraction (e.g., shortening contraction) of the PFL, and represents the lengthening or relaxation of the muscle fibers.

As used herein, "real-time" refers to the actual time during which an event, such as a daily activity, occurs.

As used herein, "sensor data" refers to measurements (e.g., any one or more of measurements of pelvic floor muscle movement, pelvic floor muscle quality, pelvic floor muscle strength, pressure, and measurements of other vaginal conditions, such as pH, temperature, and/or moisture), which characterize an individual's pelvic floor health and are obtained by a sensor(s), as described herein, of an intravaginal device of the invention. Sensor data may also be collected that relate a pelvic floor movement to, e.g., urinary or fecal incontinence or urge. These data can be used, e.g., to diagnose urinary or fecal incontinence, thereby identifying a subject as having a need for neuromodulation of the sacral nerve, or to determine when, at what duration, or at what strength, a subject is in need of neuromodulation of the sacral nerve (e.g., to treat or reduce UI or FI or urge), or to determine whether a neuromodulation device has been implanted (e.g., optimally) in contact with the sacral nerve of a subject in order to treat or reduce UI or FI or urge.

As used herein, "radio frequency" refers to electromagnetic waves that have a frequency in the range from $10^3$ Hz to $10^{12}$ Hz.

As used herein, a "subject," "patient," or "individual" is a human, in particular, a female.

As used herein, the terms "reducing" and "inhibiting" are defined as the ability to cause an overall decrease of about 10%, 20%, 30%, 40%, 50%, 60%, 70%, 75%, 80%, 85%, 90%, 95%, or more. Reduce or inhibit can refer, for example, to the symptoms of the pelvic floor disorder (PFD) being treated.

As used herein, the term "treating" refers to providing electrical stimulation to the sacral nerve of a subject in need thereof for therapeutic purposes (e.g., to treat or reduce the likelihood of urinary or fecal incontinence, or urge associated therewith), in particular in conjunction with the use of a device (e.g., an intravaginal device), system, or method described herein. "Treating" may also refer to the use of an intravaginal device to assess whether a subject has, or is in need of, electrical stimulation to the sacral nerve of a subject (e.g., to treat or reduce the likelihood of urinary or fecal incontinence, or urge associated therewith). To "treat disease" or use for "therapeutic treatment" includes administering treatment to a subject already suffering from a disease to improve or stabilize the subject's condition. To "prevent" or "reduce likelihood of developing" disease refers to prophylactic treatment of a subject who is not yet ill or symptomatic, but who is susceptible to, or otherwise at risk of, a particular disease, such as a urinary or fecal incontinence.

As used herein, and as well understood in the art, "treatment" is an approach for obtaining beneficial or desired results, such as clinical results. Beneficial or desired results can include, but are not limited to, alleviation or amelioration of one or more symptoms or conditions; diminishment of extent of disease, disorder, or condition; stabilization (i.e., not worsening) of a state of disease, disorder, or condition; prevention of spread of disease, disorder, or condition; delay or slowing the progress of the disease, disorder, or condition; amelioration or palliation of the disease, disorder, or condition; and remission (whether partial or total), whether detectable or undetectable. "Palliating" a disease, disorder, or condition means that the extent and/or undesirable clinical manifestations of the disease, disorder, or condition are lessened and/or time course of the progression is slowed or lengthened, as compared to the extent or time course in the absence of treatment.

As used herein, "female urogenital system" or "urogenital system" refers to the organ system of the female reproductive system, which includes, e.g., the Bartholin's glands, cervix, clitoris, clitoral frenulum, clitoral glans (glans clitoridis), clitoral hood, fallopian tubes, labia, labia majora, labia minora, frenulum of labia minora, ovaries, skene's gland, uterus, vagina, and vulva; the urinary system, which includes, e.g., the kidneys, ureters, bladder, and the urethra; and the surrounding and supporting nerves and musculature.

As used herein, "vaginal cuff" refers to the sutured tissue at the top of the vaginal canal remaining after removal of the cervix (e.g., during a hysterectomy).

As used herein, "pelvic organ prolapse" or "POP" refers to the descent of one or more aspects of the vagina and uterus, such as the anterior vaginal wall, posterior vaginal wall, the uterus (cervix), or the apex of the vagina (vaginal vault or cuff scar after hysterectomy). This descent allows nearby organs to herniate into the vaginal space, which is commonly referred to as cystocele, rectocele, or enterocele. Pelvic organ prolapse may be asymptomatic or associated with one or more symptoms, such as, e.g., pressure with or without a bulge, sexual dysfunction, and disruption of normal lower urinary tract or bowel function. Pelvic organ prolapse can be defined using patient-reported symptoms or physical examination findings (e.g., vaginal bulge protruding to or beyond the hymen). Most women feel symptoms of POP when the leading edge reaches 0.5 cm distal to the hymenal ring.

As used herein, "urinary incontinence" refers to the leaking of urine from the bladder. Incontinence can range from leaking just a few drops of urine to complete emptying of the bladder. Urinary incontinence can be divided into three main types: stress urinary incontinence (SUI), urgency urinary incontinence, and mixed incontinence. Stress urinary incontinence is leaking urine when coughing, laughing, or sneezing. Leaks can also happen when a woman walks, runs, or exercises. Urgency urinary incontinence is a sudden strong urge to urinate that is hard to stop. Women with this type of urinary incontinence may leak urine on the way to the bathroom. Mixed incontinence combines symptoms of both stress and urgency urinary incontinence.

As used herein, "pelvic floor" refers to the muscular area at the base of the abdomen attached to the pelvis.

As used herein, "pelvic floor disorders" or "PFDs" refers to disorders affecting the muscles and tissues that support the pelvic organs. These disorders may result in loss of control of the bladder or bowels or may cause one or more pelvic organs to drop downward, resulting in prolapse.

BRIEF DESCRIPTION OF THE DRAWINGS

The patent or application file contains at least one drawing executed in color. Copies of this patent or patent application with color drawing(s) will be provided by the Office upon request and payment of the necessary fee.

FIG. 1 is a schematic drawing showing an intravaginal device 100 that has a main body 110 (which may have, e.g., a ring form or an incomplete ring form), insertion tool 600 (applicator and tool for removal), tether 10, and transmitter/receiver box 500. Tether 10 may be non-detachable from main body 110 or, if detachable from main body 110, is configured for easy removal. Intravaginal device 100 contains circuit board 700, either in main body 110 or tether 10, which connects sensor(s) 200 (e.g., accelerometers, such as MEMS sensors), battery 800, microcontroller 900, internal transmitter/receiver 1000, data storage component 1100, sensory output component 1200, wireless communication antennae 1300, authentication chip 1400 (e.g., an Apple product authentication chip), and ON/OFF switch 1600. Intravaginal device 100 may also contain molded wing 300 for the reduction of rotation and slippage of the device within the vaginal canal of the individual. Intravaginal device 100 may also contain energy transmitters 210 (shown as hatched boxes) either on main body 110 or tether 10. Insertion tool 600 may also include plunger 605, e.g., for insertion in the vagina, and tab 610, which can be used to hold applicator 600 in place as intravaginal device 100 is removed. Any of the above components may or may not be present on intravaginal device 100 (e.g., energy transmitters 210, such as RF transmitters are optional).

FIG. 2 is a schematic drawing showing intravaginal device 100 with main body 110 and tether 10. Main body 110 as shown contains 5 sensors 200 (e.g., accelerometers, such as MEMS sensors) and tether 10 as shown contains 8 sensors 200. One sensor 200 is shared by both main body 110 and tether 10.

FIGS. 3A-3D are schematic drawings showing a vaginal angle ($\theta_V$) and a fornix angle ($\theta_F$) referenced relative to intravaginal device 100 (e.g., when inserted into a vaginal canal of a subject). When positioned in a vaginal canal of a subject, sensor pair 1 of intravaginal device 100 shown in FIG. 3A would reside in the anterior fornix, while the sensors of sensor pair 2 each would reside in a lateral fornix. A single remaining sensor, sensor 3, would reside in the posterior fornix, this last being also part of the tether. FIG. 3B shows the anterior fornix sensors, labeled A9 and A12, the sensors in the lateral fornices, labeled A10 and A11, and the single posterior fornix sensor, labeled A8, which is shared by main body 110 and tether 10. Sensors exclusively on tether 10 are labeled A1-A7. The vaginal angle ($\theta_V$) is defined as the angle between the line of the tether (essentially demarcating the long axis of the vagina) and the line contained in a plane parallel to the virtual plane of the introitus, hereafter designated the "horizon." The fornix angle ($\theta_F$) is defined as the angle between the line connecting the anterior and posterior fornices (the anterior and posterior points of the main body) and the line of the horizon. FIG. 3C shows (1) that each sensor of the tether may be connected by a best-fit line and (2) the positions of the two sensors in the anterior fornix may be averaged; similarly, the positions of the sensors in the lateral fornices may be averaged, and a best fit line may be drawn from the posterior fornix to the anterior fornix. The vaginal angle ($\theta_V$) and fornix angle ($\theta_F$) are shown in both FIGS. 3C and 3D. In FIG. 3D, the points ("nodes") shown in FIG. 3C are labeled S1-S10. The sensors depicted are, e.g., accelerometers, such as MEMS sensors.

FIG. 4 is a schematic drawing showing insertion of intravaginal device 100 with main body 110 into the vaginal canal and fornices. The bidirectional arrow indicates a portion of the device, which is optional, that is outside of the introitus. Intravaginal device 100 may be configured to exclude this external portion, such that intravaginal device 100 resides completely within the vagina. The length of the vagina can be determined by measuring the length of intravaginal device from main body 110 to the end of tether 10 at the point that extends to the introitus.

FIG. 5A shows the angles and spacing between each sensor in an intravaginal device, while FIG. 5B shows the recreated visual representation provided by a processing device based on the sensor data.

FIG. 5C shows a 3-axis accelerometer, FIG. 5D shows a 2-axis accelerometer, and FIG. 5E shows a rotated 2-axis accelerometer.

FIG. 6A shows the angle at rest before a pelvic floor lift, FIG. 6B shows an increase in the angle during a pelvic floor lift, and FIG. 6C shows an overlay of the angle of FIG. 6A on top of the recreated visual representation of the intravaginal device shown on a peripheral device.

FIG. 10A shows the sensor angle plotted as a function of time, and FIG. 10B shows the first derivative with respect to time of the data in FIG. 10A, showing a change in the sensor angle as a function of time.

DETAILED DESCRIPTION OF THE INVENTION

Figure 5B:
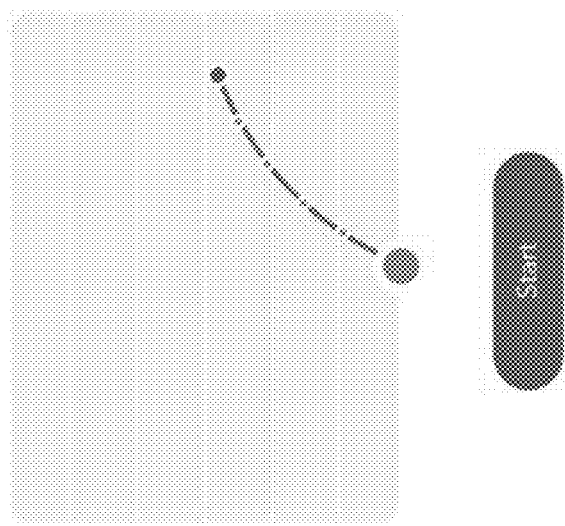
FIGS. 5A-5B are schematic drawings showing how a visual representation of the physical shape and motion of the intravaginal device can be analyzed for display on, e.g., a graphical user interface, by measuring the angles of each sensor in combination with the known spacing between sensors.
Figure 5A:
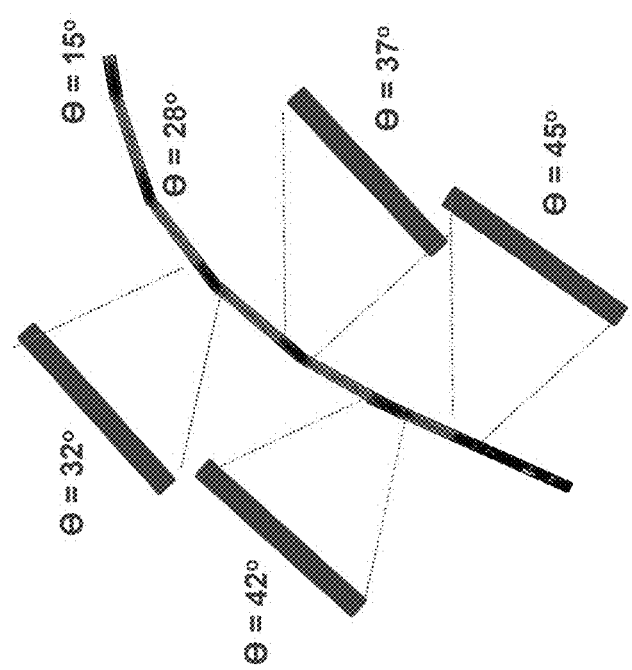
Figure 5E:
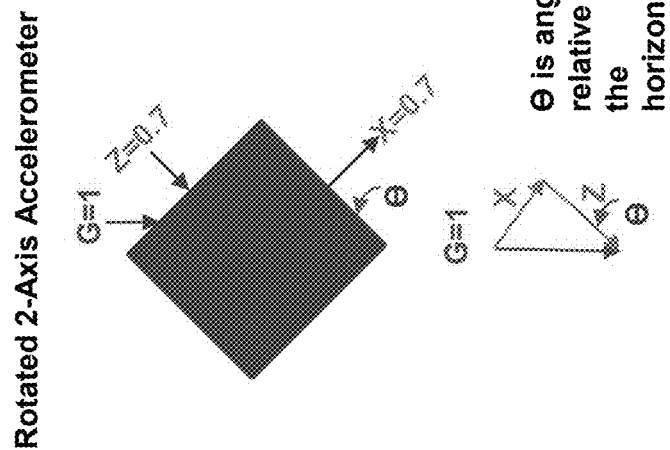
FIGS. 5C-5E are schematic representations showing how accelerometers measure angle and position based on the effect of gravity.
Figure 5D:
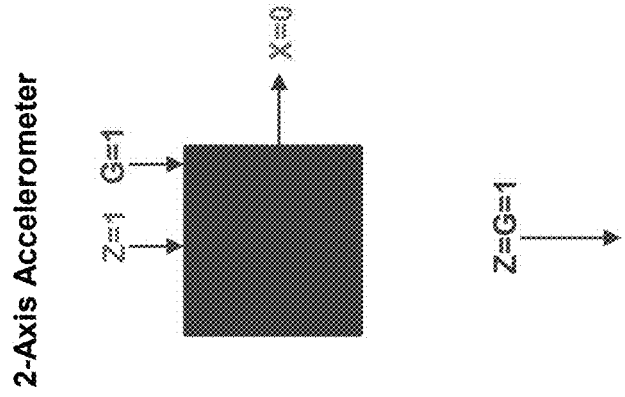
Figure 5C:
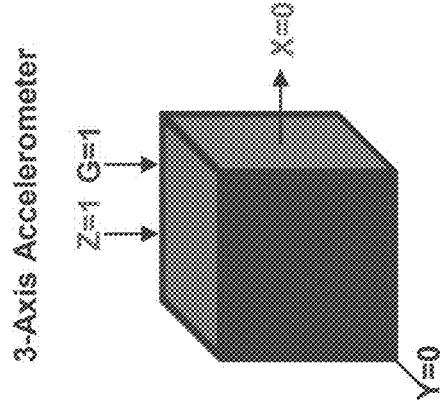

The invention features devices, systems, and methods for treating urinary and fecal incontinence in a subject (e.g., a female patient) by using an electrical stimulation device and an intravaginal device having one or more sensors. The electrical stimulation device may be a medical device that has one or more lead wire electrodes that are configured for implantation in the sacrum or near the sacral nerve (e.g., one or more of the S2, S3, or S4 nerves) of the subject to deliver an electrical stimulation that provides neuromodulation or nerve stimulation of the sacral nerve. By combining (e.g., in a system, e.g., wirelessly connected) the use of the implantable electrical stimulation device with an intravaginal device, the intravaginal device may be used to monitor pelvic floor movements before, during, or after stimulation to assess and evaluate the efficacy and course of treatment using the electrical stimulation device.

The intravaginal device of the system can be used to monitor pelvic floor movements of a subject using one or more sensors (e.g., accelerometers). The system may also include peripheral devices comprising a computer processing unit configured to collect data from the sensors on the intravaginal device and transform the data into useful physiological indicia representative of a treatment status of the subject. The data may then be presented to the subject or another individual (e.g., a health care provider) to provide feedback or alerts regarding the physiological indicia. The peripheral device may be configured with one or more algorithms that analyzes positional data from the sensors of the intravaginal device. The intravaginal device may be configured to provide monitoring of the overall health status of a subject's urogenital system and pelvic floor (e.g., the muscle fibers of the levator ani, e.g., the pubococcygeus, ileococcygeus, coccygeus, puborectalis muscles and associated connective tissues) in substantially real-time, e.g., while the subject performs her daily activities or during treatment with an electrical stimulation device. The device can also provide biofeedback to the subject before, following, or during use with an electrical stimulation device. The device and system can be configured to assess the pelvic floor movements of the subject to identify movements that correspond to effective treatments with the electrical stimulation device such that the subject achieves therapeutic goals, such as reduced urinary and/or fecal incontinence occurrence and/or severity. Exemplary intravaginal devices, systems, and methods for training, visualizing, and diagnosing the health state of pelvic floor muscles of a subject have been extensively described in International Publication Nos. WO2013116310, WO2015103629, and WO2018023037, International Application Nos. PCT/US2018/057811 and PCT/US2019/027168, and U.S. Application Nos. 62/577,811, 62/625,301, and 62/657,585, the disclosures of which are hereby incorporated in their entirety.

The intravaginal device and electrical stimulation device may also be used alone or in combination with a peripheral device that is configured to receive sensor data from the intravaginal device to monitor (e.g., with one or more sensors as described herein) the overall treatment status of a subject, including the subject's urogenital system and pelvic floor (e.g., the muscle fibers of the levator ani (e.g., the pubococcygeus, ileococcygeus, coccygeus, puborectalis muscles and associated connective tissues)) in substantially real-time, e.g., while a subject performs her daily activities or during electrical stimulation treatment. The peripheral device may be configured with a processing unit that can transform or utilize sensor data received from the intravaginal device during electrical stimulation therapy to provide feedback to the subject (or a health care provider) regarding whether the treatment is efficacious. For example, the peripheral device can process the sensor data to produce a baseline that can be used for comparison to sensor data obtained at a future time to provide feedback to the subject (e.g., an alert) regarding whether a treatment is beneficial or detrimental to her health status. In addition, or alternatively, the peripheral device can process the sensor data and compare the result to a previously established or predetermined baseline and based on the comparison can provide feedback to the subject (e.g., an alert) regarding whether a treatment is beneficial or detrimental to her health status. A subject may review the feedback in substantially real-time (e.g., the subject may receive an alert noting her treatment status or a change in her treatment status) or she may review feedback at a later time of her choosing, e.g., by accessing feedback stored in the memory of the intravaginal device, in the memory of a peripheral device (e.g., a computer, phone (e.g., as an alert, an email, or a text message), or tablet that is or can be connected to the intravaginal device), and/or in the memory of a remote electronic device (e.g., a web-located and/or cloud-based database connected to the intravaginal device). Feedback may be presented as a summary, e.g., as one or more graphs, showing how a subject's daily treatment activities and detected vaginal conditions (e.g., pH, temperature, pressure, moisture level, muscle movement (e.g., a PFL and/or a PFR), muscle quality, muscle strength, and/or the level of a molecule, such as a hormone and/or toxin) affected the overall health status of a subject's urogenital system and/or pelvic floor over time (e.g., over a period of time, such as a period of about 1 to about 60 minutes, about 1 to about 24-hours, about 1 to about 31 days, about 1 to about 24 months, or about 1 or more years). Daily monitoring, as described herein, may help a subject to optimize treatment with an intravaginal device and/or an electrical stimulation device as described herein, to avoid the development and/or reoccurrence of urinary and/or fecal incontinence, and/or to inform a subject with respect to the treatment status of the female pelvic floor or urogenital tract.

Intravaginal Device

The intravaginal device described herein, which has a main body and/or a tether, can be used as part of a system for monitoring pelvic floor movements during, before, or after electrical stimulation treatment. The device is inserted into the vagina of a subject, such that the intravaginal device is positioned proximal to the cervix or vaginal cuff, and is configured to treat, inhibit, and/or reduce the development of or progression of a pelvic floor disorder (e.g., urinary incontinence (UI), stress urinary incontinence (*SUI*), urge incontinence, mixed stress and urge urinary incontinence, dysuria (e.g., painful urination), anal or fecal incontinence, pelvic organ prolapse (POP) (e.g., urethra (urethrocele), bladder (cystocele), or both (cystourethrocele), vaginal vault and cervix (vaginal vault prolapse), uterus (uterine prolapse), rectum (rectocele), sigmoid colon (sigmoidocele), and small bowel (enterocele)), pelvic pain, sexual dysfunction (e.g., coital incontinence, a sexual pain disorder, dyspareunia, vaginismus, and/or impaired sexual arousal), weak or impaired pelvic floor muscle function, post-labor issues or damage, pain and/or incontinence caused by damage to a lumbosacral nerve, and nonrelaxing pelvic floor dysfunction) in an subject when used according to the methods described herein.

The intravaginal device has a main body with an outer edge configured to contact all or a portion of the vaginal wall surrounding the cervix or vaginal cuff and has an internal diameter sized to approximately circumferentially surround a cervix or a vaginal cuff. The internal and external diameter of the intravaginal device may be approximately equivalent, with the difference in their length being attributable to the thickness of the material used to fabricate the intravaginal device. The internal and/or external diameter may be about 20 mm to about 80 mm (e.g., about 20, 25, 30, 35, 40, 45, 50, 55, 60, 65, 70, 75, or 80 mm) in length. In some instances, the internal diameter of the intravaginal device may be smaller than the external diameter. In some instances, the intravaginal device can be fabricated with a tether (e.g., a flexible cord or ribbon) that can be optionally attached, e.g., by a removable or permanent connection, to the main body of the intravaginal device, The tether can have a length of up to about 14 cm (e.g., 1, 2, 3, 4, 5, 6, 7, 8, 9, 10, 11, 12, 13, or 14 cm) and a width of about 1 to about 10 mm (e.g., 1, 2, 3, 4, 5, 6, 7, 8, 9, or 10 mm). Different form factors of the device include a ring (round or oval), a ring with a tether, and an incomplete ring (e.g., a horseshoe configuration).

The intravaginal device (e.g., main body and/or tether) can be made from a flexible, biocompatible material, such as a material selected from the group consisting of, but not limited to, silicone, polyethylene, polypropylene, polystyrene, polyester, polycarbonate, polyvinyl chloride, polyethersulfone, polyacrylate, hydrogel, polysulfone, polyetheretherketone, thermoplastic elastomers, poly-p-xylylene, fluoropolymers, rubber, and latex. The intravaginal device may be fabricated to be solid, hollow, and/or partially filled. Additionally, the intravaginal device may contain metal and/or plastic components, such as a core, ring, spring, and/or wire. The metal and/or plastic components may be used to provide additional tension (e.g., a pushing force) on the vaginal walls to maintain the position of the intravaginal device when inserted into an individual when incorporated into the main body of the intravaginal device. In some instances, the intravaginal device is fabricated out of silicone. However, other suitable materials may be used to fabricate the intravaginal device.

The main body of the intravaginal device may be cup-shaped and include an optional permeable or semi-permeable membrane, mesh, and/or perforated barrier in the central portion of the device (e.g., spanning the internal diameter). In other instances, the intravaginal device may be a sponge and may include a depression for cupping the cervix or vaginal cuff. In some instances, in which the intravaginal device has a donut shape, the intravaginal device may include an optional permeable or semi-permeable membrane, mesh, and/or perforated barrier. The barrier may extend across the internal diameter of the donut-shaped intravaginal device.

The outer edge of the main body of the intravaginal device may be configured to apply pressure, tension, adhesion, and/or suction to the vaginal wall to hold the position of the intravaginal device at a location proximal to the cervix or vaginal cuff of the individual. The pressure, tension, adhesion, and/or suction applied to the vaginal wall by the outer edge of the intravaginal device is of a sufficient strength to limit slippage, repositioning, or displacement of the intravaginal device from the vaginal canal of individual.

Additionally, the main body of the intravaginal device may include at least one (e.g., 1, 2, 3, 4, 5, 6, 7, 8, 9, 10, or more) feature for the purpose of stabilizing, orienting, and/or positioning the device within the body of the individual. The feature may be selected from the group consisting of a coating, a protrusion, and a texture. In some instances, the feature is a coating (e.g., a surface coating) containing one or more one (e.g., 1, 2, 3, 4, 5, 6, 7, 8, 9, 10, or more) biomaterials. In a particular instance, the coating may be provided, such as within a kit, in a sealed packet for the individual to apply to the intravaginal device prior to insertion. In some instances, the feature is a protrusion or a series of protrusions having the shape of a wing, sphere, bump, knob, raised lined, and/or raised dot. In some instances, the feature is a texture, such as a sticky, rough, grooved, or pitted surface texture. The main body may also include indicia (e.g., a protrusion, symbol, writing, or etching) identifying the cranial (e.g., top), caudal (e.g., bottom), anterior (e.g., front), posterior (e.g., back), right, and left sides of the intravaginal device. The intravaginal device should be positioned within the body of the individual such that the top side sits proximal to the top of the vaginal canal (e.g., proximal to the cervix or vagina cuff), and the anterior side faces the front of the body. Examples of features to aid in retention are a bulbous extrusion at the top or bottom of the device and a form having protruding arms. The retention features may be applied as in the devices shown or they can be applied as features to other devices described herein, The retention features may be useful for a device of the invention that is designed to remain inside a woman's vagina for an extended period of time (e.g., at least 10 minutes, 20 minutes, 30 minutes, 40 minutes, 50 minutes, 1 hour, 2 hours, 3 hours, 4 hours, 5 hours, 6 hours, 12 hours, 24 hours, 2 days, 3 days, 4 days, 5 days, 6 days, 1 week, 2 weeks, 3 weeks, 4 weeks, 1 month, 2 months, 3 months, 4 months, 5 months, 6 months, 7 months, 8 months, 9 months, 10 months, 11 months, 12 months).

The intravaginal device includes at least one (e.g., 1, 2, 3, 4, 5, 6, 7, 8, 9, 10, 20, or more) sensor within the main body (e.g., the substantially ring shaped form) and/or the tether that is configured to detect a muscle movement, e.g., a PFL and/or a PFR. In some instances, the sensor may be configured to detect a muscle movement, e.g., a PFL and/or a PFR, which is performed during a user's daily activities, in substantially real-time. Daily activities may be identified by the intravaginal device as either contributing positively or negatively to the overall health of a user's urogenital system and/or pelvic floor (e.g., the muscle fibers of the levator ani, e.g., the pubococcygeus, ileococcygeus, coccygeus, puborectalis muscles and associated connective tissues). In some instances, the at least one sensor (e.g., 1, 2, 3, 4, 5, 6, 7, 8, 9, 10, 20, or more sensors) may be selected from the group consisting of a movement sensor, an orientation sensor, an accelerometer, a gyroscope, a micro-electro-mechanical systems (MEMS) sensor, a G-sensor, a tilt sensor, a rotation sensor, a pressure sensor, a light detecting sensor, such as a LiDAR sensor, an EIM sensor, and combinations thereof. The device may also include a light generating component for use with the light detecting sensor, such as a LiDAR sensor. The device may also include an electrode for use with the EIM sensor. Additionally, the intravaginal device may include one or more sensors (e.g., 1, 2, 3, 4, 5, 6, 7, 8, 9, 10, 20, or more sensors) configured to detect, e.g., a level of or change in the level of muscle strength, muscle quality, a biomolecule (e.g., a hormone and/or a toxin), pH, temperature, and/or humidity.

In some instances, the sensors may be positioned in an arrangement similar to or in an arrangement different from those described in, e.g., International Publication Nos. WO2015103629A1, WO2016067023A1, and WO2016042310A1; U.S. Publication Nos. US20150032030A1, US20140066813A1, US20150151122A1, US20150133832A1, US20160008664A1, and US20150196802A1; and U.S. Pat. Nos. U.S. Pat. Nos. 8,983,627, 7,955,241, 7,645,220, 7,628,744, 7,957,794, 6,264,582, and 6,816,744, each of which is incorporated by reference herein. For example, two or more sensors, as described herein, may be placed around the longitudinal axis of the intravaginal device, e.g., in a circle or a spiral around the central-axis of the main body and/or tether of the intravaginal device, approximately at ±1°, 2°, 3°, 4°, 5°, 6°, 7°, 8°, 9°, 10°, 20°, 30°, 40°, 50°, 60°, 70°, 80°, 90°, 100°, 110°, 120°, 130°, 140°, 150°, 160°, 170°, 180°, 190°, 200°, 210°, 220°, 230°, 240°, 250°, 260°, or 270° relative to each other. Alternatively, or additionally, two or more sensors, as described herein, may be placed approximately 0.001 mm, 0.01 mm, 0.1 mm, 0.5 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 125 mm, 150 mm, 175 mm, 200 mm, 225 mm, 250 mm, 275 mm, 300 mm, 325 mm, 350 mm, or more apart, e.g., along the circumference of the main body and/or along the length of the tether of the intravaginal device. In some instances, the two or more sensors, as described herein, may be placed along the central-axis of the main body and/or tether of the intravaginal device. In some instances, the two or more sensors, as described herein, may be placed such that they are not on the central-axis, e.g., such that they are offset from the central axis of the main body and/or tether of the intravaginal device. In particular instances, such as when sensors are positioned within the tether, the main body may not contain a sensor. In other instances, when sensors are positioned within the tether the main body may also contain at least one (e.g., 1, 2, 3, 4, 5, 6, 7, 8, 9, 10, 20, or more) sensor. The at least one sensor (e.g., 1, 2, 3, 4, 5, 6, 7, 8, 9, 10, 20, or more sensors) may be selected from the group consisting of a movement sensor, accelerometer, gyroscope, micro-electro-mechanical systems (MEMS) sensor, G-sensor, tilt sensor, rotation sensor, a light detecting sensor, such as a LiDAR sensor, an EIM sensor, and combinations thereof. The device may also include an electrode and/or a light generating component. In some instances, the sensor is an accelerometer, such as a multiple-axis accelerometer. In other instances, the sensor is a gyroscope, such as a multiple-axis gyroscope. In yet other instances, the sensor is a MEMS sensor. Additionally, the intravaginal device may further include at least one (e.g., 1, 2, 3, 4, 5, 6, 7, 8, 9, 10, 20, or more) additional sensor within the main body and/or the tether selected from the group consisting of a pressure sensor, a muscle quality sensor, a muscle strength sensor, a biomolecule sensor (e.g., a hormone sensor and/or a toxin sensor), a temperature sensor, a humidity sensor, and a pH sensor. A sensor(s) can be positioned on the surface of the intravaginal device (e.g., on the surface of the main body and/or tether), such that all or a portion of the sensor(s), makes direct contact with the tissues of the vaginal walls and/or cervix or vaginal cuff of an individual. In some instances, the sensor(s) can be positioned about 0.001 mm, 0.01 mm, 0.1 mm, 0.2 mm, 0.3 mm, 0.4 mm, 0.5 mm, 0.6 mm, 0.7 mm, 0.8 mm, 0.9 mm, 1 mm, 1.5 mm, 2 mm, 2.5 mm, 3 mm, 3.5 mm, 4 mm, 4.5 mm, 5 mm, or more below the exterior surface (e.g., the surface that makes direct contact with the tissues of the vaginal walls and/or cervix or vaginal cuff of an individual) of the intravaginal device (e.g., the main body and/or tether of the intravaginal device). In some instances, the sensor can be positioned such that about 0.001 mm, 0.01 mm, 0.1 mm, 0.2 mm, 0.3 mm, 0.4 mm, 0.5 mm, 0.6 mm, 0.7 mm, 0.8 mm, 0.9 mm, 1 mm, 1.5 mm, 2 mm, 2.5 mm, 3 mm, 3.5 mm, 4 mm, 4.5 mm, 5 mm, or more of the sensor protrudes from the exterior surface of the intravaginal device (e.g., the main body and/or tether of the intravaginal device). Alternatively, the sensors can be positioned within the intravaginal device (e.g., within the main body and/or tether), such that the sensor does not directly contact the vaginal walls and/or cervix or vaginal cuff of an individual, but are positioned to detect motion as the user conducts a PFL or PFR.

As the intravaginal device (e.g., the main body and/or tether) can be fabricated to be solid, hollow, or partially filled, a sensor that does not make direct contact with the vaginal walls/and or cervix or vaginal cuff of a subject may be positioned at a depth within the solid material from which the intravaginal device (e.g., the main body and/or tether) was fabricated or within a hollow space of the intravaginal device (e.g., main body and/or tether). The sensor(s) may be evenly or unevenly positioned at intervals on or within the intravaginal device. The sensors within the intravaginal device (e.g., within the main body and/or tether) may be positioned such that when the intravaginal device is inserted into a user the sensors face the ventral direction (e.g., anterior direction).

The tether can be up to about 14 cm (e.g., 1, 2, 3, 4, 5, 6, 7, 8, 9, 10, 11, 12, 13, or 14 cm) in length and may be divided along its length into segments contain sensors. Sensors can be positioned along the length of the tether at even or uneven intervals, e.g., at an interval of about 1 to about 140 mm (e.g., 1, 2, 3, 4, 5, 6, 7, 8, 9, 10, 20, 30, 40, 50, 60, 70, 80, 90, 100, 110, 120, 130, or 140 mm). The location of a sensor within the tether may be identified on the outside of the device by the presence of indicia (e.g., a protrusion, symbol, writing, and/or etching) on the surface of the tether. The tether may be designed to be trimmed, e.g., by cutting with scissors, so that an individual can reduce the tether to a comfortable length. The indicia indicating the location of a sensor can help guide the individual to avoid cutting a sensor.

The intravaginal device (e.g., main body (e.g., the substantially ring shaped form) and/or tether) further includes a microcontroller within the substantially ring shaped form that is configured for receiving data from the sensor(s). The microcontroller may also be configured, or can include a separate component, for non-transiently storing data from the sensor(s). The microcontroller maybe connected to the sensor(s), e.g., by a wire and/or a circuit board. The wire and circuit board may be flexible or rigid.

The intravaginal device can also include a transmitter and receiver within main body (e.g., the substantially ring shaped form) and/or tether form for communicating wirelessly or via a detachable cable with an electronic device (e.g., a peripheral device, such as a handheld or portable device or a computer, such as a smartphone, tablet, or laptop). Alternatively, the transmitter and receiver may be located in an external housing and connected to the intravaginal device wirelessly or by a detachable cable. The transmitter and receiver can be connected directly or indirectly to the microcontroller, sensor(s), and/or circuit board. The transmitter and receiver can be configured for use with a Bluetooth-, and/or Wi-Fi-, and/or RF-enabled electronic device. Information collected by the sensor(s) may be communicated (e.g., downloaded, transferred) to the electronic device wirelessly by the transmitter and receiver and/or by using the detachable cable.

The electronic device may be a computer, tablet, and/or smartphone (e.g., an iPhone, an iPad, an iPod Touch, an Android-based system, a Microsoft Windows-based system, or other equivalent device). The electronic device can be connected wirelessly (e.g., through a Bluetooth, and/or Wi-Fi, and/or RF connection) to the intravaginal device and/or by a detachable cable. The electronic device can be configured to receive and/or process data measured by the sensor(s) of the intravaginal device. Alternatively, the electronic device can be configured to communicate (e.g., through a wired or wireless connection, e.g., through a Bluetooth, Wi-Fi, and/or internet connection) with a database that contains data collected by the intravaginal device or with another system that receives and processes the data and conveys the information to the electronic device. Data collected by the intravaginal device, such as data collected by the sensor(s), may be stored non-transiently on the electronic device. The data may be transmitted (e.g., transmitted after a training period, substantially in real-time, and/or at least once daily upon activation by the subject) to a database (e.g., a database stored on a different computer, such as a web-located and/or cloud-based database). The data may include a performance metric and/or scoring information, such as a score assigned to a muscle movement, e.g., a PFL and/or PFR, performed by the subject that is reflective of the quality of the muscle movement, e.g., a PFL and/or PFR, performed as compared to a calibrated baseline from the subject. The data may include one or more, or all, of the highest and lowest scores achieved by the subject over a training or usage period, an average score achieved by the subject over a training or usage period, the length of time over which a particular score was maintained by the subject, the raw data collected from the sensor(s), the start time of and the length of the training or usage period, maximum PFL and/or PFR duration, and angular movement of the intravaginal device during pelvic floor movements.

Additionally, the system can include a peripheral device, which may be configured with a processing unit that can transform or utilize sensor data received from the intravaginal device when a subject performs a pelvic floor movement, such as during a daily activity (e.g., activity that alters (e.g., increases and/or decreases) the overall health of her urogenital system and/or pelvic floor), to provide feedback to the subject regarding whether the detected activity affects her health status or is indicative of treatment of, or a need for treatment for, UI and/or FI (e.g., by a sacral nerve neuromodulation device). For example, the peripheral device can process the sensor data to produce a baseline that can be used for comparison to sensor data obtained at a future time to provide feedback to the subject (e.g., an alert) regarding whether activities she performs are beneficial or detrimental to her health status or whether the pelvic floor movements are indicative of treatment of, or a need for treatment for, UI and/or FI (e.g., by a sacral nerve neuromodulation device). In addition, or alternatively, the peripheral device can process the sensor data and compare the result to a previously established or predetermined baseline and based on the comparison can provide feedback to the subject (e.g., an alert) regarding whether activities she performs are beneficial or detrimental to her health status or whether the pelvic floor movements are indicative of treatment of, or a need for treatment for, UI and/or FI (e.g., by a sacral nerve neuromodulation device).

Additionally, the data may include a performance metric and/or scoring information, such as a score assigned to the overall health status of a subject's urogenital system and/or pelvic floor (e.g., the muscle fibers of the levator ani, e.g., the pubococcygeus, ileococcygeus, coccygeus, puborectalis muscles and associated connective tissues). The health status score may be derived from data collected, e.g., from an intravaginal device of the invention configured to monitor a subject's urogenital system and/or pelvic floor in substantially real-time, which is an optional monitoring state ("Live Mode"), as a subject performs her daily activities, e.g., by one or more sensors selected from the group consisting of a movement sensor, an orientation sensor, an accelerometer, a gyroscope, a micro-electro-mechanical systems (MEMS) sensor, a G-sensor, a tilt sensor, a rotation sensor, a pressure sensor, a light detecting sensor, such as a LiDAR sensor, an EIM sensor, a hormone sensor, a toxin sensor, a pH sensor, a temperature sensor, and/or a humidity sensor, and combinations thereof. A health status score may indicate to a subject whether a particular daily activity and/or metric contribute positively or negatively to the overall health of the subject's urogenital system and/or pelvic floor.

The database may be located on the electronic device, on an additional electronic device, or on the Internet (e.g., a web-located and/or cloud-based database). The electronic device may be connected to the database by a detachable cable, a Bluetooth connection, a Wi-Fi connection, and/or an internet connection. Communication with a particular type of electronic device, such as an Apple device, may require the use of a special authentication chip.

Additionally, the electronic device can include a user interface. The user interface can be programmed to display data and/or to provide instructions for use of the intravaginal device.

The intravaginal device (e.g., main body (e.g., the substantially ring shaped form) and/or tether) further includes a power source (e.g., a battery). The power source can be used to operate one or more components of the device, such as the sensor(s), transmitter, receiver, and the circuit board. In some instances, the power source is positioned within the substantially ring shaped form of the intravaginal device and connected to the component(s) by a wire and/or by a circuit board. The power source may be a rechargeable battery, such as a nickel-cadmium battery or a lithium ion battery, such as one compatible with wired or wireless (e.g., inductive) charging. Additionally, the external housing may include a power source connected to the transmitter or receiver, e.g., by a wire and/or by a circuit board. An ON/OFF switch can also be included.

The intravaginal device may further include a detachable cable connected to sensor(s) either directly or indirectly, e.g., by a wire or a circuit board. The detachable cable may also be configured to connect the intravaginal device to an electronic device. The detachable cable may also be configured to assist in the removal of the intravaginal device from its position within the vaginal canal (e.g., proximal to the cervix or vaginal cuff) of a user. In some instances, the detachable cable is the tether.

The intravaginal device may further include within the main body (e.g., the substantially ring shaped form) and/or tether a sensory output component for providing biofeedback to a subject. The sensory output component may be connected to the microcontroller and/or the sensor(s), e.g., by a wire and/or by a circuit board. The biofeedback relates to at least one performance metric as measured by the sensor(s). The performance metric can be proper execution of a PFL and/or a PFR, duration of time in which the intravaginal device has been in use (e.g., the time in which the intravaginal device has been at a position proximal to the cervix or vaginal cuff of the subject (i.e., total insertion time), the time over which PFLs and/or PFRs have been performed, (i.e., total training time)), muscle quality, and/or whether the pelvic floor movements are indicative of treatment of, or a need for treatment for, UI and/or FI (e.g., by a sacral nerve neuromodulation device). A performance metric may be a measurement of the overall health status of a subject's urogenital system and/or pelvic floor (e.g., a measurement of muscle movement, muscle quality, muscle, strength, a biomolecule level (e.g., a hormone and/or a toxin level), pH, temperature, and/or humidity) obtained during daily monitoring (e.g., in substantially real-time) with an intravaginal device as the subject performs her daily activities or may indicate whether the subject has or is in need of treatment UI and/or FI (e.g., whether the subject may benefit from, or is experiencing optimal, sacral nerve neuromodulation). The sensory output component may be configured to produce a visual, vibrational, and/or auditory signal as the biofeedback. The intravaginal device may be configured to notify the subject when to remove the intravaginal device.

The intravaginal device may be configured for use with a tool for insertion. The tool for insertion is capable of deforming the intravaginal device and/or deploying the intravaginal device at a location within the subject (e.g., at a position proximal to the cervix or vaginal cuff).

The device may be used at home, work, a physician's office, a clinic, a nursing home, a pelvic health or other center, or other locations suitable for the subject. A physician, nurse, technician, physical therapist, or central customer support may supply support for the subject.

An exemplary intravaginal device of the invention is depicted in FIGS. 1-2. FIG. 1 depicts intravaginal device 100 with main body 110 and tether 10. Tether 10 may contain, for example, 1-20 sensors 200 (e.g., 1, 2, 3, 4, 5, 6, 7, 8, 9, 10, 11, 12, 13, 14, 15, 16, 17, 18, 19, 20 or more sensors 200). Main body 110 may also contain, for example, 1-20 sensors 200 (e.g., 1, 2, 3, 4, 5, 6, 7, 8, 9, 10, 11, 12, 13, 14, 15, 16, 17, 18, 19, 20 or more sensors) and 1-20 (e.g., 1, 2, 3, 4, 5, 6, 7, 8, 9, 10, 11, 12, 13, 14, 15, 16, 17, 18, 19, 20 or more) energy transmitters 210 (e.g., RF, laser, electrical stimulation). Tether 10 or main body 110 may be flat or oblong. The sensors in tether 10 may be MEMS sensors. Tether 10 may also contain a Bluetooth chip and/or an Apple chip or other wireless compatible chipset. Main body 110 may be configured to administer at least one (e.g., 1, 2, 3, 4, 5, or more) pharmaceutical agent to the vaginal tissues for the treatment of a PFD, a vaginal disorder, or the symptoms thereof, or other disease or condition. In some instances, tether 10 may be similarly configured to administer a pharmaceutical agent to the vaginal tissues. Configuring tether 10, which may be detachable from main body 110, for pharmaceutical administration would provide the user the option of being able to replace and/or exchange the tether as needed, e.g., when the pharmaceutical agent has been depleted, when a different pharmaceutical agent is required, or when a different dosage is required, without the need to discard main body 110. Tether 10 may have gradations or ruler markings to visualize how deep intravaginal device 100 is within the vagina. In any of the embodiments described herein, the tether may be optionally absent.

Intravaginal device 100 contains at least one sensor 200 within tether 10 for monitoring pelvic floor muscle movement. As depicted in FIG. 1, intravaginal device 100 contains circuit board 700 within main body 110. Circuit board 700 can be a flexible circuit board that connects multiple components of intravaginal device 100 to each other, such as sensor 200, battery 800, microcontroller 900, transmitter/receiver 1000, data storage unit 1100, sensory output component 1200, wireless communication antennae 1300, ON/OFF switch 1600, and authentication chip 1400 (FIG. 1, inset). Circuit board 700 can alternatively be connected to sensor 200 by a wire. Circuit board 700 and all its connected components may alternatively be positioned in tether 10. Intravaginal device 100 may be configured with additional sensors and/or delivery modules.

Intravaginal device 100 can be inserted into the vagina of a subject and deployed at a position in proximity to the cervix, vaginal fornix, or vaginal cuff, substantially parallel to the surface of the upper vagina adjacent to the pelvic floor, manually or by using insertion tool 600. Intravaginal device 100 may also contain molded wing 300 for stabilizing the device at a position in proximity to the cervix or vaginal cuff of a patient (FIG. 1). Tether 10 may also be in the form of a detachable cable that can be used to connect intravaginal device 100 to transmitter/receiver box 500 and to assist in the removal of intravaginal device 100 from a patient.

Transmitter/receiver box 500 and/or transmitter/receiver 1000 connects wirelessly to electronic device 1500, via a Wi-Fi and/or Bluetooth connection In certain embodiments, intravaginal device 100 contains 8 or fewer (e.g., 4 or 5) sensors 200 in tether 10 and 5 or fewer sensors 200 in main body 110. One sensor may be shared by both the tether and main body (FIG. 2). The angle between the plane connecting the anterior and posterior aspects of the main body 110 and tether 10 may vary from 0°-180° (e.g., 10°, 20°, 30°, 40°, 50°, 60°, 70°, 80°, 90°, 100°, 110°, 120°, 130°, 140°, 150°, 160°, 170°, 180°). The circumference of main body 110 may be from about 10 cm to about 50 cm (e.g., 15 cm, 20 cm, 25 cm, 30 cm, 35 cm, 40 cm, 45 cm, or 50 cm) or may be 27.6 cm. The length of tether 10 may be from about 3 cm to about 50 cm (e.g., 5 cm, 10 cm, 15 cm, 20 cm, 25 cm, 30 cm, 35 cm, 40 cm, 45 cm) or may be 25.5 cm long. The sensors 200 may be spaced about 0.5 cm to about 5 cm (e.g., 1 cm, 1.5 cm, 2 cm, 2.5 cm, 3 cm, 3.5 cm, 4 cm, or 4.5 cm) or may be spaced about 1.6 cm apart. At least one sensor 200 may be placed on tether 10 cm or less (e.g., 9 cm, 8 cm, 7 cm, 6 cm, 5 cm, 4 cm, 3 cm, 2 cm, or 1 cm) from main body 110.

The tether may be configured as a separable tether with one or more components. Having a separable tether allows the device to have a long-term wearable portion (e.g., ring 110 and part of tether 10; e.g., long-term wearable device 105) and a short-term wearable portion (e.g., short-term wearable portion 115) that can connect to a power supply for powering or recharging a local battery. This can be used for powering an intravaginal device with an RF transmitter(s) for therapeutic applications. RF transmitters may require power in the range of 10 mW to 300 W. Thus, in the event that a wireless power source (e.g., a battery) cannot sustain this power for an extended duration, the separable portion(s) of the tether can be configured for connection to a power source (e.g., an AC power source) to recharge the device or directly power the RF transmitter(s). The separable tether allows flexibility and modularity by permitting the intravaginal device to be used in either short-term (e.g., 1-30 minutes) or long term (e.g., 30 minutes or longer, e.g., 1 day-6 months) capacities.

If configured to be separation, the portions of the tether may further include connections, such as magnetic or interlocking connections (e.g., press fit, snap fit) that can be used to join the portion(s). The connections may also be configured to be electrical connections that can be used to supply power to the intravaginal device.

Electrical Stimulation Device

The intravaginal device described herein may be used in combination with an electrical stimulation device that is configured to deliver electrical stimulation to a target area in a subject (e.g., a sacral nerve of the subject, such as the S2, S3, and/or S4 nerve). The device may include an implantable lead having one or more conductors disposed with the lead body. The conductors may extend from a proximal end of the lead to one or more neurostimulation electrodes disposed at or near the distal end of the lead. The device may include a pulse generator which couples to the proximal end of the implantable lead and is electrically coupled with the neurostimulation electrodes. The pulse generator may be configured to generate electrical impulses for delivering neurostimulation treatment to a subject through the one or more neurostimulation electrodes when implanted at a target location. The implantable lead may be configured to be implanted at or near the sacrum of the subject. When implanted near the sacrum, the electrical stimulation can be delivered to the sacral nerve (e.g., at the nerve root) of the patient to provide effective neuromodulation. Exemplary electrical stimulation devices and methods of use that can be used in the methods and systems described herein are described in, e.g., U.S. Publication Nos. US20130289659, US20160121123, and US20160045724, and in U.S. Pat. Nos. U.S. Pat. Nos. 9,884,187, 9,731,112, 9,610,442, 8,180, 461, 6,971,393, 6,847,849, 9,427,574, 9,533,155, 9,555,246, 9,561,372, 9,802,038, 9,855,423, 9,895,546, and 9,925,381, the disclosures of each of which are hereby incorporated by reference in their entirety.

Figure 12:
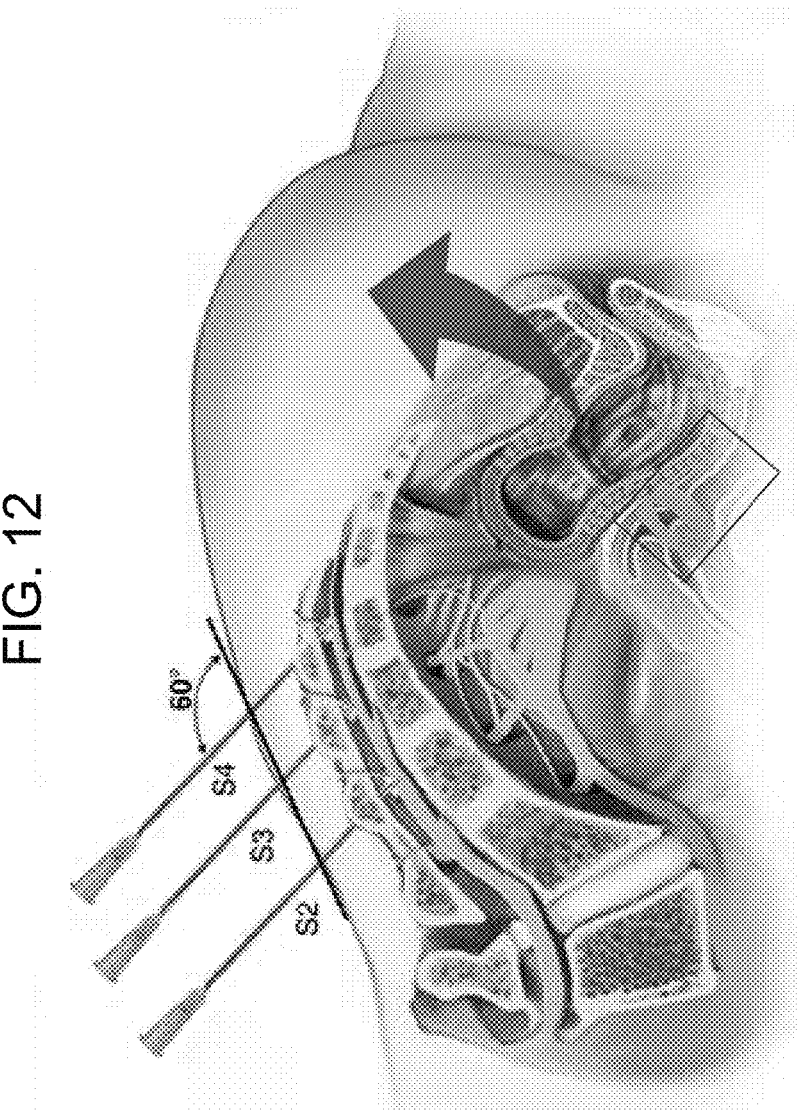
FIG. 12 is a schematic drawing showing the relative positions of the S2, S3, and S4 sacral root nerves. The implantable electrical lead(s) may be implanted into the sacrum of the subject to target one or more of these sacral nerves with electrical stimulation in order to treat urinary or fecal incontinence.

The implantable medical device may be configured to provide sacral neuromodulation (SNM) for the treatment of urinary and/or fecal incontinence. SNM modulates bladder behavior through electrical stimulation of somatic afferent axons in the spinal roots, which control voiding and continence reflex pathways in the central nervous system. This works by inhibiting interneuronal transmission in the bladder reflex pathway. The electrical stimulation device may include a battery-powered neurostimulator (e.g., implantable pulse generator (IPG)), an extension cable, and an electrical lead. The electrical lead may contain one or more (e.g., 1, 2, 3, 4, 5, 6, 7, 8, 9, 10, or more) collapsible projections (e.g., tines) that protrude from the electrical lead. The lead may be a semi-permanent, insulated electrical stimulation lead with one or more one or more (e.g., 1, 2, 3, 4, 5, 6, 7, 8, 9, 10, or more) contact points near the tip. The one or more (e.g., 1, 2, 3, 4, 5, 6, 7, 8, 9, 10, or more) collapsible projections (e.g., tines) may anchor the lead to the surrounding tissue. The device may be remotely programmable and battery-operated to generate an electrical stimulus transferred to the lead contact points. During sacral neuromodulation, the electrical lead is implanted in close proximity to the third sacral nerve root (S3) (FIG. 12), because S3 provides innervation directly to the bladder. The S3 nerve root and neighboring S2 and S4 roots exhibit characteristic responses to electrical stimulation. Ipsilateral great toe plantar flexion and pelvic floor bellows response are the motor responses observed with S3 stimulation.

The electrical stimulation device may be programmed with various stimulation parameters including pulse amplitude, pulse width, pulse frequency, stimulation mode, and electrode configuration to optimize therapeutic outcome for the subject or patient. For example, the pulse amplitude may be from 0 mA to 10 mA (e.g., 1 mA, 2 mA, 3 mA, 4 mA, 5 mA, 6 mA, 7 mA, 8 mA, 9 mA, or 10 mA). The pulse frequency may be from 5 Hz to 250 Hz (e.g., 10 Hz, 15 Hz, 20 Hz, 25 Hz, 30 Hz, 40 Hz, 50 Hz, 100 Hz, 150 Hz, 200 Hz, or 250 Hz). The pulse width may be from 50 µs to 500 µs (e.g., 100 µs, 150 µs, 200 µs, 250 µs, 300 µs, 250 µs, 300 µs, 350 µs, 400 µs, 450 µs, or 500 µs). The stimulation mode may be continuous or cycling. The electrode configuration may be, for example, anode, cathode, or off. An optimal setting may be determined for each subject and each parameter can vary for different subjects. The electrical stimulation device may include a transmitter and/or receiver for communicating (e.g., with radio frequency) with a peripheral device or an intravaginal device. The transmitter and/or receiver may be used to specify specific treatment protocols based on biofeedback loops from the intravaginal device. For example, the intravaginal device and the electrical stimulation device may be in communication with each other directly, or indirectly through a peripheral electronic device that controls each of their respective functions. By receiving feedback from the intravaginal device, the electrical stimulation device can adjust its voltage to modify the current applied during stimulation or can increase or decrease the duration or frequency of the electrical stimulation. For example, when the angle changes of the sensors of intravaginal device pass above or below a predetermined threshold, the intravaginal device may send a signal to the electrical stimulation device that activates or modulates the treatment parameters of the electrical stimulation device. Predetermined thresholds may be determined by a percent change (e.g., 5%, 10%, 15%, 20%, 25%, 30%, 40%, 50%, 60%, 70%, 80%, 90%, or 100% change in, e.g., the movement of the intravaginal device, e.g., relative to the movement of the intravaginal device during a pelvic floor movement at baseline) or an angle change (e.g., an increase or a decrease in the angle of movement of the intravaginal device of 1°, 2°, 3°, 4° 5°, 10°, 15°, 20°, 25°, 30°, 40°, 50°, 60°, 70°, 80°, or 90°, e.g., relative to the angle of the intravaginal device during a pelvic floor movement at baseline).

Pelvic Floor Movements

The pelvic floor (PF), also referred to as the pelvic floor diaphragm, is predominantly formed by the muscle fibers of the levator ani (e.g., the pubococcygeus, ileococcygeus, coccygeus, and puborectalis muscles) and the associated connective tissues which span the area underneath the pelvis (Bharucha. *Neurogastroenterol Motil.* 18:507-519, 2006). Electrical stimulation of the sacral nerve causes contraction of pelvic floor musculature, leading to movements of various pelvic floor muscles. Two common pelvic floor movements (PFMs) are the pelvic floor lift (PFL) and the pelvic floor relaxation (PFR). The pelvic floor lift is characterized by an upward movement (e.g., a lifting movement, e.g., a movement in the cranial direction) of the pelvic floor. A closely related movement comprising a relaxation (e.g., a downward movement, e.g., a movement in the caudal direction) of the pelvic floor is a pelvic floor relaxation. The movement of the pelvic floor during the performance of a PFL and/or a PFR may be distinct from the movement of the pelvic floor during the performance of a Kegel exercise. The Kegel movement, developed by Dr. Arnold Kegel, may be described as a contraction of the vaginal channel diameter (e.g., a squeezing movement of the vaginal walls, e.g., a movement of the vaginal walls in the dorsal-ventral or anterior-posterior) direction). During a PFL and a PFR the pelvic floor may be described as raising and lowering, respectively, the vaginal canal. This raising or lowering of the vaginal canal during a PFL and PFR may be due to the lifting and relaxing of the pelvic floor muscles. These types of pelvic floor movements can be visualized before, during, or after electrical stimulation to diagnose a disorder (e.g., urinary or fecal incontinence), select patients for treatment of, e.g., e.g., urinary or fecal incontinence, and to optimize electrical stimulation treatment for, e.g., urinary or fecal incontinence. While pelvic floor lifts and relaxations may be voluntary movements, the angle patterns associated with these movements may also be observed as involuntary movements during electrical stimulation. These patterns and movements may be useful in identifying a particular disease or condition (e.g., urinary or fecal incontinence) and determining efficacy of electrical stimulation treatment for the particular disease or condition (e.g., urinary or fecal incontinence).

A pelvic floor movement can be identified and measured by an intravaginal device described herein, which contains one or more sensors (e.g., accelerometers) and is located within the vaginal cavity of a subject, specifically at a location proximal to the cervix or vaginal cuff. The sensor positioned at a location proximal to the cervix or a vaginal cuff is configured to detect movement of the pelvic floor in the cranial-caudal direction (e.g., lifting and/or relaxation movements of the PF) to detect (e.g., to measure) the frequency and/or duration of a pelvic floor movement. In devices utilizing a tether, the main body may or may not have a sensor and is configured to position a sensor(s) in the tether within the vaginal canal for measurement of a pelvic floor movement (e.g., PFL and/or PFR).

Monitoring the movements of a subject's urogenital system and/or pelvic floor (e.g., the muscle fibers of the levator ani, e.g., the pubococcygeus, ileococcygeus, coccygeus, puborectalis muscles and associated connective tissues) in substantially real-time may allow for the diagnosis of a pelvic floor disorder (e.g., urinary or fecal incontinence), the identification and selection of subjects who would benefit from electrical stimulation therapy, and the ability to monitor the efficacy of electrical stimulation therapy in a subject.

The intravaginal device and/or the electrical stimulation device may be configured to communicate with a peripheral device configured to analyze the data collected from the sensors on the intravaginal device and transform the data into useful physiological indicia representative of a health state or the occurrence of a predetermined event (e.g., a pelvic floor movement or other event described herein). The peripheral device may have a processor that executes instructions of a stored program(s) (e.g., one or more algorithms) that analyzes positional data from the sensors. The peripheral device can be configured to alert the subject (or a health care provider) or as to the health status of the subject during or following routine daily activities (e.g., during or following an event, such as during and/or after performing a pelvic floor movement), and/or the peripheral device can be configured to present the data or an indication of the health status of the subject (e.g., on a graphical user interface or display) during routine daily activities and/or while performing, or after the performance of, a pelvic floor movement.

In some instances, a detected metric, e.g., a muscle movement, may negatively affect the health status of a subject (e.g., the muscle movement may reduce the efficiency of the subject's established program for treating or reducing the likelihood of developing a PFD). In this case, the device (e.g., the peripheral device) can be configured to convey to the subject (e.g., based on the peripheral device performing an algorithm to analyze data from the sensors of the intravaginal device) the negative effect of continuing or repeating the activity or behavior that provided the detected metric.

In some instances, a detected metric, e.g., a muscle movement, a level of or change in the level of muscle strength, muscle quality, a hormone, a toxin, pH, temperature, and/or humidity may be used to diagnose and/or predict the development of a PFD and/or an additional disease or condition, as described herein. The peripheral device may also be configured to signal to the subject (e.g., based on the peripheral device performing an algorithm to analyze the data from the sensors of the intravaginal device) and/or the medical practitioner overseeing the subject's treatment the need or benefit of altering the treatment regimen to optimize the treatment protocol.

Sensors

Sensors that can be used in the intravaginal device (e.g., within the main body (e.g., the substantially ring shaped form) and/or tether) of the invention (e.g., to measure the occurrence and/or quality of pelvic floor lifts (PFLs) and/or pelvic floor relaxations (PFRs) performed by a subject when the sensor is positioned at a location proximal to the subject's cervix or vaginal cuff) include, but are not limited to, movement sensors, accelerometers, gyroscopes, micro-electro-mechanical systems (MEMS) sensors, G-sensors, tilt sensors, rotation sensors, light detecting sensors, such as light detecting and ranging (LiDAR) sensors, and electrical impedance myography (EIM) sensors. One (e.g., 1, 2, 3, 4, 5, 6, 7, 8, 9, 10, or 20) or more sensors (e.g., movement sensors, accelerometers, gyroscopes, micro-electro-mechanical systems (MEMS) sensors, G-sensors, tilt sensors, rotation sensors, light-detecting sensors (e.g., LiDAR sensors), and EIM sensors) can be incorporated into the main body of the intravaginal device and/or within a tether (e.g., a flexible cord or ribbon) that can be optionally attached, e.g., by a removable or permanent connection, to the main body of the intravaginal device. The sensors may be arranged within the main body, tether, and/or sleeve of an intravaginal device of the invention. The sensors may be distributed evenly or unevenly throughout the main body and/or tether, such that the distribution of the sensors allows for the measurement of the quantity and quality of PFL and/or PFR performed by a subject using the intravaginal device. The device may also contain an electrode and/or a light generating component.

The sensor(s) is configured to measure a movement of at least one muscle of the pelvic floor (e.g., the levator ani, e.g., the pubococcygeus, ileococcygeus, coccygeus, and/or puborectalis muscles) or associated connective tissue during a PFL and/or PFR. An intravaginal device of the invention may be configured to provide daily monitoring, e.g., in substantially real-time, of the overall health status of the urogenital system and/or pelvic floor or may be used during a diagnostic program to assess whether a subject is in need of SNM therapy or whether a SNM device has been implanted, or is operating, optimally. An intravaginal device capable of providing monitoring may contain one or more sensors selected from the group consisting of a movement sensor, accelerometer, gyroscope, micro-electro-mechanical systems (MEMS) sensor, G-sensor, tilt sensor, rotation sensor, a light detecting sensor, such as a light detecting and ranging (LiDAR) sensor, and electrical impedance myography (EIM) sensor, a pressure sensor, a pH sensor, a humidity sensors, a temperature sensor, a hormone sensor, and a toxin sensor. Such an intravaginal device may be able to identify changes in vaginal conditions that may affect a subject's health, such as changes in the subject's muscle quality and/or muscle strength, a change in pH, in the level of a hormone and/or a toxin (e.g., a hormone and/or toxin level associated with a disease state, such as a PFD, a cancer, and/or a bacterial, fungal, or viral infection), to diagnose a pelvic floor condition, such as UI and/or FI, in a subject that would benefit from SNM therapy, or to monitor treatment of a pelvic floor condition, such as UI and/or FI, in a subject during SNM therapy. In some instances, the movement can be an upward movement (e.g., a lifting movement, e.g., a movement in the cranial direction) of at least about 1-4 cm (e.g., about 1, 2, 3, or 4 cm). In some instances, the movement can be a downward movement (e.g., a dropping movement, e.g., a movement in the caudal direction) of at least about 1-4 cm (e.g., about 1, 2, 3, or 4 cm). The sensors within the intravaginal device (e.g., within the main body and/or tether) are positioned such that when the intravaginal device is inserted into a user the sensors face the ventral direction (e.g., anterior direction). The sensor and/or combination of sensors is capable of determining the orientation of the intravaginal device in the x, y, z-axis and can be configured to provide feedback to the individual when they have inserted the intravaginal device correctly.

In some instances, the device includes multiple sensors (e.g., 2, 3, 4, 5, 6, 7, 8, 9, 10, or 20 sensors) of the same type (e.g., multiple movement sensors, multiple accelerometers, multiple gyroscopes, multiple light sensors, such as LiDAR sensors, or multiple electrical impedance myography (EIM) sensors). In other instances, the device includes multiple sensors of different types, such as a combination of different types of sensors (e.g., at least two different types of sensors; e.g., at least two different sensors selected from the following groups: movement sensors, accelerometers, gyroscopes, lights detecting sensors, such as LiDAR sensors, EIM sensors, micro-electro-mechanical systems (MEMS) sensors, G-sensors, tilt sensors, and rotation sensors). In a particular instance, the device contains an accelerometer, such as a multiple-axis accelerometer, a gyroscope, such as a multiple-axis gyroscope, a MEMS sensor, and/or an EIM sensor. An exemplary sensor that can be used to measure PFLs and/or PFRs or muscles movements that occur while the user performs her daily activities is the STMicroelectronic LIS331 DLH 3-axis liner accelerometer. The device may also include one or more electrodes and/or one or more light generating components (e.g., an optical transmitter, such as a light-emitting diode (LED) or a laser diode).

Additional sensors that can be used to measure at least one (e.g., 1, 2, 3, 4, 5, 6, 7, 8, 9, or 10) or more performance metrics and/or at least one (e.g., 1, 2, 3, 4, 5, 6, 7, 8, 9, or 10) or more characteristic of a subject's pelvic floor disorder (PFD) include, but are not limited to, pressure sensors, temperature sensors, pH sensors, and muscle quality sensors. Exemplary muscle quality sensors are described in International Publication No. WO2012149471A3, incorporated herein by reference in its entirety. The additional sensor can be incorporated into the main body of the intravaginal device and/or within a tether (e.g., a flexible cord or ribbon) that can be optionally attached, e.g., by a removable or permanent connection, to the main body of the intravaginal device.

A sensor of the invention may also be connected to a module or component arranged within the intravaginal device that activates in response, e.g., to data collected by a sensor(s), at a predetermined time, e.g., before, after, or during the performance of a PFL and/or PFR and/or a daily activity detected during daily monitoring. Recorded data from a sensor(s) may, e.g., be run through a control circuit in the intravaginal device or in a peripheral device that recognizes the characteristic patterns of a pelvic floor movement and in turn controls (e.g., initiates) the activity of the module or component of the intravaginal device. For example, the control circuit may activate a heating element, an alert, or other activity based on the sensor data. A non-limiting example of a control circuit that may be incorporated into an intravaginal device of the invention is described in, e.g., Son et al. (*Nature Nano.* 9:397-404, 2014), which is incorporated herein by reference in its entirety. The control circuit may be present in a peripheral device (e.g., cell phone, watch, and tablet), which takes an action based on the input data.

Additional sensors that may be included in the intravaginal devices in conjunction with the systems and methods described herein include electrical impedance myography (EIM) based sensors, and light detecting sensors Accessory Features and Components The following features and components may be included in the systems of the invention described herein, including the intravaginal device and/or the electrical stimulation device.

Energy Transmitters

The intravaginal device and/or the electrical stimulation device may include an energy transmitter. In the intravaginal device, an energy transmitter 210, such as a laser or electrical stimulation transmitter may be integrated into the intravaginal device. RF transmitters operate at frequencies, for example, from 1 kHz to 100 MHz. The power level of RF transmitters may vary from 1 mW to 500 W. RF transmitters emit energy in the form of heat and can be used to provide thermal energy to local tissue area of the vagina and vaginal canal that comes into contact with or is in proximity of the transmitters. RF transmitters may emit pulses of energy (e.g., in 1-5 second bursts) or may emit energy for extended durations (e.g., 1-30 minutes). RF transmitters may be powered wirelessly or by a wired power source.

In the electrical stimulation device, an energy transmitter is capable of delivering an electrical stimulation to the sacral nerve (e.g., the S2, S3, and/or S4 nerve) of a subject.

The intravaginal device or electrical stimulation device can be configured so that control of the energy transmitters is provided via communication with these devices, e.g., via a wireless communication (e.g., Bluetooth or Wi-Fi), such as with an antennae and/or an authentication chip (e.g., for communicating with and transmitting data to a peripheral device, such as a smart product, e.g., tablets, computers, and smartphones (e.g., iPhone, iPads, and other Apple or Android computing devices), to each other or to a peripheral electronic device.

Microcontrollers

The intravaginal device and/or the electrical stimulation device may include a microcontroller. A microcontroller (e.g., microcontroller unit (MCU)) is a small computer (e.g., a system on a chip (SOC)) that integrates all components of a computer or other electronic system into a single chip (e.g., an integrated circuit (IC) or microchip) and may contain a processor core, memory (e.g., non-transient storage), and programmable input/output peripherals (e.g., sensors). The MCU can be used within an embedded system, such as an intravaginal device or electrical stimulation device (or both), with a dedicated function, such as monitoring the performance of pelvic floor exercises and providing biofeedback. The MCU will typically contain a central processing unit (CPU) (e.g., a 4-bit to 64-bit processing unit, e.g., a 4-bit, a 32-bit, or a 64-bit processor), volatile memory (RAM) for data storage, operating parameter storage (e.g., ROM, EPROM, EEPROM, and/or Flash memory), discrete input and output pins (e.g., general purpose input/output pins (GPIO), serial input/output pins (e.g., universal asynchronous receiver/transmitter (UARTS), e.g., serial input/output pins for communication standards such as TIA (formerly EIA) RS-232, RS-422, and/or RS-485), other serial communication interfaces (e.g., Inter-Integrated Circuit (I$^2$C), Serial Peripheral Interface (SPI), Universal Serial Bus (USB), and Ethernet), peripherals, clock generator, converters (e.g., analog-to-digital and/or digital-to-analog converters), and in-circuit programming (ICSP) and/or in-circuit debugging (ICD) support.

Microcontrollers can contain at least one (e.g., 1, 2, 3, 4, 5, 6, 7, 8, 9, 10, 15, 20, 25, 30, 40, 50, 60, 70, 800, 80, 100, 150, or more) general purpose input and/or output pins (GPIO). GPIO pins are software configurable to either an input or an output state. GPIO pins configured to an input state are used to read sensors (e.g., movement, acceleration, rotation, pH, and/or muscle quality sensors) or other external signals. GPIO pins configured to the output state can drive an external device, such as a device capable of providing biofeedback (e.g., LEDs, motors).

An exemplary microcontroller useful in the featured invention is the Texas Instruments® MSP430F5438A, however other suitable microcontrollers may be used. This can be used to control the sensors, energy transmitters, and route power to any components within the intravaginal device.

The microcontroller (e.g., in the electrical stimulation device, peripheral device and/or the intravaginal device) may also be configured to implement an algorithm to detect pelvic floor movement (e.g., pelvic floor lift, pelvic floor relaxation, Valsalva maneuver, sustained pelvic floor lift, and serially repeated pelvic floor lift) or other indicia relevant to a health state of a subject. The microcontroller may collect data (e.g., position and angle data) from sensors (e.g., MEMS accelerometers), process and transform the data using the predetermined algorithm, and output new data to the user, e.g., on a user interface or peripheral device. For example, the microcontroller may collect sensor angle data, and from the data, determine whether a pelvic floor movement is performed correctly. Furthermore, an algorithm performed by a processor may be used, e.g., to quantify the duration, number, and quality of pelvic floor movements performed by the user or other indicia relevant to a health state of the subject. The microcontroller may perform the computations, which can be stored using, e.g., a non-transitory storage medium. The microcontroller or processor may only be in the peripheral device, and not the intravaginal device or in the electrical stimulation device. The microcontroller may be configured to enable communication between the intravaginal device, the electrical stimulation device, and a peripheral device. The microcontroller or peripheral device may be programmed with software or hardware that transforms the data obtained from the sensors on the intravaginal device, the results of which may then be stored in the device (e.g., using a non-transitory storage medium), and provides the transformed data to a user, e.g., on a user interface.

A microcontroller or processor may be controlled by computer-executable instructions stored in memory (e.g., non-transitory storage medium) so as to provide functionality, such as is described herein. Such functionality may be provided in the form of an electrical circuit. In yet other implementations, such functionality may be provided by a processor or processors controlled by computer-executable instructions stored in a memory coupled with one or more specially-designed electrical circuits. Various examples of hardware that may be used to implement the concepts described herein include, but are not limited to, application specific integrated circuits (ASICs), field-programmable gate arrays (FPGAs), and general-purpose microprocessors coupled with memory that stores executable instructions for controlling the general-purpose microprocessors.

Transmitter and Receiver

A transmitter and receiver may be positioned within the intravaginal device, the electrical stimulation device, and/or in the peripheral device, along with any additional components required to enable wireless communication (e.g., Bluetooth, Wi-Fi, and/or RF), such as an antennae and/or an authentication chip (e.g., for communicating with Apple products, e.g., iPhone, iPads, and other Apple computing devices). For example, Bluetooth communication can be performed by Roving Network's RN42APL-I/RM microchip. For authentication, for example, an Apple Authentication Chip 2.0C can be used to connect to the RN42APL-I/RM microchip via I²C and allow the intravaginal device to communicate with Apple products. One example of an Apple chip is the iPod Authentication Coprocessor, with part number P/N MFI337S3959. The transmitter and receiver may also be housed in an external box and connected to the intravaginal device by a detachable cable.

Power Source

The power source may be a battery located within each of the intravaginal device and the electrical stimulation device (e.g., an internal battery) and can be connected to the electronic components that it will power (e.g., sensor(s), microcontroller, transmitter and receiver, energy transmitter, and sensory output component(s)) by either a circuit board (e.g., a flexible circuit board) or a wire. The intravaginal device can include an ON/OFF switch (e.g., a button), that can be activated, e.g., prior or post insertion of the intravaginal device, by the individual. The power state of the intravaginal device can be indicated to the individual, e.g., by a light (e.g., an LED), a vibration, and/or by a notification displayed on the user interface of the electronic device, e.g., via an accompanying software application). The internal battery may be rechargeable and/or replaceable, such as a nickel-cadmium battery or a lithium ion battery. The intravaginal device may be configured to allow for the battery to be charged by a charging cradle (e.g., a charging case), a detachable cable, and/or by inductive wireless charging technology.

In some instances, the internal battery of each of the intravaginal device and the electrical stimulation device has a sufficient charge to power the intravaginal device and electrical stimulation device, respectively, for an entire treatment period. The internal battery of the intravaginal device can provide a charge for at least about 5 hours to about 60 days or more. The internal battery of the electrical stimulation device can provide a charge for at least about one day to about ten years (e.g., about three to six weeks or about one to five years or more). The internal battery can be configured to modulate its power output level based on the usage state of the intravaginal device and/or the electrical stimulation device, e.g., by entering a lower-power state when the intravaginal device is not being used to measure a pelvic floor muscle movement (e.g., a pelvic floor lift (PFL) and/or a pelvic floor relaxation (PFR)). The usage state may be detected automatically by the intravaginal device or the electrical stimulation device, or can be communicated to the intravaginal device or electrical stimulation device by the electronic device and user interface, e.g., by the individual beginning a training session using the accompanying software application. The ON/OFF switch may also be configured to communicate to the intravaginal device when a training session will begin and thereby modulate the power state of the device. For example, the ON/OFF switch can be configured to respond to one long press (e.g., a 5-15 second press and hold) by turning on, while one short press (e.g., a 1-3 second press and hold) can cycle the intravaginal device into a training state during which sensor data can be collected, and a second short press (e.g., one 1-3 second press and hold) or a double press (e.g., two 1-3 second press and holds) can end a training session and place the intravaginal device into a power-saving (e.g., low-power) state.

In some instances, the power source is a battery located in a separate housing (e.g., an external battery) and connected to the intravaginal device, e.g., by a detachable cable. For example, power may be supplied through two replaceable and/or rechargeable AA batteries (e.g., 1.5V batteries). In some instances, the power is provided by a power cord that connects to, for example, a power box (e.g., an external battery) or AC outlet.

A Database

A database may be located on a local electronic device (e.g., a peripheral device, such as a computer, phone, or tablet) or on a remote electronic device that can communicate via the internet (e.g., a web-located and/or cloud-based database). The database can be a central database that collects, stores, and performs calculations with the sensor data collected from an intravaginal device or treatment metrics collected from the electrical stimulation device used by an individual. Sensor data and additional data provided by an individual (e.g., information provided by an individual on symptoms of a pelvic floor disorder that they have experienced, e.g., answers to a questionnaire) may be communicated to (e.g., uploaded to) or stored in the database on a periodic basis upon transmission from the intravaginal device. In some instances, communication with the database is substantially continuous (e.g., upload of data occurs in substantially real-time during the performance of a pelvic floor exercise). In other instances, communication with the database occurs on an hourly or daily basis (e.g., at least one per hour and/or at least once per day) or when initiated by the user. The database can be reviewed by the user after treatment to assess the progress. The data could also been transmitted to the healthcare provider (e.g., automatically, by a third party, or by the user).

A User Interface

The user interface may comprise a software application configured to provide an interactive display to an individual of her treament progress with an intravaginal device and/or electrical stimulation device of the invention and/or (ii) present, daily, weekly, monthly, and overall health status of her urogenital system and/or pelvic floor (e.g., the muscle fibers of the levator ani, e.g., the pubococcygeus, ileococcygeus, coccygeus, puborectalis muscles and associated connective tissues).

The application may also provide feedback to an individual on how the electrical stimulation treatment affects the health status of her urogenital system and/or pelvic floor (e.g., feedback based on data produced by one or more of the sensors in the device). The feedback provided by the application may be reviewed by the individual and/or a medical practitioner and/or a third party in substantially real-time or the feedback may be stored by the application, e.g., in the memory of the intravaginal device, a connected electronic device (e.g., a computer, tablet, and/or smartphone), or a database (e.g., a local database or a remote database, such as an internet-based database).

The application can include several screens: Welcome and/or Login, Calibration and Orientation, Dashboard, Training and Coaching, Live Mode, Menu, Introduction, Device, Exercise History, Treatment History and Symptoms.

On first use of the application, the Welcome and/or Login screen can allow a user to establish a training account on the database where the user's training data (e.g., sensor data) will be stored. This step can include the registration of her intravaginal device and the creation of a username and password. The user can also elected to connect with a healthcare professional, who is overseeing her training, with whom they will share her training data.

The user may also be prompted to insert and calibrate her intravaginal device using the Calibration and Orientation screen. The Calibration and Orientation screen will coach the user through inserting and orienting the intravaginal device. The application may show the user a schematic diagram of the intravaginal device and prompt the user to identify the indicia on her own device that marks the device's top and front sides. The user may be asked to insert the device by hand or by using the insertion tool, such that the top indicia will be facing the top of the vagina and the front indicia will be facing the user's anterior. In real-time the application can provide the orientation of the intravaginal device on its x, y, and z-axis during the insertion step and will coach the user to orient the device parallel to the top of the vaginal canal and proximal to the cervix or vaginal cuff. When the correct orientation is obtained, the application can prompt the user to confirm that the indicia marking the front (e.g., anterior) side of the intravaginal device is facing the anterior side of her body. This orientation step could be conducted on insertion of the device. If the device is removed and subsequently replaced the orientation step may be repeated. Next, the application can coach the individual through performing a series of exercises, such as pelvic floor lifts (PFLs) and pelvic floor relaxations (PFRs), to establish a baseline of measurements from which the progress of the user of the intravaginal device can be determined over time. The calibration step can be repeated at any time chosen by the user.

The application may also include a Dashboard screen displaying the total power charge of the intravaginal device or electrical stimulation device substantially in real-time, the total time the intravaginal device and/or electrical stimulation device has been in place inside the user, the total number of pelvic floor movements observed on a given day, a score related to the pelvic floor muscle quality of the user, and at least one score related to the overall progress of the user during the treatment period. The Dashboard may also provide a summary of data collected during the use of the optional Live Mode, which can be used for substantially real-time monitoring of the overall health status of a user's urogenital system and/or pelvic floor (e.g., the muscle fibers of the levator ani, e.g., the pubococcygeus, ileococcygeus, coccygeus, puborectalis muscles and associated connective tissues). The Dashboard may provide the total number observed pelvic floor movements, e.g., intentionally or unintentionally, by a user as they performed her daily activities or during electrical stimulation treatment, and a score related to the amount of stress that has been placed on the pelvic floor muscles during a time period in which Live Mode was active.

The overall progress score of the user can be calculated based on a set of baseline measurements obtained during the calibration session. The data collected during the calibration session can include, but is not limited to, maximum number of PFLs and/or PFRs performed until pelvic floor muscle exhaustion is reached (e.g., the user can no longer perform PFL and/or a PFR), maximum change in distance from the insertion position of the intravaginal device during a PFL and a PFR, a measurement of muscle quality and/or strength, and a pH measurement.

The user interface may also include a function to control the electrical stimulation device to deliver electrical stimulation. For example, the power, frequency, and duration of stimulation may be modulated by the user interface based on user preferences, biofeedback from the intravaginal device, and physician recommendations.

Pelvic floor disorders (PFDs) that can be treated with the intravaginal device and/or the electrical stimulation device, and systems thereof.

Pelvic floor disorders (PFDs) that can be treated by the systems described herein including an intravaginal device and electrical stimulation device and methods of use thereof include a wide range of conditions that occur when the muscles of the pelvic floor (PF) are weak (e.g., hypotonic), tight (e.g., hypertonic), or there is an impairment of or damage of the sacroiliac joint, lower back, coccyx, or hip joints. Neurogenic factors, including lumbosacral nerve damage, such as the nerve damage seen in multiple sclerosis and stroke patients, can also contribute to the development and progression of PFDs (National Clinical Guideline Centre (UK). *NICE Clinical Guidelines*. 148, 2012). Pelvic surgery (e.g., hysterectomy), vaginal childbirth, age, obesity, diabetes, connective tissue disorders, and genetic predisposition have also been identified as risk factors for the development of PFDs (Memon et al., *Womens Health* (*Lond. Engl.*). 9(3), 2013).

Symptoms of PFDs include changes to muscle tone, changes to muscle strength, bladder leakage, anal or fecal leakage, pain, frequency, and urgency. Exemplary PFDs include, but are not limited to, urinary incontinence (UI), stress urinary incontinence (*SUI*), urge incontinence, mixed stress and urge urinary incontinence, dysuria (e.g., painful urination), anal or fecal incontinence, pelvic organ prolapse (POP) (e.g., urethra prolapse (urethrocele), bladder prolapse (cystocele), or both urethra and bladder prolapse (cystourethrocele), vaginal vault and cervix prolapse (vaginal vault prolapse), uterus prolapse (uterine prolapse), rectum prolapse (rectocele), sigmoid colon prolapse (sigmoidocele), and small bowel prolapse (enterocele)), pelvic pain, sexual dysfunction (e.g., coital incontinence, a sexual pain disorder, dyspareunia, vaginismus, and/or impaired sexual arousal), weak or impaired pelvic floor muscle function, post-labor issues or damage, pain and/or incontinence caused by damage to a lumbosacral nerve, and nonrelaxing pelvic floor dysfunction.

Forms of urinary and anal or fecal incontinence that can be treated by electrical stimulation device and/or the intravaginal device and methods described herein include, but are not limited to, urinary incontinence (UI), stress urinary incontinence (*SUI*), urge incontinence, mixed stress and urge urinary incontinence, constipation, and anal or fecal incontinence. Urinary incontinence may be caused by an overactive bladder.

The urethra is the canal leading from the bladder that discharges urine externally. In females, the urethra is a ~4 cm canal passing from the bladder, in close relation with the anterior wall of the vagina and having a long axis that parallels that of the vagina opening in the vestibule of the vagina posterior to the clitoris and anterior to the vaginal orifice. (See STEDMAN's MEDICAL DICTIONARY, at page 2072 ($28^{th}$ edition, 2005). The urinary bladder refers to a musculomembranous elastic bag serving as a storage place for the urine, filled via the ureters and drained via the urethra. The bladder neck is the smooth muscle of the bladder, which is distinct from the detrusor muscle. In females, the bladder neck consists of morphologically distinct smooth muscle. The large diameter fasciculi extend obliquely or longitudinally into the urethral wall. In a normal female, the bladder neck above the pelvic floor is supported predominantly by the pubovesical ligaments, the endopelvic fascia of the pelvic floor, and levator ani. These support the urethra at rest; with elevated intra-abdominal pressure, the levators contract increasing urethral closure pressure to maintain continence. This anatomical arrangement commonly alters after parturition and with increasing age, such that the bladder neck lies beneath the pelvic floor, particularly when the intra-abdominal pressure rises. This mechanism may fail to maintain continence, leading to incontinence as a result of urethral hypermobility, whereas a normal woman has no issues with any urinary or anal or fecal leakage.

Kits

Also featured are kits containing an intravaginal device and/or an electrical stimulation (e.g., neuromodulation) device for use in the diagnosis, prevention, and/or treatment of pelvic floor disorders (PFDs), such as urinary or fecal incontinence. Such kits can be used to treat an individual (e.g., a female patient) who may benefit from electrical stimulation of the sacral nerve and monitoring of pelvic floor muscle movement. In some instances, the kit may include an intravaginal device of the invention that is configured to monitor the overall health status of a user's urogenital system and/or pelvic floor (e.g., the muscle fibers of the levator ani, e.g., the pubococcygeus, ileococcygeus, coccygeus, puborectalis muscles and associated connective tissues) and an electrical stimulation device, as described herein.

A kit for treating or reducing the progression of a pelvic floor disorder in an individual may include an intravaginal device of the invention, an electrical stimulation device, and one or more of a transmitter and receiver, a detachable cable, a tool for insertion of the intravaginal device, an electronic device, a database, and/or a user interface, a power source (e.g., one or more batteries), and instruction for use thereof. Additionally, the kit may contain an additional device, as described herein, a charger, a sanitary cleaner, and/or gloves.

Other optional components of the kit include a lubricant (e.g., a lubricant compatible with the material from which the intravaginal device is fabricated, e.g., silicone) for use in inserting the intravaginal device and/or a biomaterial (e.g., hyaluronic acid) for use in improving the adhesion of the intravaginal device at a position proximal to the cervix or vaginal cuff of an individual. The optional components (e.g., the lubricant and/or biomaterial) may be provided in a separate container (e.g., a sealed packet, tube, and/or applicator).

Alternatively, the optional components (e.g., the lubricant and/or biomaterial) can be provided pre-applied to the intravaginal device, such that the intravaginal device is ready for insertion and use. Additional optional components of the kit include sterile gloves (e.g., at least one pair) for use in the insertion and/or removal of the intravaginal device, or alternatively for use during the application of the lubricant and/or biomaterial to the intravaginal device, and/or a storage container for the intravaginal device, electrical stimulation device, and/or the system of the invention.

A kit of the invention may be useful in the treatment of a pelvic floor disorder such as, but not limited to, urinary incontinence (UI), stress urinary incontinence (SUI), urge incontinence, mixed stress and urge urinary incontinence, dysuria (e.g., painful urination), anal or fecal incontinence, pelvic organ prolapse (POP) (e.g., urethra prolapse (urethrocele), bladder prolapse (cystocele), or both urethra and bladder prolapse (cystourethrocele), vaginal vault and cervix prolapse (vaginal vault prolapse), uterus prolapse (uterine prolapse), rectum prolapse (rectocele), sigmoid colon prolapse (sigmoidocele), and small bowel prolapse (enterocele)), pelvic pain, sexual dysfunction (e.g., coital incontinence, a sexual pain disorder, dyspareunia, vaginismus, and/or impaired sexual arousal), weak or impaired pelvic floor muscle function, post-labor issues or damage, pain and/or incontinence caused by damage to a lumbosacral nerve, and nonrelaxing pelvic floor dysfunction.

Methods of Use

Methods of Treating or Monitoring the Health State of a Pelvic Floor or Vaginal Disorder Discussed below are methods of treating or monitoring the health state of a subject (e.g., the state of a pelvic floor or vaginal disorder) by using an intravaginal device and an electrical stimulation device, as discussed herein. The intravaginal device may be configured for use with or without the peripheral device. The intravaginal device may have one or more sensors configured to collect various physiological data of the subject (e.g., pelvic floor movement data). These data can then be processed by the peripheral device using one or more computational algorithms that transform the data and/or present the data in a useful medium (e.g., on a graphical user interface) for a user or a health care professional. The intravaginal device may also communicate with the electrical stimulation device to provide biofeedback.

A female patient may exhibit pelvic floor movements (e.g., PFLs and PFRs) that can be monitored using the one or more sensors of the intravaginal device. Initially, the intravaginal device can be inserted into the vagina of the individual and the engagement of or relaxation of a pelvic floor (PF) muscle (e.g., the levator ani (e.g., the pubococcygeus, ileococcygeus, coccygeus, and puborectalis muscles) and the associated connective tissues which spans a spheric form from the pubic bone anteriorly to the sacrum posteriorly and to the adjoining bony structure joining these two bones) of the individual can be monitored with the intravaginal device can be monitored during electrical stimulation treatment. The device can be used to measure at least one (e.g., 1, 2, 3, 4, 5, 6, 7, 8, 9, or 10) or more performance metrics and/or at least one (e.g., 1, 2, 3, 4, 5, 6, 7, 8, 9, or 10) or more characteristic of an individual's pelvic floor health.

A subject can use the intravaginal device and/or electrical stimulation device of the invention to diagnose and/or treat a vaginal disorder or PFD (e.g., urinary or fecal incontinence) over a treatment period ranging from about one week to about three months (e.g., about 1-week, 2-weeks, 3-weeks, 4-weeks, 2-months, or 3-months, e.g., about 7-21 days, 7-35 days, 7-49 days, 7-63 days, 7-77 days, 7-91 days, or 7-105 days, e.g., about 2-8 weeks) or over the course of several years (e.g., 1-10 years), in particular, in combination with SNM therapy. The intravaginal device can remain inside the subject during the treatment period to monitor the subject's pelvic floor muscles (e.g., muscle quality, muscle tone, pH) and observe pelvic floor movements. The subject can also remove the intravaginal device during the treatment period and can reinsert it after disinfection (e.g., washing) to reinitiate treatment. The intravaginal device can monitor and collect data from its sensor(s) (e.g., at least one sensor, e.g., 1, 2, 3, 4, 5, 6, 7, 8, 9, 10, or more sensors) substantially continuously or periodically. The sensors can measure at least one (e.g., 1, 2, 3, 4, 5, 6, 7, 8, 9, or 10) or more performance metrics (e.g., the quality and/or quantity of pelvic floor movements (e.g., PFLs and/or PFRs) and/or at least one (e.g., 1, 2, 3, 4, 5, 6, 7, 8, 9, or 10) or more characteristic of a subject's PFD (e.g., muscle quality, muscle tone, or instances of urinary or fecal urge). In some instances, the monitoring (e.g., monitoring of pelvic floor movement, of a performance metric, and/or a characteristic of an subject's PFD, such as instances of urinary or fecal urge) can occur after the intravaginal device has received a signal (e.g., a command) from the subject using the intravaginal device, the electrical stimulation device, or a peripheral electronic device to begin collecting data. This signal may be a signal from a button (e.g., a button within a software application running on an electronic device wirelessly connected to the intravaginal device) that is pressed by the subject prior to use of the intravaginal device to monitor pelvic floor movements, such as PFLs and/or PFRs.

The treatment program can include a series of one (e.g., 1, 2, 3, 4, 5, 6, 7, 8, 9, 10, 20, 30, 40, 50, 60, or 70) or more therapeutic electrical stimulation treatment regimens. The electrical stimulation treatments can be performed over a set time interval (e.g., 1-5 minutes, 1-60 seconds, or 15 seconds) with the intravaginal device. For example, a series can be divided into a period of time (e.g., about 1 second-30 seconds, such as 1 second, 15 seconds, or 30 seconds, or up to 1 minute, or more) during which the electrical stimulation treatment regimens are performed and a period of rest (e.g., about 1 second-30 seconds, such as 1 second, 15 seconds, or 30 seconds, or up to 1 minute, or more). In some instances, each series of electrical stimulations occurs in about 1 second to about 10 minutes (e.g., 1, 2, 3, 4, 5, 6, 7, 8, 9, 10, 20, 30, 40, 50, or 60 seconds, e.g., 1, 2, 3, 4, 5, 6, 7, 8, 9, or 10 minutes). The treatment program can also include activation of the electrical stimulation device when signaled by the intravaginal device, which can occur when the intravaginal device detects urinary and/or fecal urge, as determined based on pelvic floor movements, as described herein.

During use, the system can provide indicia to the subject regarding the quality and tone of the pelvic floor muscles, e.g., as detected by one or more of the sensors during electrical stimulation, the status of the pelvic floor disorder (e.g., whether the symptoms of UI and/or FI in the subject are being ameliorated by the electrical stimulation device), and/or whether treatment of the subject for the pelvic floor disorder is optimal (e.g., whether the lead(s) of the SNM therapy device are optimally placed).

During the treatment program the subject may engage with a user interface on an electronic device that is connected to the intravaginal device and/or electrical stimulation device. The electronic device can be programmed to provide instructions to the subject via the user interface that coach the subject through use of the intravaginal device and/or electrical stimulation device in a treatment program. The instructions may be provided through a software application running on the electronic device. The electronic device generates a readout of results and data through the user interface on the quality and quantity pelvic floor movements observed with the intravaginal device or on the status of the pelvic floor disorder (e.g., whether the symptoms of UI and/or FI in the subject are being ameliorated by the electrical stimulation device and/or whether treatment of the subject for the pelvic floor disorder has been optimized (e.g., whether the lead(s) of the SNM therapy device are optimally placed)).

Also featured are methods of calibrating an intravaginal device for treating, or inhibiting or reducing the development or progression of, a pelvic floor disorder in a subject (e.g., UI and/or FI) by: (a) inserting the intravaginal device into the vagina of the subject and monitoring pelvic floor muscle of the individual with the intravaginal device over a calibration period; and (b) using the data collected over the calibration period to calculate a baseline score for at least one performance metric of the engagement of, or relaxation of, a pelvic floor muscle of the subject and/or at least one characteristic of the pelvic floor disorder of the subject. The at least one performance metric of the engagement of, or relaxation of, a pelvic floor muscle of the subject and/or at least one characteristic of the pelvic floor disorder is selected from the group consisting of the maximum number of pelvic floor lifts and/or the maximum number of pelvic floor relaxations performed during a treatment period, the maximum strength of a pelvic floor lift and/or a pelvic floor relaxation performed during a treatment period, the frequency and/or duration of pelvic floor muscle movements during a treatment period, the angular change or velocity of pelvic floor muscle movement during a treatment period, and/or the muscle quality, muscle strength, and/or vaginal condition of the subject during a treatment period.

The methods described herein can be used in the treatment of a pelvic floor disorder such as, but not limited to, urinary incontinence (UI), stress urinary incontinence (*SUI*), urge incontinence, mixed stress and urge urinary incontinence, dysuria (e.g., painful urination), anal or fecal incontinence, constipation, pelvic organ prolapse (POP) (e.g., urethra prolapse (urethrocele), bladder prolapse (cystocele), or both urethra and bladder prolapse (cystourethrocele), vaginal vault and cervix prolapse (vaginal vault prolapse), uterus prolapse (uterine prolapse), rectum prolapse (rectocele), sigmoid colon prolapse (sigmoidocele), and small bowel prolapse (enterocele)), pelvic pain, sexual dysfunction (e.g., coital incontinence, a sexual pain disorder, dyspareunia, vaginismus, and/or impaired sexual arousal), weak or impaired pelvic floor muscle function, post-labor issues or damage, pain and/or incontinence caused by damage to a lumbosacral nerve, and nonrelaxing pelvic floor dysfunction. Treatment using an intravaginal device, an electrical stimulation device, and/or a system that includes both devices may reduce the frequency of occurrence and/or severity of at least one symptom of a pelvic floor disorder (e.g., UI and/or FI), e.g., a reduction of at least 5% (e.g., 10%, 20%, 30%, 40%, 50%, 60%, 70%, 80%, or 90%) or more relative to an untreated subject with the pelvic floor disorder. In particular, symptoms of pelvic floor disorders that make be ameliorated (e.g., treated or reduced) using the method described herein include, but are not limited to, muscle tone (e.g., hypotonic muscle tone and hypertonic muscle tone), poor muscle strength, bladder leakage, anal or fecal leakage, frequency and/or duration of urinary and/or fecal urge, and pain (e.g., muscle pain, lower back pain, pain during urination, pain during defecation, pain during sexual stimulation and/or intercourse).

A number of MEMS sensors (e.g., 1, 2, 3, 4, 5, 6 or more) may be linearly connected and, e.g., equidistant apart on, e.g., a flex strip encased in a biocompatible material, such as silicone. Each sensor can reflect an angle (location) at a specific point. This angular information from the sensors work in conjunction to form a fitted curve or line that reflects the shape and angle of the vagina. The device may be inserted while sitting or standing.

The intravaginal device may be connected to a transmitter box that wirelessly (e.g., via Bluetooth) sends the positional data gathered from the intravaginal device sensors to the electronic device (e.g., a smartphone or computer) that communicates to the electrical stimulation device or the subject through an interactive application. The sensors of the intravaginal device may be used to determine a vaginal angle ($\theta_V$; FIGS. 3A-3D) of a patient. Baseline measurements of vaginal angle can be obtained and compared to data obtained after a period of performing pelvic floor exercises. For example, for a subject who is healthy or has mild symptoms of incontinence, the sensors of the intravaginal device may be used to determine a $\theta_V$ of approximately 45° relative to the floor when the subject is standing. When the subject performs or experiences a PFL, the sensors of the intravaginal device may determine that the $\theta_V$ increases towards 90°. The intravaginal device can detect pelvic floor movements while the subject is sitting or standing. In some instances, the observed change in deflection angle will be greater when the woman is standing. A woman with strong pelvic floor muscles may be able to lift her pelvic floor muscles such that the device is oriented between 45° to 90° or more (e.g., nearly 90°) relative to the floor. If the woman has symptoms of incontinence, she may exhibit hypermobility of her urethra, which can be reflected in a readout from the intravaginal device, which indicates that the pelvic musculature cannot fully hold and support the urethra and bladder in its correct place. In the event that a woman has extreme (e.g., stage IV) stress urinary incontinence and/or total POP, the sensor angle may be depressed towards 0° at rest. A physician may test the woman's pelvic floor musculature by asking her to try to lift her pelvic floor, to perform a pelvic floor exercise, to cough or bear down, or to relax. In some cases of POP, when the woman attempts to bear down, the organs may deform the device in a caudal direction, The data from the pelvic floor movements may be uploaded automatically to an online database. The electronic device (e.g., a smartphone or computer) can also store a certain amount of this data. The application is user-friendly and can be configured to allow the patient to share her data. The application can be a tool for the health care professional to program a specific exercise regimen for the subject or otherwise communicate with the subject. The application may privately communicate with the subject by sending data, such as scores, charts, graphs, or reports, reminders, and encouragement to the subject via push notifications. The application can also allow a subject to send information to the database, responding to questionnaires and reporting continence, improvement, and/or problems.

The shape of the vagina can be determined using, e.g., data from, e.g., the MEMS sensors in the device, which reflect the position of the subject's pelvic floor in her body. The pelvic floor muscles lift the vaginal canal when a subject performs a PFL. The shape of the vagina from the data in the sensors can be used to monitor or diagnose a pelvic floor disorder. For example, if the position of the subject's pelvic floor descends, it can be useful to monitor the subject for possible POP. Monitoring the position of the subject's pelvic floor will help to prevent further damage and to correct and/or improve the current state of a subject's pelvic floor, which may allow the subject to avoid surgery or other more invasive options. The intravaginal device can also be used to monitor urinary and/or fecal urge during a treatment period in order to determine whether the subject is in need or SNM treatment or whether the subject is benefiting from SNM treatment (e.g., based on detection of a reduction in pelvic floor movements indicative of urinary and/or fecal urge). The intravaginal device may be used for prevention, rehabilitation, and treatment of urinary incontinence (urge, stress, and mixed), anal or fecal incontinence (gas, liquid, mucus, solid), POP, pelvic pain, sexual dysfunction, and postpartum health.

The intravaginal device may show the subject and/or her health care professional the movement of the pelvic floor muscles as it is reflected by the configuration of the vagina in real time during pelvic floor movements. Using the biofeedback offered by the intravaginal device, the subject alone, or as assisted by her health care professional, can monitor the status of her pelvic floor disorder and treatment thereof by SNM therapy and/or can strengthen her pelvic floor in order to alleviate symptoms of her pelvic floor disorder. The data from the sensors allows for measuring and recording the pelvic floor movement data, giving the health care professional and/or the subject the ability to track the subject's condition or treatment outcome.

The data may be captured as a score based an algorithm that measures the angles (location) of the sensor during electrical stimulation treatment and may also include a measure of the strength or endurance of the pelvic floor muscles. The data created by the intravaginal device may be transmitted to a centralized database creating a personal health record for the subject, providing care and measurable results.

This data can also provide predictive information that notifies a subject and/or their health care professional about the potential need for various treatment options (e.g., electrical stimulation therapy or changes thereto) to improve the subject's quality of life. For example, the changes observed in a subject who has hypermobility are markedly different from a subject without hypermobility (e.g., associated with stress urinary incontinence). By establishing a baseline on a subject using an intravaginal device described herein and, e.g., a database of information on the subject, one can monitor the subject's pelvic floor condition in real-time or over a period of time (e.g., during SNM therapy). The devices and systems described herein can also be used to monitor a subject's improvement over time while using the devices and systems. Therefore, the subject can be treated before the damage occurs or needs to be corrected through surgical means.

Intravaginal Device Sensor Placement for Diagnosing or Monitoring a Pelvic Floor Disorder The position of sensor(s) 200 of intravaginal device 100 may be located for maximal signal change during a pelvic floor movement and for maximal signal-to-noise ratio. The device may contain one or more sensors 200 (e.g., 1, 2, 3, 4, 5, 6, 7, 9, 10, 11, 12, 13, 14, 15, 16, 17, 18, 19, 20, or more) on main body 110 and/or tether 10. The fornix sensors are sensors that reside in the portions of the intravaginal device that extend into the anterior and posterior fornices. Additional vaginal sensors reside, e.g., in the tether 10 caudal to the fornices. In one embodiment, an intravaginal device as depicted in FIG. 2 may be used. In this embodiment, intravaginal device 100 has 12 sensors: 8 sensors in tether 10 (S1-S8), and 5 sensors in main body 110 (S8-S12). Sensor S8 is shared by both main body 110 and tether 10. The intravaginal device may be used to effectively diagnose a pelvic floor disorder or the likelihood that a patient would benefit from treatment using SNM therapy for a pelvic floor disorder (e.g., UI and/or FI) or to monitor treatment of a pelvic floor disorder.

Figure 6C:
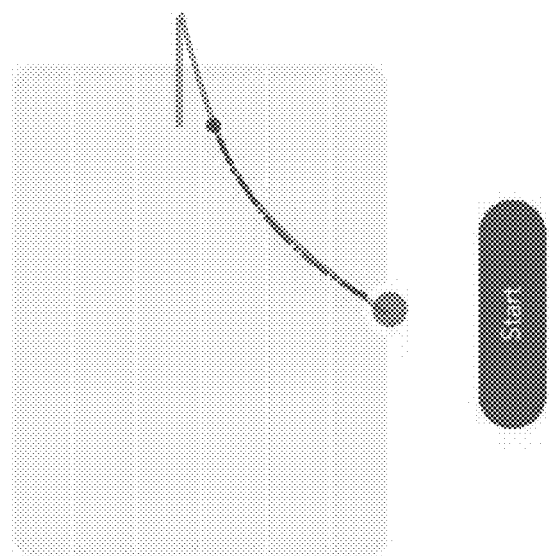
FIGS. 6A-6C are schematic drawings showing changes in the angle of an accelerometer of an intravaginal device during engagement of pelvic floor muscles.
Figure 6B:
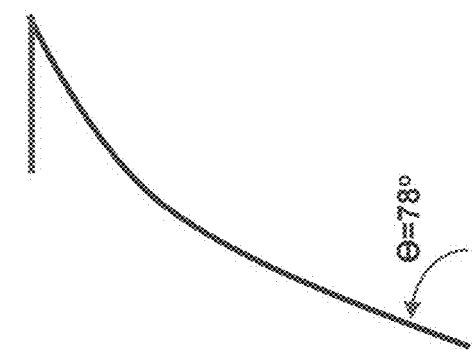
Figure 6A:
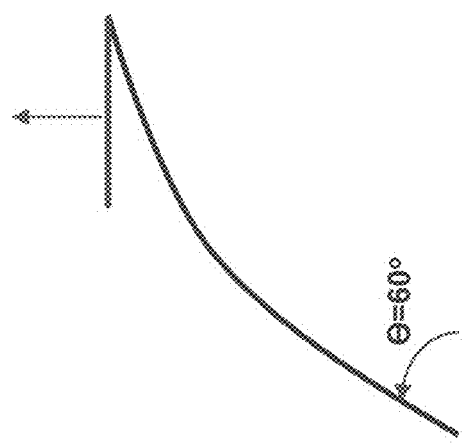

As the intravaginal device has a known length, the vaginal length of a subject may be calculated by determining the length of the tether from the introitus of the vagina to the main body, when positioned within the vaginal fornices (FIG. 6). The intravaginal device may have a tether that extends beyond the introitus of the vagina or the tether may reside completely inside the vagina.

Different vaginas may have different lengths and different characteristic curvatures. Therefore, the physical characteristics of intravaginal device 100 (e.g., length of tether 10, circumference of main body 110, number of sensors 200, and placement of sensors 200) may be selected to optimize fit and function based on a particular vaginal length and curvature.

When the subject performs or experiences a pelvic floor movement (e.g., Valsalva maneuver, PFL, sustained PFL, and repeated PFL), the angles (locations) of sensors 200 change. For example, when using an intravaginal device with 12 sensors, subjects, with a broad range of vaginal lengths, showed a caudal movement of the posterior fornix sensor during Valsalva maneuver (relative to the position of the posterior fornix during relaxation) and a cranial movement of the posterior fornix sensor during a PFL (again, relative to the position of the posterior fornix sensor during relaxation. In a subject with a short vagina (7.7 cm), caudal movement of the posterior fornix of 1.6 cm was seen during a Valsalva maneuver and cranial movement of the posterior fornix of 0.5 cm was seen during a PFL. In a subject with a long vagina (12.2 cm), 1.1 cm of caudal movement was seen during Valsalva maneuver and 0.4 cm of cranial movement was seen during PFL.

The comparison between the location of sensors on the tether 10, within the vaginal canal below the fornix, during various pelvic maneuvers, compared to the relaxed state, can help the physician to visualize the deformation of the vaginal canal by extrinsic pelvic organs and in some instances to diagnose a subject with a pelvic floor disorder or the need for treatment for a pelvic floor disorder (e.g., using SNM therapy). Furthermore, because the main body 110 of intravaginal device 100 surrounds, for example, a cervix, the intravaginal device is anchored in place, thereby providing reference positions for visualization during relaxation and pelvic floor movements on a graphical user interface Each sensor 200 may be used to measure a vaginal angle ($\theta_V$) or fornix angle ($\theta_F$) (FIGS. 3A-3D) based on the position and/or orientation of a sensor with respect to the virtual plane of the introitus ("horizon"). Pairs of sensors 200 in main body 110, either in the anterior fornix or within the lateral fornices, may be treated as an individual node (FIG. 3A) of sensors. Therefore, the lateral fornix sensors A10 and A11 may be treated as a single node S9, while the anterior fornix sensors A9 and A12 may be treated as a single node S10 (FIGS. 3B and 3D). The vaginal angle may be calculated by taking the average of the angle between two or more, or all, of nodes S1-S7 and the horizon. The fornix angle may be calculated by taking the average of the two or more of the nodes S8-S10 relative to the horizon.

As the vagina and the fornix are not always straight, the vaginal and fornix angles may be calculated by multiple methods. For example, eV may be calculated by averaging 2 or more sensors from S1-S8 relative to the horizon, or by taking the best-fit line between S1 and S8 relative to the horizon.

Thus, the change in the sensor position and orientation may be quantitatively analyzed using the metrics (e.g., vaginal angle and fornix angle) described above to evaluate pelvic floor movement.

The angles of each sensor may be tracked during pelvic floor movement. The angle of each individual sensor can be plotted on a time course (FIGS. 5A-5E, 6A-6C, 7-9, 10A-10B, and 11), and the time course may be annotated when certain pelvic floor exercises are performed (e.g., Valsalva maneuver, lift, hold, and repeat). The change in the sensor angle may reflect a change in orientation of the intravaginal device at that sensor location. Certain sensors may exhibit a stronger signal than others. For example, in FIGS. 9 and 11, sensors S4-S6 showed a significant change in angle upon performing a hold. However, the other sensors did not exhibit a significant angular change. Additionally, sensors S7 and S8 showed an inverted angular response to the rest of the sensors as the angle decreased (instead of increased) from a relaxed position.

Figure 11:
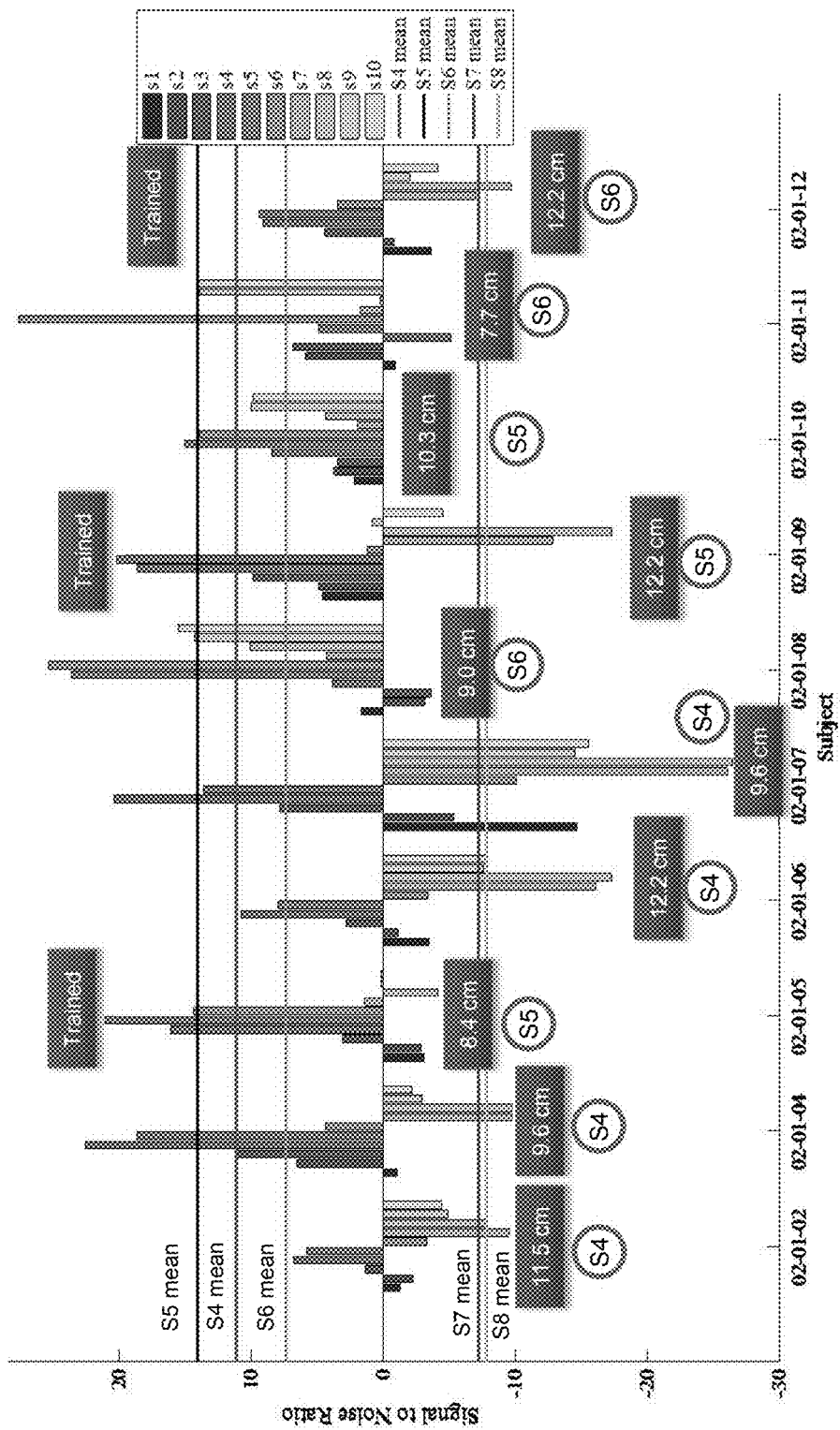
FIG. 11 is a graph showing the change in sensor angle for each sensor in 10 different subjects. Each bar represents a change in sensor angle (angle during lift−angle during relaxation) for each of sensors S1-S10 for each subject. The horizontal lines indicate the mean sensor angle for a given sensor. S4-S6 provide the strongest, and most consistent signal to noise ratio, magnitude, and directionality. The sensor providing the strongest signal and the vaginal length is indicated for each subject. For three subjects, the "Trained" label reflects that the subjects exhibit indicia indicating the absence of a pelvic floor disorder.

This type of data may be collected empirically for any given subject (Example 13). As shown in FIG. 11, the data indicate that sensors S4-S6 were located at a position to yield the greatest signal change during pelvic floor movements and the largest signal to noise ratio relative to the other sensors. As different female subjects have different vaginal lengths and physical shapes, some variability may exist as to the signal output. For each individual subject, the specific sensor position and orientation may yield different information and exhibit different levels of sensitivity. Thus, it may be possible to customize the size/length of the intravaginal device and the position of the sensors to optimize it for use for a certain subject. These data can help guide optimal placement of sensors in the most important positions of the intravaginal device to correctly correlate angular changes associated with specific pelvic floor disorders. In some instances, a sensor placed at a position that is approximately halfway between the introitus of the vagina and the cervix or vaginal cuff produces a strong signal.

Methods of Detecting a Pelvic Floor Movement

The intravaginal device can be used to track pelvic floor movements (e.g., pelvic floor lift, pelvic floor relaxation, Valsalva maneuver, sustained pelvic floor lift, and serially repeated pelvic floor lift). Sensors S4-S6 (FIG. 3B) provide consistent signal to noise ratio, magnitude, and directionality (FIG. 11). Sensor S6 also provides a strong signal to noise ratio, but the directionality may vary in different subjects. One can use the data generated from one or more of these sensors in an algorithm that uses the sensor data to track the angle change over the course of daily activity in order to monitor different pelvic floor movements. The sensor data can be processed and displayed to the subject or others via a graphical user interface. For example, a text message, email, alert via an application running on a subject's peripheral device (e.g., smartphone) can be sent to the subject or another individual. The microcontroller can store the computed data, e.g., using a non-transitory storage medium. An algorithm can be used that defines one or more (e.g., 1, 2, 3, 4, 5, 6, 7, 8, 9, 10 or more) parameters that constitute a composite score of one or more (e.g., 1, 2, 3, 4, 5, 6, 7, 8, 9, 10 or more) sensor angle measurements. An algorithm can be used to track the change in angle of a single sensor or multiple sensors during a treatment or monitoring period (e.g., during a pelvic floor movement). A first time derivative of the angle vs. time can be used to indicate a positive or negative change in angle with respect to time. A positive angle change may indicate the start time or magnitude of a pelvic floor movement (e.g., lift) while a negative angle change may indicate the end time or magnitude of decline (e.g., relaxation) of a pelvic floor movement. A second time derivative can be produced and used to indicate a local maximum or minimum that denotes when a movement is beginning or ending (e.g., the rate of change of the angle with respect to time is zero). Additionally, the algorithm may be used to detect any pelvic floor movements that are indicative of the presence of the pelvic floor disorder, treatment of symptoms thereof, or optimal placement of electrical stimulation leads of an electrical stimulation device during SNM therapy.

Figure 9:
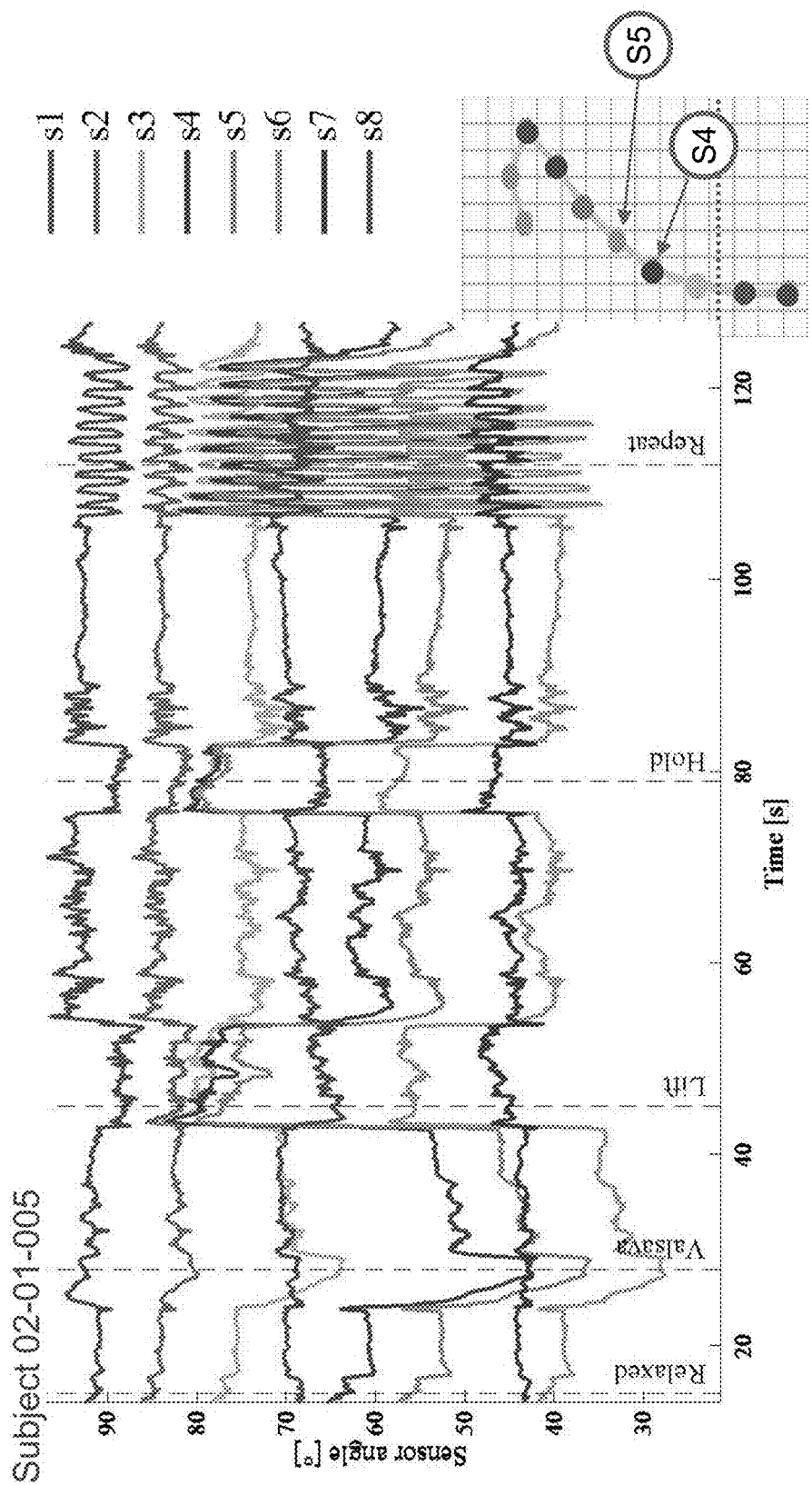
FIG. 9 is a graph plotting, on the ordinate, the sensor angle for sensors S1-S8 (degrees) and, on the abscissa, time (seconds) during which a subject performed a series of maneuvers as indicated by the vertical lines (pelvic floor relaxation, Valsalva maneuver, pelvic floor lift, sustained pelvic floor lift (hold), and serially repeated pelvic floor lift (repeat)). Sensor 5 showed the largest change in sensor angle during maneuvers. The sensor data were generated using MEMS sensors.

A subject may insert intravaginal device 100 comprising a plurality of MEMS accelerometers into her vagina so that the intravaginal device can detect pelvic floor movements (e.g., pelvic floor lift, pelvic floor relaxation, Valsalva maneuver, sustained pelvic floor lift, and serially repeated pelvic floor lift). Each MEMS accelerometer emits a signal corresponding to the position and sensor angle relative to the horizon. The angle data from each sensor may be plotted as a function of time (FIG. 9). A composite score may then be calculated from a summation of one or more of the sensor angles.

Figure 10A:
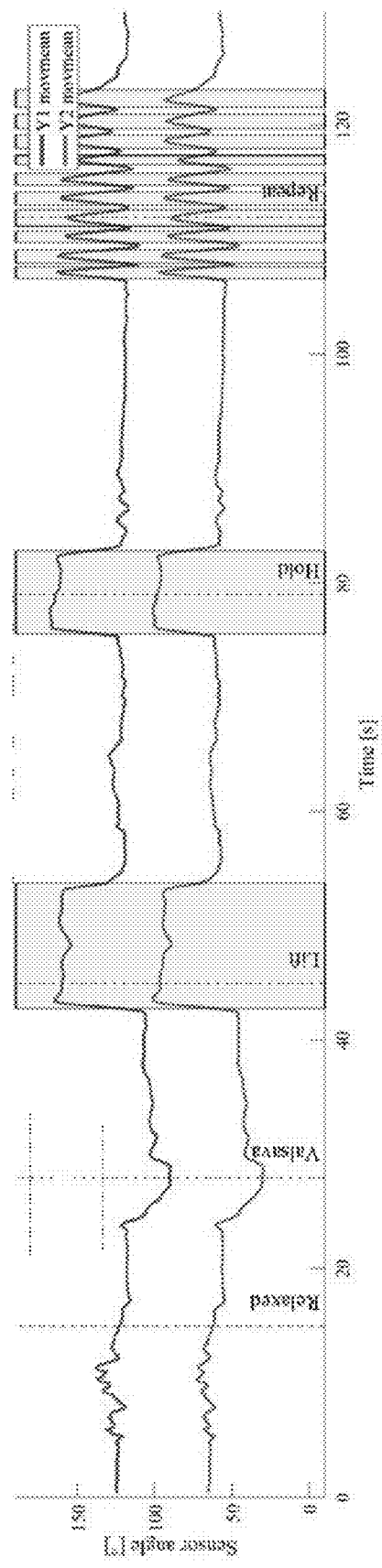
FIGS. 10A-10B are a set of graphs plotting, on the ordinate, sensor angle composite scores (Y1 and Y2) and, on the abscissa, time (seconds) during which a subject performed a series of maneuvers as indicated by the vertical lines (pelvic floor relaxation, Valsalva maneuver, pelvic floor lift, sustained pelvic floor lift (hold), and serially repeated pelvic floor lift (repeat)).
Figure 10B:
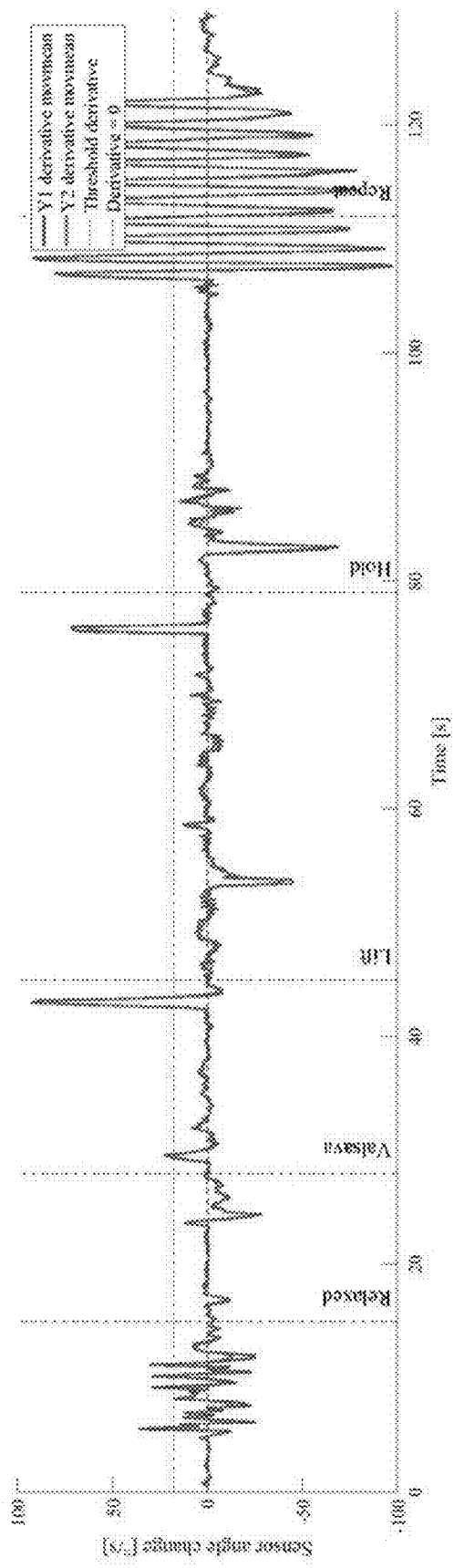

The algorithm may include, for example, calculating a moving average or filtered composite score to reduce noise and minimize false positives. The filtered composite scores may be plotted versus time (FIG. 10A) and a derivative of this data may be plotted as a change in sensor angle versus time (FIG. 10B). When the change in sensor angle versus time exceeds a predetermined threshold (e.g., 1°, 2°, 3°, 4°, 5°, 10°, 15°, 20°, 25°, 30°, 35°, 40°, 45°, e.g., about 18°) it may be determined that a pelvic floor movement occurs. The predetermined threshold may be determined empirically from data collected from different subjects. The start of the pelvic floor lift may be determined at or about the instant that the time derivative of the composite score of the filtered composite score exceeds the predetermined threshold. The peak values (e.g., Y_max) of the moving averages may indicate the magnitude of a pelvic floor movement (e.g., a lift). The change in the composite score from the start to the end of the movement may be defined as a Δ. When the composite score of filtered average drops below a value of the difference of the maximum score and the half maximum value of the Δ (e.g., Y drops below Y_max−0.5×ΔY) it may be determined that a pelvic floor movement has ended. The coefficient before the Δ may be determined empirically and may vary, e.g., from 0.1 to 1.0 (e.g., 0.1, 0.2, 0.3, 0.4, 0.5, 0.6, 0.7, 0.8, 0.9, and 1.0). The start and finish times of the movement may also be identified when the second derivative of the sensor angle with respect to time reaches zero (see, e.g., FIG. 10B). Any of the data or indicia may then be presented to the subject using the intravaginal device and/or a system that includes the intravaginal device and an electrical stimulation device or another individual, such as a health care provider. Furthermore, these indicia may be used to optimize the treatment parameters of the electrical stimulation device.

Methods of Training an Intravaginal Device for Personalized Treatment

As certain sensors yield differential signal to noise ratios for different subjects due to different internal anatomies and vaginal lengths, the algorithm and composite scores can be optimized for each subject. A weighted sum of the signal from each sensor may be used that more heavily weights the sensors that yield a strong signal (e.g., a sensor signal with a higher signal to noise readout, such as sensors S4-S6 (see FIG. 3B)) and less heavily weights the sensors that yield a weak signal (e.g., a sensor signal with a lower signal to noise readout, such as sensors S1-S3 and S7-S10 (see FIG. 3B)).

A subject may insert intravaginal device 100 comprising a plurality of MEMS accelerometers into her vagina and perform a series of pelvic floor movements (e.g., pelvic floor lift, pelvic floor relaxation, Valsalva maneuver, sustained pelvic floor lift, and serially repeated pelvic floor lift), e.g., under the guidance of a health care professional. If necessary, the health care professional can teach the subject how to perform and execute each of the pelvic floor movements, e.g., in order to train the intravaginal device to detect pelvic floor movements during diagnosis and/or treatment of a pelvic floor disorder using a SNM therapy device. The subject may then perform one or more (e.g., 2, 3, 4, 5, 6, 7, 8, 9, 10, or more) of each movement until a baseline for these pelvic floor movements is established by the intravaginal device.

As each MEMS accelerometer emits a signal corresponding to the position and sensor angle relative to the horizon. The angle data from each sensor is plotted as a function of time. The strength of the signal from each sensors is denoted by the change in angle (angle during pelvic floor lift−angle during pelvic floor relaxation). This signal strength may be used to determine exactly which sensors provide the most robust signal. For each subject, a personalized set of parameters can be calculated to optimize a composite score and algorithm. The parameters may include, for example, multiplicative or additive coefficients for each sensor angle value. An optimized composite score may include a weighted average based on the relative signal strength of each sensor that changes depending on the subject (FIG. 11). These algorithms and composite scores may be computed by the microcontroller, which can store the computed data, e.g., using a non-transitory storage medium. The peripheral device or microcontroller may use artificial intelligence and machine learning to optimize its algorithms for optimal detection of an occurrence of an event (e.g., pelvic floor movement). Such artificial intelligence systems are described, e.g., in U.S. Pat. Nos. 9,754,220 and 8,296,247, the disclosures of which are hereby incorporated by reference.

Methods of Real-Time Monitoring (Live-Mode)

A female patient using an intravaginal device and electrical stimulation device of the system described herein can receive real-time data indicative of the health status of a subject's urogenital system and/or pelvic floor (e.g., the muscle fibers of the levator ani, e.g., the pubococcygeus, ileococcygeus, coccygeus, puborectalis muscles and associated connective tissues), such as information regarding the presence or absence of urinary or fecal urge or other condition associated with UI and/or FI. For example, the intravaginal device can monitor in real-time the need for electrical stimulation of the sacral nerve during SNM therapy based on detected pelvic floor movements. The system may be configured, such that, when the need for electrical stimulation of the sacral nerve during SNM therapy is detected by the intravaginal device, a signal is sent to the electrical stimulation device to initiate electrical stimulation of the sacral nerve. Alternatively, the intravaginal device can monitor in real-time changes in pelvic floor movements that indicate a need for SNM therapy or the absence of a need for SNM therapy. The intravaginal device can also be used to monitor in real-time changes in pelvic floor movements that indicate whether SNM therapy is optimized, such as whether a lead of the electrical stimulation device has been placed properly with respect to the sacral nerve (e.g., the S2, S3, and/or S4 nerves), such as whether the placement of the lead should be changed. The intravaginal device can be used to treat and/or reduce the development and/or reoccurrence of a PFD (e.g., urinary or fecal incontinence).

An intravaginal device that is configured to monitor a pelvic floor movement during electrical stimulation therapy can provide feedback to a subject and/or to a medical practitioner overseeing the subject's treatment in real-time based on (i) daily activities that may reduce and/or improve the efficacy of SNM therapy; (ii) optimal times for the administration of SNM therapy; and/or (iii) alterations that may be made to a treatment (e.g., increasing the frequency, duration, and/or intensity of an electrical stimulation therapy) to increase the efficacy of the treatment. In particular, the intravaginal device may measure changes (e.g., increases and/or decreases) in, e.g., muscle movement (e.g., a PFL and/or PFL, a muscle strain, a muscle stretch, and/or a muscle contraction), muscle quality, muscle strength, and/or pressure of about 1%, 2%, 3%, 4%, 5%, 6%, 7%, 8%, 9%, 10%, 20%, 30%, 40%, 50%, 60%, 70%, 80%, 90%, or more as compared to baseline values obtained, e.g., during a calibration of the intravaginal device, or known in the art.

Methods of Providing Electrical Stimulation

The implantable medical device may be configured to provide sacral neuromodulation (SNM) for the treatment of urinary and fecal incontinence. SNM modulates bladder behavior through electrical stimulation of somatic afferent axons in the spinal roots, which modulate voiding and continence reflex pathways in the central nervous system. This process works by inhibiting interneuronal transmission in the bladder reflex pathway. The electrical stimulation device may include a battery-powered neurostimulator (e.g., implantable pulse generator (IPG)), an extension cable, and an electrical lead. The electrical lead contain one or more (e.g., 1, 2, 3, 4, 5, 6, 7, 8, 9, 10, or more) tines that protrude from the electrical lead. The lead may be a semi-permanent, insulated electrical stimulation lead with one or more one or more (e.g., 1, 2, 3, 4, 5, 6, 7, 8, 9, 10, or more) contact points near the tip and one or more one or more (e.g., 1, 2, 3, 4, 5, 6, 7, 8, 9, 10, or more) collapsible projections (e.g., tines), which anchor the lead to the surrounding tissue. The device may be remotely programmable and battery-operated to generate an electrical stimulus transferred to the lead contact points.

The electrical stimulation device may be programmed with various stimulation parameters including pulse amplitude, pulse width, pulse frequency, stimulation mode, and electrode configuration to optimize therapeutic outcome for the subject or patient. For example, the pulse amplitude may be from 0 mA to 10 mA (e.g., 1 mA, 2 mA, 3 mA, 4 mA, 5 mA, 6 mA, 7 mA, 8 mA, 9 mA, or 10 mA). The pulse frequency may be from 5 Hz to 250 Hz (e.g., 10 Hz, 15 Hz, 20 Hz, 25 Hz, 30 Hz, 40 Hz, 50 Hz, 100 Hz, 150 Hz, 200 Hz, or 250 Hz). The pulse width may be from 50 µs to 500 µs (e.g., 100 µs, 150 µs, 200 µs, 250 µs, 300 µs, 250 µs, 300 µs, 350 µs, 400 µs, 450 µs, or 500 µs). The stimulation mode may be continuous or cycling. The electrode configuration may be, for example, anode, cathode, or off. An optimal setting may be determined for each subject, and each parameter can vary for different subjects.

Methods of Optimizing Placement and Efficacy of an Electrical Stimulation Device With sacral neuromodulation, the electrical lead is implanted in close proximity to the third sacral nerve root (S3) (FIG. 12) because S3 provides innervation to the bladder. Appropriate positioning of the electrical lead may be verified by motor or sensory responses to electrical stimulation during implantation. The S3 nerve root and neighboring S2 and S4 roots exhibit characteristic responses to electrical stimulation. Ipsilateral great toe plantar flexion and pelvic floor bellows response are the motor responses seen with S3 stimulation. Stimulation of the S2 nerve root causes anal sphincter contraction, lateral leg rotation, and plantar flexion of the entire foot. Stimulation of the S4 nerve root causes pelvic floor bellows but does not cause any ipsilateral lower extremity movement. A subject using an electrical stimulation device can use an intravaginal device to monitor the pelvic floor movements (e.g., lift) associated with proper placement of the lead. When both devices are properly positioned on or within the subject, the electrical stimulation device can initiate an electrical impulse. Then, the angular position of the sensors on the intravaginal device will provide a readout that can be tracked over time (FIG. 9). By detecting a change in the angle position (e.g., 1%, 2%, 3%, 4%, 5%, 6%, 7%, 8%, 9%, 10%, 20%, 30%, 40%, 50%, 60%, 70%, 80%, 90% or more) of the sensors (e.g., MEMS accelerometers, e.g., sensors S4-S6), one can detect that a pelvic floor movement has occurred and that the electrical stimulation device is properly positioned over the S3 nerve. The change in angle position can be measured relative to a baseline, a control, or a known quantity. If no pelvic floor movement is detected, the electrical stimulation device can be moved (e.g., 1 mm, 2 mm, 3 mm, 4 mm, 5 mm, 10 mm, 20 mm, 30 mm, 40 mm, 50 mm, 60 mm, 70 mm, 80 mm, 90 mm, or 100 mm) and the method repeated until a pelvic floor movement is observed.

Methods of Diagnosis and Patient Selection for Sacral Neuromodulation

Depending on the specific urinary or fecal incontinence disorder, an intravaginal device may be used to identify and/or diagnose the specific disorder and select a subject for sacral neuromodulation (SNM) therapy. A subject with overactive bladder may exhibit decreased overall range of motion (e.g., limited range of angle change), with frequent small lifts in sensors S4-S6. Patterns of motion in the proximal sensors (e.g., S9 and S10) may correspond to episodes of urinary urgency with or without incontinence. A subject with urgency incontinence may exhibit decreased overall range of motion (e.g., limited overall range of angle change) with patterns suggestive of frequent small voids (e.g., frequent short relaxation patterns). Patterns of motion in proximal sensors (e.g., S9 and S10) may correspond to episodes of urinary urgency with or without incontinence. A subject with fecal incontinence may exhibit decreased overall range of motion (e.g., limited range of angle change) with frequent prolonged increases in angle change (representing attempts to retain stool and/or refrain from loss of stool). Alternatively, the subject with fecal incontinence may exhibit increased overall range of motion, which may be particularly noticeable on the posterior vaginal wall during bearing down, but with a corresponding decreased horizontal motion during voluntary pelvic floor movement contraction. A subject with constipation may exhibit limited overall range of motion (e.g., limited range of angle change) as compared to population means, with evidence of prolonged Valsalva (e.g., small decreases in angle change). By identifying the angle change patterns associated with each specific disorder, one (e.g., a clinician) can diagnose the subject as having a particular disorder and select the subject for SNM therapy.

Some subjects will undergo an initial testing phase in order to detect patterns of angle change (e.g. from specific sensors, e.g., associated with specific activities) while using the electrical stimulation device. These patterns and angle changes may be compared to those observed before the electrical stimulation device was inserted to determine any changes associated therewith. If the angle changes indicate an improvement in the pelvic floor movements, the patient may be deemed as likely to respond to SNM therapy. However, if the angle changes indicate no improvement or exhibit a negative trend, the patient may be deemed as unlikely to respond to SNM therapy. For example, when the angle changes of the sensors of intravaginal device pass above or below a predetermined threshold, it may indicate the likelihood of responsiveness to treatment. Predetermined thresholds may be a percent change (e.g., 5%, 10%, 15%, 20%, 25%, 30%, 40%, 50%, 60%, 70%, 80%, 90%, or 100%) or an angle change (e.g., 1°, 2°, 3°, 4° 5°, 10°, 15°, 20°, 25°, 30°, 40°, 50°, 60°, 70°, 80°, or 90°).

Figure 13:
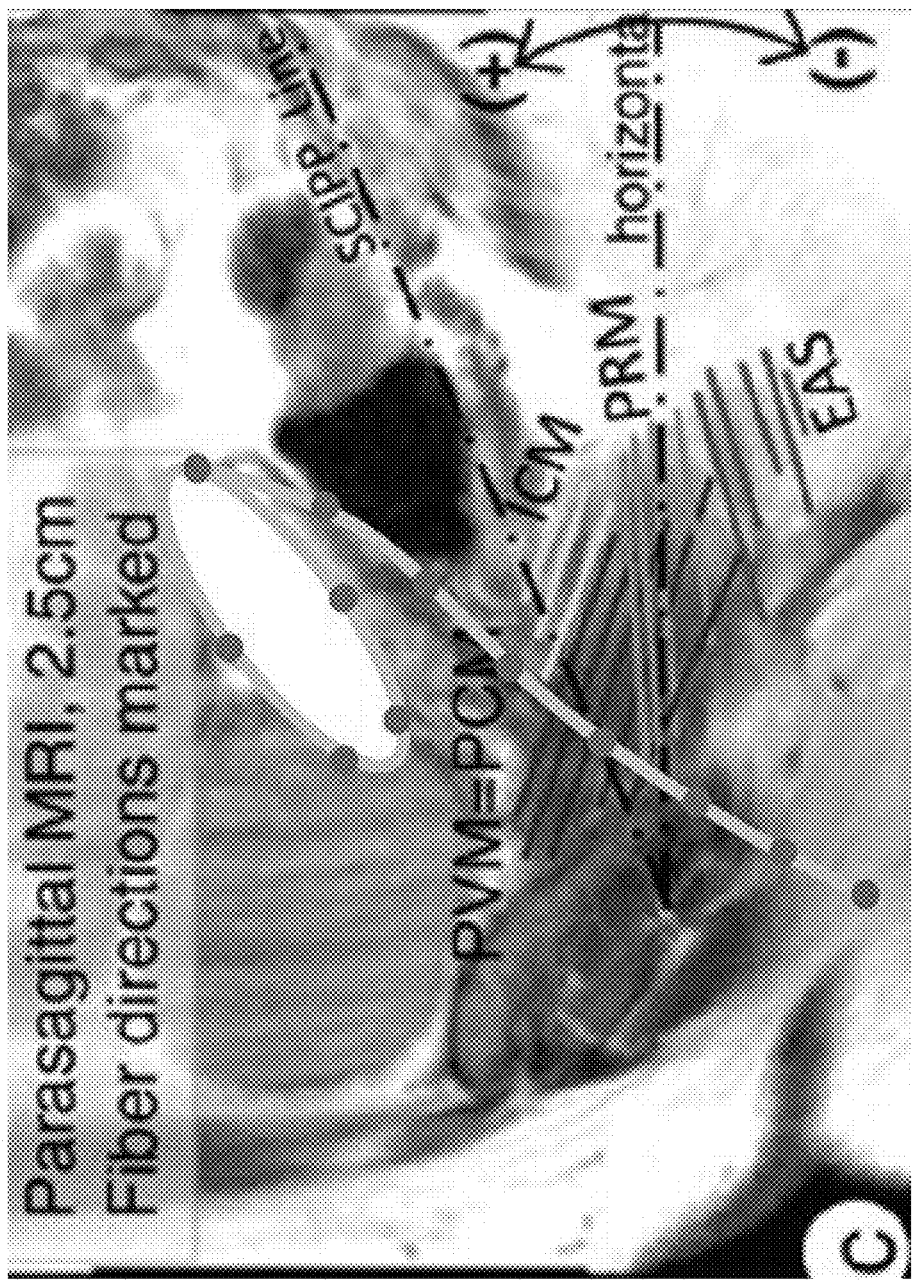
FIG. 13 is an image of a magnetic resonance imaging (MRI) scan of the levator ani and external anal sphincter muscle groups in the pelvic floor. Shown in the scan and labelled are the pubovisceral muscle (PVM) (e.g., pubococcygeal muscle (PCM)), the iliococcygeus muscle (ICM), the puborectal muscle (PRM), and the external anal sphincter muscle (EAS). The sacrococcygeal inferior public point (SCIPP) line is drawn in the midsagittal plane and transposed to all parasagittal slides. The orientations (angles) of the muscle fibers are indicated by the lines drawn on top of the muscle group, and are measured relative to the horizontal line. Fiber directions were marked and evaluated in respect of the individual SCIPP line and expressed as the angle to the average horizontal line, which is 34° below the SCIPP line. Fiber orientations subtending an angle clockwise to the horizontal line have a negative sign, while those with an angle counter-clockwise to the horizontal line have a positive sign. The intravaginal device with ring, tether, and multiple accelerometers spaced along a length of the device is overlaid on the MRI scan.
Figure 14:
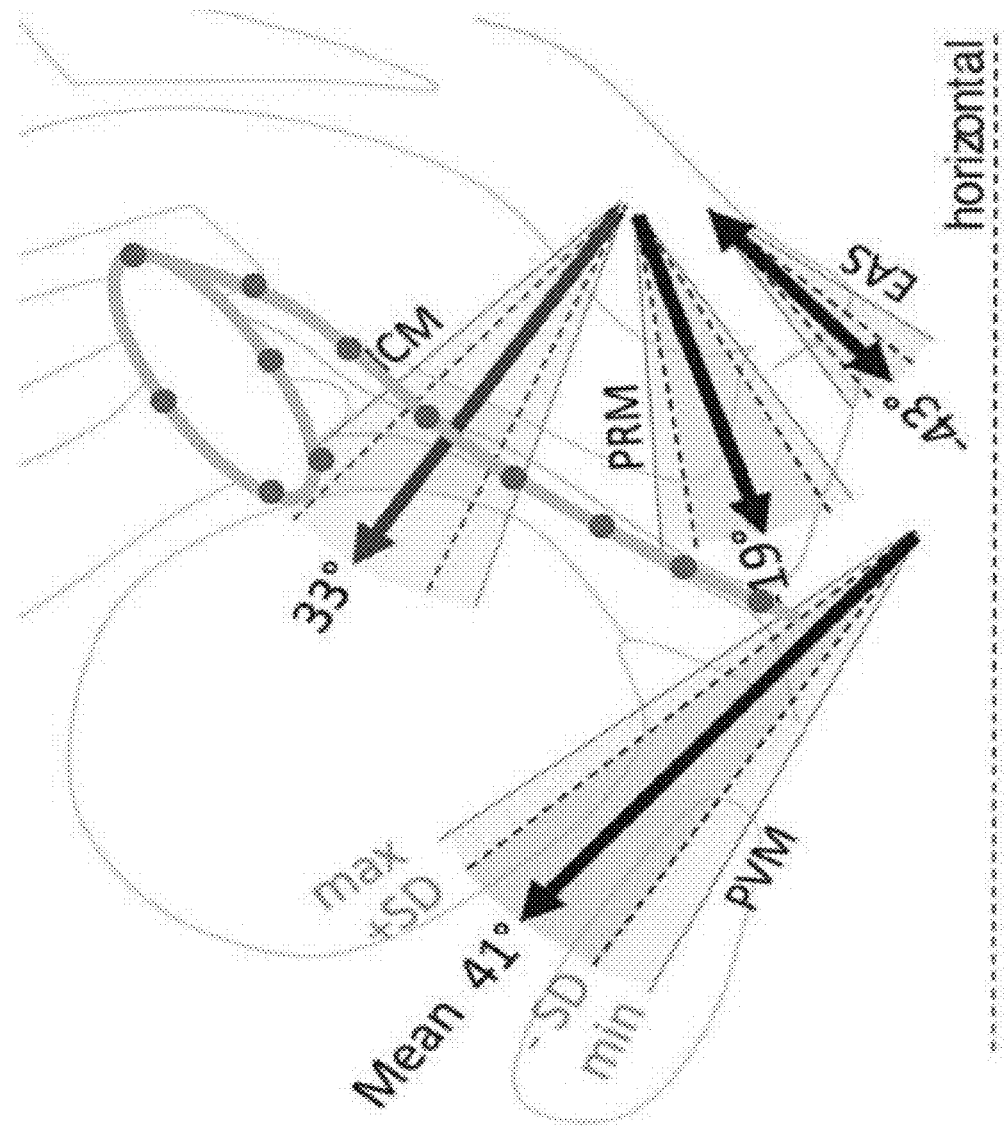
FIG. 14 is a schematic drawing showing the levator ani and external anal sphincter muscle groups in the pelvic floor. The thick arrow displays the mean direction to the horizontal line in a two-dimensional graphic. The dashed line is the horizontal line from which the angles are measured. Angles above the horizontal line have a positive sign and those below the horizontal line a negative sign. On MRI, the PVM was found medial to the PRM. The intravaginal device with ring, tether, and multiple accelerometers spaced along a length of the device is overlaid on the image.
Figure 15:
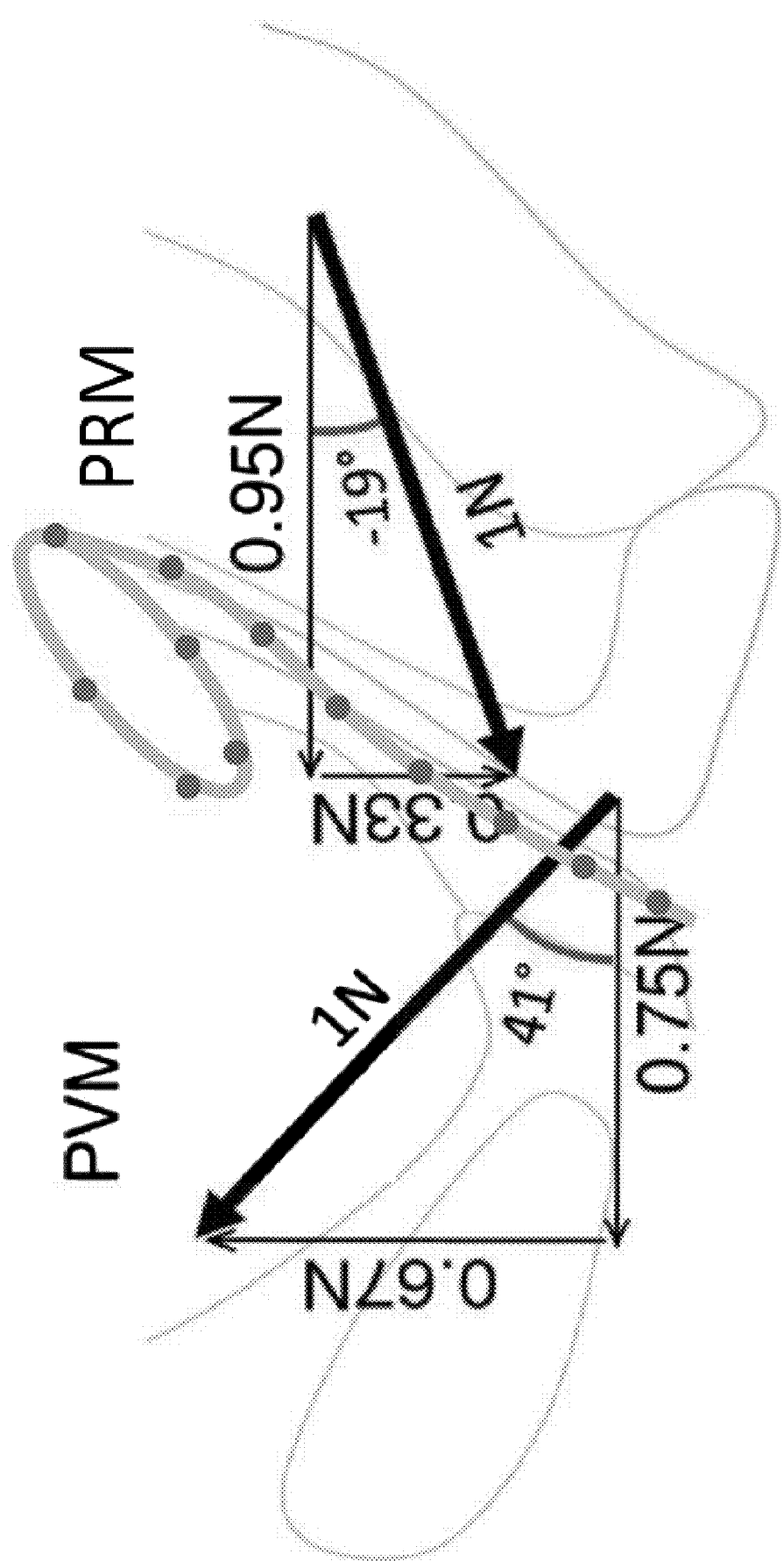
FIG. 15 is a schematic drawing showing the levator ani and external anal sphincter muscle groups in the pelvic floor. The thick arrows show the average direction of the lines of action of the PVM and PRM muscles relative to the horizontal with a theoretical 1 N force. The thin lines indicate the portion of each force related to a closing and lifting function. The intravaginal device with ring, tether, and multiple accelerometers spaced along a length of the device is overlaid on the image.

Trends and patterns of angle changes of the sensors (e.g., MEMS accelerometers) observed during electrical stimulation may be predicted based on the positions, movements, and relative orientation of the various levator ani and anal sphincter muscle groups (FIGS. 13-15). The orientation of these muscle groups are described, for example, in Betschart et al. (*Int. Urogynecol. J.* 25: 1263-1268, 2014), the disclosure of which is hereby incorporated by reference in its entirety.

Methods of Optimizing Sacral Neuromodulation Therapy

Once a subject has been selected for SNM therapy, the subject can be tracked over time to determine the efficacy of treatment and, if necessary, to optimize the treatment. For example, a subject may exhibit a characteristic baseline or sensor angle pattern baseline associated with various pelvic floor movements that are identified from the output of the intravaginal device. As the subject undergoes SNM therapy, these characteristic baseline or sensor angle patterns may be tracked over time to identify improvements in the pelvic floor disorder and/or the efficacy of treatment. For example, these characteristic baselines or patterns may be compared to a control subject (e.g., one without a disorder or one with the same disorder that is not undergoing SNM therapy) or a known baseline value indicative of a healthy subject. Additionally, the positioning of the electrical stimulation device may be adjusted to provide optimal and effective stimulation. The patterns and angle changes may be compared to those observed before SNM treatment to determine any changes associated therewith. If the angle changes above or below a predetermined threshold indicate an improvement in the pelvic floor movements, the patient may be deemed as responsive to SNM therapy. However, if the angle changes indicate no improvement or exhibit a negative trend, the patient may be deemed as unresponsive to SNM therapy. Predetermined thresholds may be a percent change (e.g., 5%, 10%, 15%, 20%, 25%, 30%, 40%, 50%, 60%, 70%, 80%, 90%, or 100%) or an angle change (e.g., 1°, 2°, 3°, 4° 5°, 10°, 15°, 20°, 25°, 30°, 40°, 50°, 60°, 70°, 80°, or 90°) in a positive or negative direction.

The intravaginal device and the electrical stimulation device may be designed to communicate with each other, either directly or indirectly, via a feedback loop in order to optimize their respective functions. For example, a subject may be prescribed a certain treatment protocol with the electrical stimulation device. The treatment parameters may include a pulse amplitude, pulse width, pulse frequency, stimulation mode, and electrode configuration, which are specified based on the specific subject and the severity of her disorder.

The subject may use an intravaginal device that is configured to communicate with a peripheral device configured to analyze the data collected from the sensors on the intravaginal device and transform the data into useful physiological indicia representative of a health state or the occurrence of a predetermined event (e.g., a pelvic floor movement or other event described herein). Furthermore, the intravaginal device and/or the peripheral device may be configured to communicate with the electrical stimulation device. The peripheral device may have a processor that executes instructions of a stored program(s) (e.g., one or more algorithms) that analyzes positional data from the sensors and/or controls the function of treatment parameters of the electrical stimulation device. The peripheral device can be configured to alert the subject (or a health care provider) or as to the subject's health status during an activity (e.g., before, during, or after an electrical stimulation treatment), and/or the peripheral device can be configured to present the data or an indication of the health status of the subject (e.g., on a graphical user interface or display). By analyzing and processing the data obtained from the positional sensors, the peripheral device can optimize the function of the electrical stimulation device through a feedback loop by specifying changes in the treatment parameters of the electrical stimulation device, if needed.

EXAMPLES

The following examples are put forth so as to provide those of ordinary skill in the art with a description of how the devices, systems, and methods described herein are performed, made, and evaluated, and are intended to be purely exemplary for use in the devices, systems, and methods and are not intended to limit the scope of what the inventors regard as their invention.

Example 1. Real-Time Data Output in Live Mode and Use with a Smartphone Application An intravaginal device described herein is connected to a transmitter box that wirelessly (via Bluetooth) sends the positional data gathered from the device sensors to a smartphone or computer for display on a graphical user interface, e.g., through a smartphone application. The shape of the vagina (data from the MEMS sensors in the device) reflects the position of the subject's pelvic floor in her body. The data is captured as a score based on the angles of the sensors. The score is a measure of the strength and/or position of the subject's pelvic floor muscles. The data created by the device is transmitted to a centralized database creating a personal health record for the subject, providing care and measurable results.

These data can provide predictive information that notifies a subject, or their health care professional, about the potential need for various treatment options or the status of treatment (e.g., SNM therapy), which can help to improve the subject's quality of life. For example, the changes observed in a subject with hypermobility might be markedly different from a subject without hypermobility (e.g., associated with stress urinary incontinence). By establishing a baseline on a subject using the device and the database of information on the subject, one could monitor the subject's pelvic floor descent or damage over time or, alternatively, an improvement in the subject's pelvic floor and/or conditions associated therewith. Therefore, the subject can be treated before the damage needs to be corrected through surgical means or can be monitored for an improvement in a pelvic floor condition or responsiveness to therapy (e.g., SNM therapy) over time.

An intravaginal device can be used to characterize a change in a health state over time of a female subject. For example, a female subject with stage III prolapse can use the intravaginal device by inserting it into her vagina, whereby sensors read out that the device is positioned at a vaginal angle of ~20°. When performing a PFL, the angle of the sensors moves toward 45°. She performs a series of exercises 1-10 times a day (30 seconds-3 minutes per session) over the course of 3 weeks. After the 3 week treatment period, the woman is able to lift the device such that the vaginal angle is 30°. This change in angle suggests that the woman has improved from stage III prolapse to stage II prolapse.

Example 2. Tracking Metrics of Sensor Readout as Patient Improves Pelvic Muscle Strength A patient with symptoms of urinary incontinence uses an intravaginal device for ~2.5 minutes twice daily. After performing pelvic floor exercises, the application computes an average weekly score, which increases from a baseline (screen) of 9 to a range of 44-52, reflecting the vaginal angle changes during the lifting of the pelvic floor during exercises. An increase in score correlates with an increase in pelvic muscle strength. The application can also track endurance, which calculates the duration of time holding a lift during an exercise. After a 3 week exercise regimen, the incontinence issue is assessed and, in many cases, would be resolved. If not resolved, the intravaginal device could be used to assess the need for, and possibly to determine the timing of electrical stimulation during, SNM therapy.

Example 3. Determining Optimal Sensor Positioning

An intravaginal device (see FIG. 2) was used to characterize specific sensor placement within the intravaginal device (e.g., within main body 110 or tether 10) in ten subjects. The sensors in the main body were within the anterior fornix, lateral fornices and posterior fornix. The sensors in the tether 10 were within the posterior fornix (shared by the main body) and along the vaginal canal caudal to the fornices. The main body contained 5 sensors, while the tether contained 8 sensors (including the one shared with the main body). The subjects had a range of vaginal lengths; these subjects were studied to determine if a subset of the original 12 sensors consistently correlated with pelvic floor movement (e.g., PFL) when the subjects performed a variety of maneuvers and demonstrated superior signal-to-noise characteristics. The sensors in the fornix exhibited lower signal and provided less robust visualization of pelvic floor movement. Of the sensors in the more caudal portion of the vagina, sensors 4-6 exhibited a strong signal during movement of the pelvic floor and favorable signal-to-noise ratio, even in female subjects having different vaginal lengths and physical shapes. Thus, the placement of 2-3 sensors along the length of the tether of the intravaginal device, such that the sensors are positioned approximately mid-way in the vaginal canal, yields robust signal output. Intravaginal devices with this placement of sensors (e.g., accelerometers, such as MEMS sensors) can be used to diagnose abnormal pelvic floor movements and vaginal curvature associated with specific pelvic floor disorders.

Example 4. Using an Algorithm to Detect Pelvic Floor Movement

Figure 7:
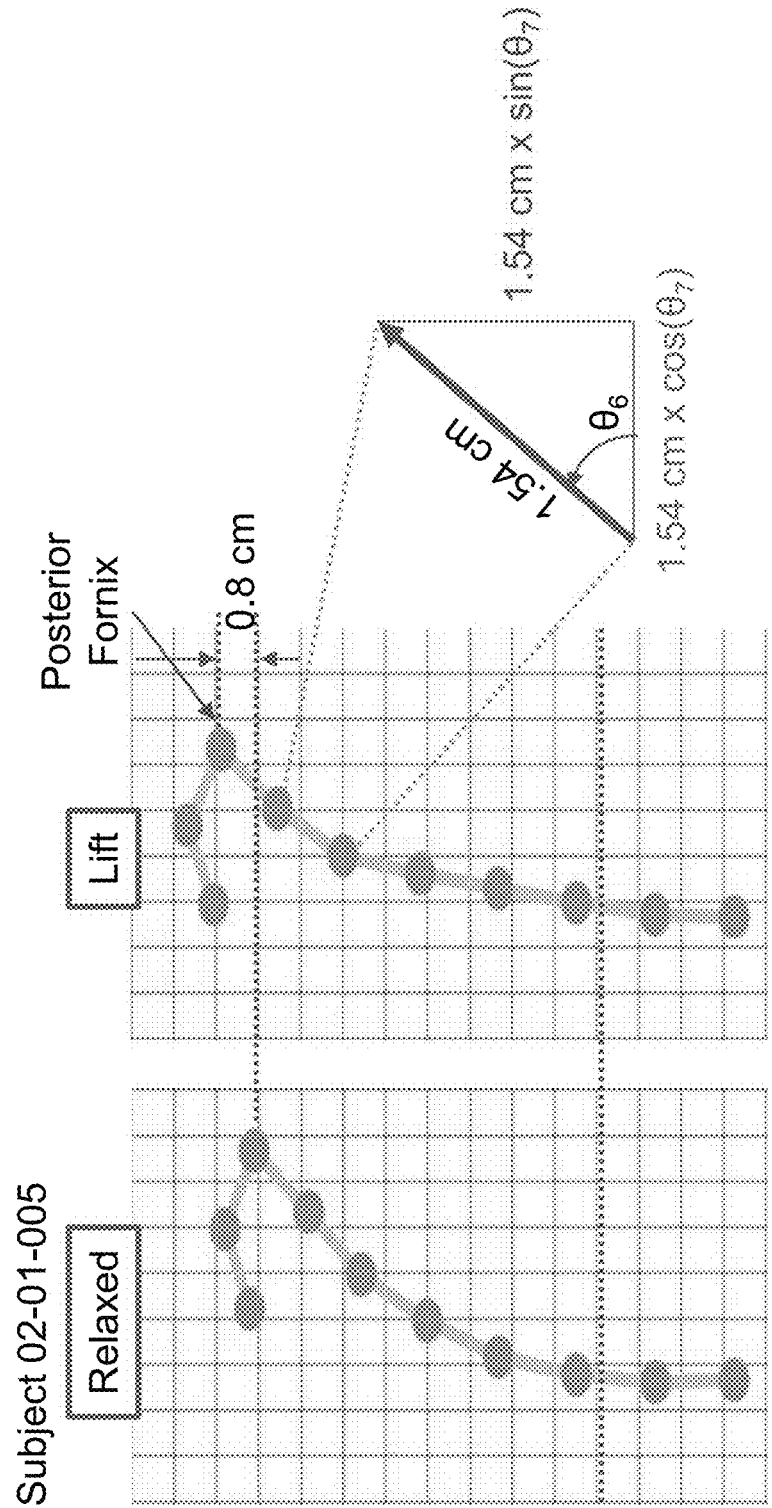
FIG. 7 shows two panel images illustrating the positions of sensors S1-S10 (see, e.g., FIG. 3D) of an intravaginal device in a subject in a relaxed state (left panel) and during a pelvic floor lift (right panel) as recorded by a processing device based on accelerometer sensor data. The bottom dashed line indicates the position of the virtual plane of the introitus during each maneuver. The two dashed lines in the upper portion illustrate the position of the posterior fornix sensor during each maneuver. During a pelvic floor lift, the posterior fornix sensor moves up 0.8 cm relative to its position during relaxation. The sensor data were generated using MEMS sensors. The upward motion of each sensor can be quantified as the length of each segment and the angle of each sensor is known. The upward motion of each sensor can then be used to calculate the upward motion of the pelvic floor.
Figure 8:
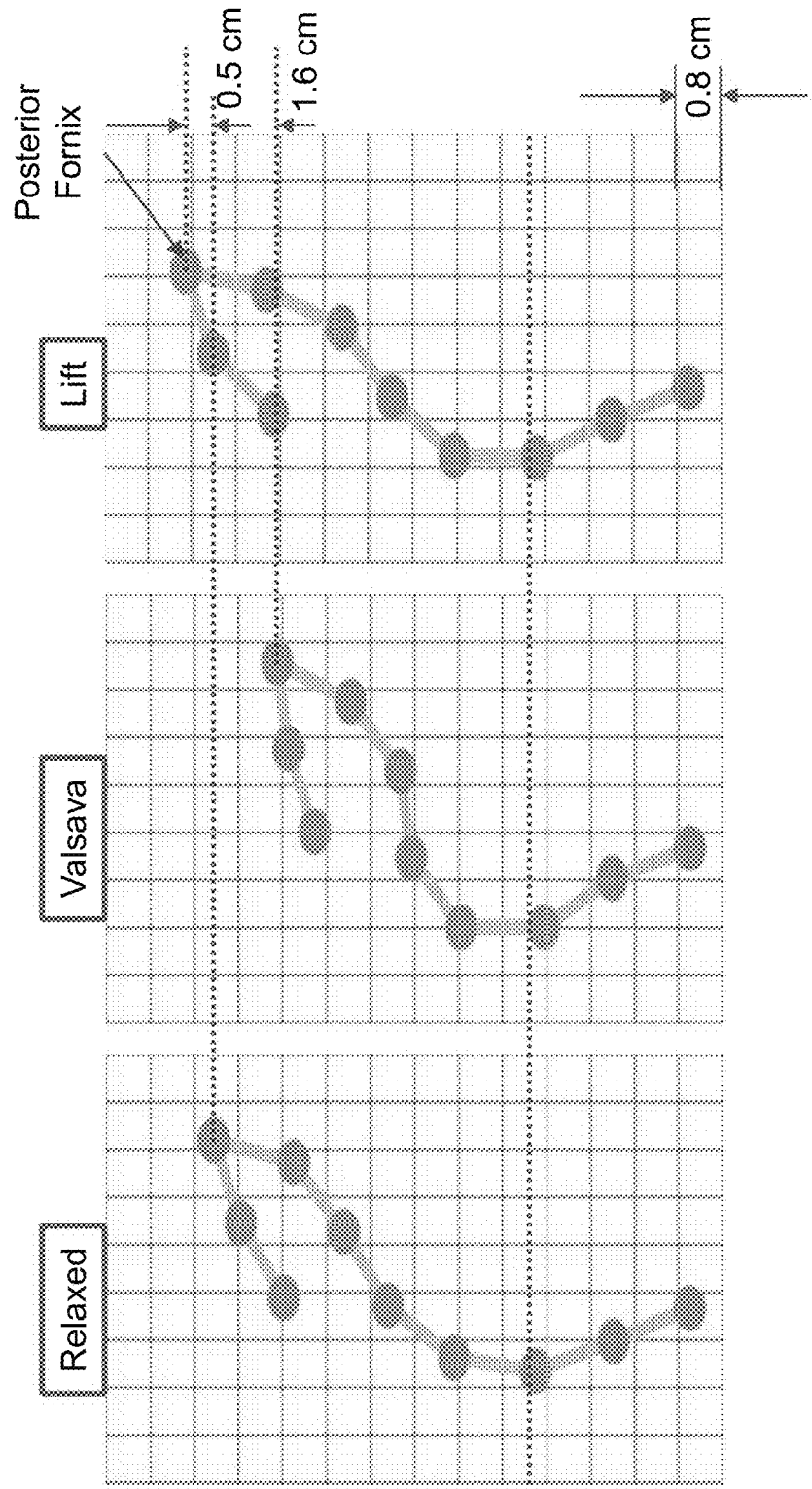
FIG. 8 shows three panel images illustrating the positions of sensors S1-S10 (see, e.g., FIG. 3D) of an intravaginal device in a subject during pelvic floor relaxation (left panel), during Valsalva maneuver (middle panel), and during pelvic floor lift (right panel). The bottom dashed line indicates the position of the virtual plane of the introitus during each maneuver. The three dashed lines in the upper portion illustrate the position of the posterior fornix sensor during each maneuver. During Valsalva maneuver, the posterior fornix sensor moves down 1.6 cm relative to its position during pelvic floor relaxation. During a pelvic floor lift, the posterior fornix sensor moves up 0.5 cm relative to its position during relaxation. The data were generated using MEMS sensors and the images were created by a processing device based on the sensor data.

An intravaginal device comprising a plurality of MEMS accelerometers was inserted into the vagina of a female subject and the subject was asked to perform a series of pelvic floor movements (e.g., pelvic floor lift, pelvic floor relaxation, Valsalva maneuver, sustained pelvic floor lift, and serially repeated pelvic floor lift). Sensor angle (relative to the horizon) and position data from each MEMS accelerometer was collected (FIGS. 7-8). The angle data from each sensor was plotted as a function of time (FIG. 9).

Two composite scores, Y1 and Y2, were calculated from the angles (A) of sensors S5-S7:

$$Y1 = A5 + A6 + 0.6 \times A7$$

$$Y2 = A5 + A6 - 0.8 \times A7$$

A moving average of Y1 and Y2 (Y1_movmean and Y2_movmean) was calculated from three consecutive samples of Y1 and Y2. The moving average filter was used to reduce noise and minimize false positives. The filtered composite scores were plotted versus time (FIG. 10A) and a derivative of this data was plotted as a change in sensor angle versus time (FIG. 10B). When the change in sensor angle versus time exceeded a threshold of 18°, it was determined that a pelvic floor lift had occurred. This threshold can be visualized by the slope of curve in FIG. 10A and the dashed line in FIG. 10B. The value of 18° was determined empirically from data from 10 different subjects. The start of the pelvic floor lift was determined at the instant that the time derivative of the moving averages of Y1 or Y2 exceeded this threshold. The peak values of the moving averages Y1 and Y2 were denoted Y1_max and Y2_max. The increase in the moving averages of Y1 and Y2 were denoted $\Delta Y1 = Y1\_max - Y1\_start$ and $\Delta Y2 = Y2\_max - Y2\_start$ (FIG. 10A). These values indicated the magnitude of the pelvic floor lift. When the Y1_movmean dropped below a value of $Y1\_max - 0.5 \times \Delta Y1$ or the Y2_movmean dropped below a value of $Y2\_max - 0.5 \times \Delta Y2$, it was determined that the pelvic floor lift ended. The start and finish times were also correlated with the instant when the second derivative of the sensor angle versus time reached zero, as shown by the top and bottom of the spikes in FIG. 10B around 42 and 55 seconds. The same data analysis was repeated for all pelvic floor movements (pelvic floor lift, pelvic floor relaxation, Valsalva maneuver, sustained pelvic floor lift, and serially repeated pelvic floor lift), as is denoted on the graphs.

Example 5. Detection of Pelvic Floor Movements During Daily Activities as a Measure of a Health State of a User A user can insert an intravaginal device comprising a plurality of MEMS accelerometers into her vagina and the device can detect pelvic floor movements (e.g., pelvic floor lift, pelvic floor relaxation, Valsalva maneuver, sustained pelvic floor lift, and serially repeated pelvic floor lift) during her daily activities. A processor in the device, or in a peripheral device, such as a smartphone or wearable device (e.g., a watch) can process the data to calculate the occurrence of a pelvic floor event. Each MEMS accelerometer emits a signal corresponding to the position and sensor angle relative to the horizon. The angle data from each sensor is plotted as a function of time. The strength of the signal from each sensors is denoted by the change in angle (angle during pelvic floor lift-angle during pelvic floor relaxation). This signal strength is used to determine which sensors provide the strongest signal. This is repeated for 10 subjects (FIG. 11).

A parameter $D_{MN}$ is defined as the angle "delta" for sensor M for patient number N. SM is defined as the angle for sensor M. An optimized composite score is defined as $Y_{opt\_N}=\text{sum }(1:10)\{D_{MN}\times SM\}$. Thus, the optimized composite score is a weighted average based on the relative signal strength of each sensor, which changes depending on the subject. In FIG. 11, the optimized composite score for the first subject is given by $Y_{opt\_1}=-1.1\ S_1-1.8S_2+1.2S_3+7.6S_4+6.9S_5-3.1S_6-10.2S_7-8.7S_8-5.1S_9-4.8S_{10}$. The optimized composite score is calculated for the other subjects (2-10) in a similar manner.

Example 6. Optimizing the Placement of an Electrical Stimulation Device

A patient with symptoms of urinary incontinence is prescribed electrical stimulation therapy. A doctor or the patient inserts an intravaginal device comprising a plurality of sensors (e.g., MEMS accelerometers) into the patient's vagina and the position of the pelvic floor is visualized on a graphical user interface based on data received from sensors of the intravaginal device. The physician then inserts an implantable electrical stimulation device into the sacral nerve (S3) of the patient and activates the device to emit an electrical pulse. While emitting the electrical pulse, the physician observes the position of the intravaginal sensors, which provide information regarding movements of the pelvic floor. The physician does not observe any pelvic floor movements and subsequently repositions the implantable electrical stimulation device at the S3 nerve (e.g., 0.1-1 cm above or below the previous insertion point) and emits another electrical pulse. The physician now observes a pelvic floor movement during stimulation of the sacral nerve and determines that the implantable electrical stimulation device is properly placed.

Example 7. Selecting a Patient for Electrical Stimulation Therapy

A patient with urinary incontinence inserts an intravaginal device comprising a plurality of sensors (e.g., MEMS accelerometers) into her vagina (e.g., the device of FIG. 2). The position of the patient's pelvic floor is visualized on a graphical user interface based on the position of the sensors. When the patient senses an urge to urinate, the positions of sensors S4-S6 show a decreased overall range of motion with frequent small lifts, as compared to the positions of sensors S4-S6 visualized with an intravaginal device in a healthy subject. Based on these patterns, a physician identifies the patient as having an overactive bladder and likely to benefit from electrical stimulation therapy using an implantable electrical stimulation device providing sacral neuromodulation.

Example 8. Predicting a Patient as Responsive to Electrical Stimulation Therapy A patient with urgency incontinence inserts an intravaginal device comprising a plurality of sensors (e.g., MEMS accelerometers) into her vagina and has an electrical stimulation device implanted near the sacral nerve (S3) in her back. A physician takes a series of readings of the sensor positions of S4-S6 of the intravaginal device (e.g., the device of FIG. 2). When the patient senses an episode of urgency, the positions of sensors S4-S6 show a decrease overall range of motion, with frequent small relaxation patterns. A physician then initiates an electrical stimulation during a test period and continues observing the positions of sensors S4-S6. When the patient senses an episode of urgency, the relaxation patterns become smaller in magnitude, indicative that the electrical stimulation decreases the urgency to urinate. These observations indicate that the patient is likely to be responsive to the electrical stimulation therapy.

Example 9. Evaluating the Efficacy of Electrical Stimulation Therapy

A patient with urgency incontinence inserts an intravaginal device comprising a plurality of sensors (e.g., MEMS accelerometers) into her vagina and has an electrical stimulation device implanted near the sacral nerve (S3) in her back. A physician takes a series of readings of the sensor positions of S4-S6 of the intravaginal device (e.g., the device of FIG. 2) over multiple days to establish a baseline sensor position during various activities, including during episodes of urgency. The patient undergoes 4 weeks of electrical stimulation therapy. The physician sets the treatment parameters at 5 mA pulse amplitude, 20 Hz pulse frequency, 200 µs pulse width, and continuous stimulation mode. After 4 weeks, the physician takes another series of readings of the sensor positions of S4-S6 over multiple days to establish a new baseline sensor position, including during episodes of urgency. The physician observes that the frequency and duration of sensor pattern events associated with urgency incontinence has significantly decreased since the initial test results, indicating that the patient is responsive to the electrical stimulation treatment.

Example 10. Optimizing Sacral Neuromodulation Therapy with a Feedback Mechanism A patient with overactive bladder inserts an intravaginal device (e.g., the device of FIG. 2) comprising a plurality of sensors (e.g., MEMS accelerometers) into her vagina and has an electrical stimulation device implanted near the sacral nerve (e.g., S3) in her back. The intravaginal device is configured to communicate with a peripheral device configured to analyze the data collected from the sensors on the intravaginal device and transform the data into useful physiological indicia representative the occurrence of a predetermined incontinence event. The intravaginal device and the peripheral device are also configured to communicate with the electrical stimulation device. The peripheral device has a processor that executes instructions of a stored algorithm that analyzes positional data from the sensors and controls the function of treatment parameters of the electrical stimulation device.

The physician sets the treatment parameters at 5 mA pulse amplitude, 20 Hz pulse frequency, 200 µs pulse width, and continuous stimulation mode. After 2 weeks, the algorithm in the peripheral device processes the positional data from the accelerometers and determines that the treatment regimen is not effective. The algorithm then alters the treatment parameters to 10 mA pulse amplitude, 40 Hz pulse frequency, and 400 µs pulse width and initiates a new series of electrical stimulations from the implantable electrical stimulation device. Two weeks later, the algorithm processes the positional data from the accelerometers and determines that the treatment regimen is effective.

OTHER EMBODIMENTS

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations for use in the compositions and methods of the invention following, in general, the principles for use in the compositions and methods of the invention and including such departures from the present disclosure that come within known or customary practice within the art to which the invention pertains and may be applied to the essential features hereinbefore set forth, and follows in the scope of the claims. Other embodiments are within the claims.

The invention claimed is:

1. A method of treating urinary or fecal incontinence in a subject comprising:
   a) providing a system comprising an intravaginal device comprising a plurality of accelerometers located along a length of the device; and a medical device comprising an implantable lead configured to deliver electrical stimulation to a sacral nerve;
   b)
      i) inserting the intravaginal device into a vagina of the subject, and
      ii) placing the implantable lead on the sacral nerve of the subject and electrically stimulating the sacral nerve with the medical device;
   c) obtaining and visualizing on a graphical user interface positional data from the accelerometers of the intravaginal device during the electrical stimulation of the sacral nerve, wherein a position of the accelerometers on the graphical user interface is a representation of a position of the vagina during movement of one or more pelvic floor muscles of the subject resulting from the electrical stimulation of the sacral nerve; and
   d) repeating steps b) ii) and c) one or more times to optimize the placement of the implantable lead to increase efficacy of the electrical stimulation.

2. The method of claim 1, further comprising processing the positional data from the accelerometers to determine an occurrence of the movement of the one or more pelvic floor muscles.

3. The method of claim 2, further comprising employing the processed positional data to provide feedback to the medical device regarding the movement of the one or more pelvic floor muscles or wherein the medical device is activated to stimulate the sacral nerve based on feedback from the intravaginal device or the medical device.

4. The method of claim 3, wherein the feedback is determined from the positional data of the accelerometers of the intravaginal device.

5. The method of claim 1, wherein the accelerometers are microelectromechanical (MEM) accelerometers.

6. The method of claim 1, wherein the intravaginal device comprises:
   i) a main body having an outer edge configured to contact a vaginal wall or vaginal fornix and an internal diameter sized to encircle a cervix or vaginal cuff; and
   ii) a tether connected to the main body.

7. The method of claim 6, wherein the tether comprises 2 to 10 of the accelerometers or wherein the main body comprises 2 to 6 of the accelerometers.

8. The method of claim 6, wherein:
   a) the main body has a horseshoe form or cup-shaped form;
   b) the main body comprises at least one of the accelerometers;
   c) one of the accelerometers is shared by the main body and the tether;
   d) a length of the tether is about 3 cm to about 50 cm;
   e) a circumference of the main body is about 10 cm to about 50 cm; or
   f) the intravaginal device comprises two or more accelerometers on the tether and wherein the accelerometers are separated on the tether by a distance of about 0.5 cm to about 5 cm.

9. The method of claim 8, wherein:
   i) the length of the tether is about 25.5 cm;
   ii) the circumference of the main body is about 27 cm; or
   iii) the distance between the accelerometers on the tether is about 1.6 cm.

10. The method of claim 1, wherein the intravaginal device comprises a transmitter or receiver for communicating data to an electronic device or to the medical device; or the implantable lead comprises one or more collapsible projections configured to anchor the lead to surrounding tissue.

11. The method of claim 10, wherein:
   i) the transmitter or receiver is a radio frequency transmitter or receiver;
   ii) the transmitter or receiver can wirelessly communicate the data to the electronic device or to the medical device;
   iii) the transmitter or receiver are configured for use with a Bluetooth or Wi-Fi enabled electronic device;
   iv) the electronic device comprises a display, wherein optionally, the display is on the graphical user interface, wherein, optionally, the graphical user interface comprises a touch user interface;
   v) the electronic device is a computer, tablet, smartphone, or smart watch; or
   vi) the collapsible projections are tines.

12. The method of claim 1, wherein:
   i) the intravaginal device or the medical device comprises a battery;
   ii) the medical device comprises a processor configured to receive input from a user; or
   iii) the medical device comprises a transmitter or receiver for communicating data to the electronic device or to the intravaginal device.

13. The method of claim 12, wherein:
   a) the transmitter or receiver of the medical device is a radio frequency transmitter or receiver;
   b) the transmitter or receiver of the medical device can wirelessly communicate the data to the electronic device or to the intravaginal device; or
   c) the transmitter or receiver of the medical device are configured for use with a Bluetooth or Wi-Fi enabled electronic device.

14. The method of claim 1, wherein the medical device:
   i) comprises one or more electrodes;
   ii) comprises a pulse generator;
   iii) comprises two or more implantable leads; or
   iv) generates or modulates an electrical signal in response to an input signal from the intravaginal device.

15. A method of detecting proper placement of an implantable lead of a medical device configured to deliver electrical stimulation to a sacral nerve of a subject comprising:
- a) providing a system comprising an intravaginal device comprising a plurality of accelerometers located along a length of the device; and the medical device comprising an implantable lead configured to deliver electrical stimulation to the sacral nerve;
- b) inserting the intravaginal device into a vagina of the subject and placing the implantable lead on the sacral nerve of the subject and electrically stimulating the sacral nerve with the medical device;
- c) obtaining and visualizing on a graphical user interface positional data from the accelerometers of the intravaginal device during the electrical stimulation of the sacral nerve, wherein a position of the accelerometers on the graphical user interface is a representation of a position of the vagina during movement of one or more pelvic floor muscles of the subject resulting from the electrical stimulation of the sacral nerve;
- d) processing the positional data from the accelerometers to determine an occurrence of a pelvic floor movement; and
- e) determining that the implantable lead of the medical device is properly placed in the sacral nerve of the subject based on the occurrence of the pelvic floor movement detected by the intravaginal device in step d).

16. The method of claim 15, further comprising treating the subject for urinary or fecal incontinence by repeatedly administering electrical stimulation to the sacral nerve of the subject with the medical device.

17. A method of identifying a subject as responsive to treatment for urinary or fecal incontinence with a medical device configured to deliver electrical stimulation to a sacral nerve of the subject comprising:
- a) providing a system comprising an intravaginal device comprising a plurality of accelerometers located along a length of the device; and the medical device comprising an implantable lead configured to deliver electrical stimulation to the sacral nerve;
- b) inserting the intravaginal device into a vagina of the subject and placing the implantable lead on the sacral nerve of the subject and electrically stimulating the sacral nerve with the medical device;
- c) obtaining and visualizing on a graphical user interface positional data from the accelerometers of the intravaginal device during the electrical stimulation of the sacral nerve, wherein a position of the accelerometers on the graphical user interface is a representation of a position of the vagina during movement of one or more pelvic floor muscles of the subject resulting from the electrical stimulation of the sacral nerve;
- d) processing the positional data from the accelerometers to determine an occurrence of a pelvic floor movement; and
- e) determining the subject to be responsive to the treatment with the medical device based on the occurrence of the pelvic floor movement detected by the intravaginal device in step d).

* * * * *